US011530285B2

(12) United States Patent
Silverstein et al.

(10) Patent No.: US 11,530,285 B2
(45) Date of Patent: Dec. 20, 2022

(54) POLYHIPE-BASED SUBSTANCE-RELEASING SYSTEMS

(71) Applicant: Technion Research & Development Foundation Limited, Haifa (IL)

(72) Inventors: Michael S. Silverstein, Zikhron-Yaakov (IL); Katya Kapilov-Buchman, Haifa (IL); Reinhard Effenberger, Haifa (IL); Dorit Canfi, Zikhron-Yaakov (IL)

(73) Assignee: Technion Research & Development Foundation Limited, Haifa (IL)

( * ) Notice: Subject to any disclaimer, the term of this patent is extended or adjusted under 35 U.S.C. 154(b) by 386 days.

(21) Appl. No.: 16/325,401

(22) PCT Filed: Aug. 16, 2017

(86) PCT No.: PCT/IL2017/050904
§ 371 (c)(1),
(2) Date: Feb. 14, 2019

(87) PCT Pub. No.: WO2018/033913
PCT Pub. Date: Feb. 22, 2018

(65) Prior Publication Data
US 2019/0194083 A1 Jun. 27, 2019

(30) Foreign Application Priority Data
Aug. 16, 2016 (IL) .......................... 247302

(51) Int. Cl.
| | | |
|---|---|---|
| *B01J 13/18* | (2006.01) | |
| *C05C 1/00* | (2006.01) | |
| *C05G 3/00* | (2020.01) | |
| *C05G 3/30* | (2020.01) | |
| *C05G 5/40* | (2020.01) | |
| *C08F 220/18* | (2006.01) | |
| *C08F 220/68* | (2006.01) | |
| *C08F 290/06* | (2006.01) | |
| *C08F 293/00* | (2006.01) | |
| *C08G 18/42* | (2006.01) | |
| *C08G 18/73* | (2006.01) | |
| *C08J 3/24* | (2006.01) | |
| *C05G 5/30* | (2020.01) | |

(52) U.S. Cl.
CPC ......... *C08F 290/061* (2013.01); *B01J 13/185* (2013.01); *C05C 1/00* (2013.01); *C05G 3/00* (2013.01); *C05G 5/37* (2020.02); *C05G 5/40* (2020.02); *C08F 220/1808* (2020.02); *C08F 220/1812* (2020.02); *C08F 220/68* (2013.01); *C08F 293/00* (2013.01); *C08G 18/4277* (2013.01); *C08G 18/73* (2013.01); *C08J 3/24* (2013.01); *C08F 220/1806* (2020.02); *C08F 2438/00* (2013.01); *C08F 2810/20* (2013.01)

(58) Field of Classification Search
CPC ................... C05G 5/40; C08J 9/283
See application file for complete search history.

(56) References Cited

U.S. PATENT DOCUMENTS

| | | |
|---|---|---|
| 2,801,185 A | 7/1957 | Iler |
| 3,417,171 A | 12/1968 | Eberle et al. |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,522,958 A | 6/1985 | Das et al. |
| 5,258,225 A | 11/1993 | Katsamberis |
| 5,648,407 A | 7/1997 | Goetz et al. |
| 5,652,194 A | 7/1997 | Dyer et al. |
| 6,147,131 A | 11/2000 | Mork et al. |
| 6,204,298 B1 | 3/2001 | DesMarais et al. |
| 6,241,713 B1 | 6/2001 | Gross et al. |
| 6,353,037 B1 | 3/2002 | Thunhorst et al. |
| 6,573,305 B1 | 6/2003 | Thunhorst et al. |
| 6,586,483 B2 | 7/2003 | Kolb et al. |
| 6,750,261 B1 | 6/2004 | Clear et al. |
| 7,129,277 B2 | 10/2006 | Baran, Jr. |
| 7,189,768 B2 | 3/2007 | Baran, Jr. et al. |
| 7,507,780 B2 | 3/2009 | Hagerty et al. |
| 7,967,367 B2 | 6/2011 | Cafeo et al. |
| 10,449,516 B2 | 10/2019 | Kovacic et al. |
| 10,851,218 B2 | 12/2020 | Silverstein et al. |
| 2002/0091368 A1 | 7/2002 | LaVon et al. |
| 2003/0097103 A1 | 5/2003 | Horney et al. |
| 2003/0170308 A1 | 9/2003 | Cleary et al. |
| 2004/0116594 A1 | 6/2004 | Bhattacharjee et al. |
| 2004/0204510 A1 | 10/2004 | Clear et al. |
| 2004/0224021 A1 | 11/2004 | Omidian et al. |

(Continued)

FOREIGN PATENT DOCUMENTS

| | | |
|---|---|---|
| CA | 2322498 | 9/1999 |
| CN | 107126936 | 9/2017 |

(Continued)

OTHER PUBLICATIONS

International Preliminary Report on Patentability dated Jan. 10, 2019 From the International Bureau of WIPO Re. Application No. PCT/IL2017/050706. (10 Pages).
International Preliminary Report on Patentability dated Feb. 28, 2019 From the International Bureau of WIPO Re. Application No. PCT/IL2017/050904. (8 Pages).
International Search Report and the Written Opinion dated Nov. 1, 2018 From the International Searching Authority Re. Application No. PCT/IL2018/050803. (11 Pages).
International Search Report and the Written Opinion dated Nov. 12, 2017 From the International Searching Authority Re. Application No. PCT/IL2017/050904. (13 Pages).
International Search Report and the Written Opinion dated Nov. 20, 2018 From the International Searching Authority Re. Application No. PCT/IL2018/050751. (15 Pages).

(Continued)

*Primary Examiner* — Melissa A Rioja

(57) ABSTRACT

A polyHIPE-based substance-releasing system capable of releasably encapsulating a highly concentrated solution and/or a room temperature solid while minimizing or avoiding burst release from the closed-cell microstructure of an elastic polyHIPE.

14 Claims, 10 Drawing Sheets

(56) References Cited

U.S. PATENT DOCUMENTS

| | | |
|---|---|---|
| 2005/0215962 A1 | 9/2005 | Litvay et al. |
| 2006/0010004 A1 | 1/2006 | Deckner |
| 2009/0215913 A1 | 8/2009 | Thies et al. |
| 2009/0270538 A1 | 10/2009 | Ikeuchi et al. |
| 2011/0091512 A1 | 4/2011 | Li |
| 2012/0201806 A1 | 8/2012 | Silverstein et al. |
| 2012/0261803 A1 | 10/2012 | Wang et al. |
| 2013/0216814 A1 | 8/2013 | Hirao et al. |
| 2013/0324627 A1 | 12/2013 | Silverstein et al. |
| 2014/0011897 A1 | 1/2014 | Friederichs et al. |
| 2014/0328884 A1 | 11/2014 | Reyes et al. |
| 2015/0166753 A1 | 6/2015 | Silverstein et al. |
| 2016/0287516 A1 | 10/2016 | Cosgriff-Hernandez et al. |
| 2016/0361382 A1* | 12/2016 | Steinbach-Rankins ..................... A61K 31/675 |
| 2017/0189238 A1 | 7/2017 | Andrews |
| 2017/0326529 A1 | 11/2017 | Kovacic et al. |
| 2019/0031845 A1* | 1/2019 | Kitayama ............. C08F 220/14 |
| 2019/0127546 A1 | 5/2019 | Silverstein et al. |
| 2020/0016574 A1 | 1/2020 | Kovacic et al. |
| 2020/0123338 A1 | 4/2020 | Silverstein et al. |
| 2020/0148837 A1 | 5/2020 | Silverstein et al. |
| 2020/0277450 A1 | 9/2020 | Silverstein et al. |

FOREIGN PATENT DOCUMENTS

| | | |
|---|---|---|
| WO | WO 94/12134 | 6/1994 |
| WO | WO 02/008321 | 1/2002 |
| WO | WO 2009/013500 | 1/2009 |
| WO | WO 2015/076908 | 5/2015 |
| WO | WO 2018/002916 | 1/2018 |
| WO | WO 2018/002916 A8 | 1/2018 |
| WO | WO 2018/033913 | 2/2018 |
| WO | WO 2018/033913 A8 | 2/2018 |
| WO | WO 2019/012529 | 1/2019 |
| WO | WO 2019/016816 | 1/2019 |
| WO | WO 2019/016816 A9 | 5/2019 |
| WO | WO 2019/087185 | 5/2019 |

OTHER PUBLICATIONS

International Search Report and the Written Opinion dated Jan. 27, 2019 From the International Searching Authority Re. Application No. PCT/IL2018/051158. (12 Pages).
International Search Report and the Written Opinion dated Sep. 27, 2017 From the International Searching Authority Re. Application No. PCT/IL2017/050706. (17 Pages).
Notice of Allowance dated Jun. 13, 2019 From the US Patent and Trademark Office Re. U.S. Appl. No. 15/595,970. (23 Pages).
Notice of Omitted Item(s) in A Nonprovisional Application dated Jan. 8, 2015 From the US Patent and Trademark Office Re. U.S. Appl. No. 14/578,519.
Office Action and Search Report dated Mar. 1, 2017 From the Israel Patent Office Re. Application No. 247302. (7 Pages).
Office Action and Search Report dated Dec. 4, 2016 From the Israel Patent Office Re. Application No. 245656. (7 Pages).
Office Action and Search Report dated Sep. 5, 2018 From the Israel Patent Office Re. Application No. 256783. (14 Pages).
Office Action and Search Report dated Mar. 11, 2018 From the Israel Patent Office Re. Application No. 255404. (7 Pages).
Office Action and Search Report dated Mar. 16, 2017 From the Israel Patent Office Re. Application No. 246468. (8 Pages).
Office Action dated Sep. 7, 2017 From the Israel Patent Office Re. Application No. 247302 and Its Translation Into English. (12 Pages).
Office Action dated Feb. 8, 2018 From the Israeli Patent Office Re. Application No. 247302 and Its Translation Into English. (11 Pages).
Office Action dated Jul. 16, 2017 From the Israel Patent Office Re. Application No. 245656 and Its Translation Into English. (4 Pages).
Office Action dated Nov. 16, 2016 From the Israel Patent Office Re. Application No. 246468. (2 Pages).
Office Action dated Jun. 21, 2016 From the Israel Patent Office Re. Application No. 245656. (3 Pages).
Office Action dated May 23, 2016 From the Israel Patent Office Re. Application No. 245656. (2 Pages).
Office Action dated Sep. 25, 2016 From the Israel Patent Office Re. Application No. 247302. (1 Page).
Office Action dated Dec. 28, 2017 From the Israel Patent Office Re. Application No. 253431. (4 Pages).
Office Action dated Sep. 28, 2017 From the Israel Patent Office Re. Application No. 246468 and Its Translation Into English. (6 Pages).
Office Action dated Aug. 30, 2018 From the Israel Patent Office Re. Application No. 247302 and Its Translation Into English. (13 Pages).
Office Action dated Feb. 8, 2018 From the Israel Patent Office Re. Application No. 246468 and Its Translation Into English. (4 Pages).
Official Action dated Sep. 5, 2014 From the US Patent and Trademark Office Re. U.S. Appl. No. 13/369,362.
Official Action dated Oct. 6, 2015 From the US Patent and Trademark Office Re. U.S. Appl. No. 14/578,519.
Official Action dated May 13, 2014 From the US Patent and Trademark Office Re. U.S. Appl. No. 13/892,606.
Official Action dated Nov. 20, 2018 From the US Patent and Trademark Office Re. U.S. Appl. No. 15/595,970. (38 Pages).
Restriction Official Action dated Feb. 12, 2014 From the US Patent and Trademark Office Re. U.S. Appl. No. 13/892,606.
Audouin et al. "Preparation, Solid-State NMR, and Physicochemical Characterization of Surprisingly Tough Open Cell PolyHIPEs Derived From 1-Vinyl-1,2,4-Triazole Oil-in-Water Emulsions", Macromolecules, 44(12): 4879-4886, May 27, 2011.
Audouin et al. "Synthesis of Porous Materials by 2-Nitroresorcinol/Cyanuric Chloride Thermal Polycondensation in Emulsions", Journal of Applied Polymer Science, 108(5): 280802813, Published Online Feb. 25, 2008.
Barbetta et al. "High Internal Phase Emulsions (HIPEs) Containing Divinylbenzene and 4-Venylbenzyl Chloride and the Morphology of the Resulting PolyHIPE Materials", Chemical Communications, p. 221-222, 2000.
Chung et al. "The Thermoresponsive Shape Memory Characteristics of Polyurethane Foam", Journal of Applied Polymer Science, 117: 2265-2271, 2010.
Cohen Samoocha "Bicontinuous Hydrogel-Filled Hydrophobic Polymers Synthesized Within Polymer-Nanoparticle-Stabilized Pickering Emulsions", M.Sc Thesis, Department of Materials Science and Engineering, Abstract. Apr. 2015.
Colver et al. "Cellular Polymer Monoliths Made Via Pickering High Internal Phase Emulsions", Chemical Materials, 19: 1537-1539, 2007.
David et al. "Porous Polyurethanes Synthesized Within High Internal Phase Emulsions", Journal of Polymer Science Part A: Polymer Chemistry, 47(21): 5806-5814, Sep. 28, 2009. Abstract, Fig.3, p. 5807-5808, p. 5809, Line 2, 5813.
Deleuze et al. "Preparation and Functionalisation of Emulsion-Derived Microcellular Polymeric Foams (PolyHIPEs) by Ring-Opening Metathesis Polymerisation (ROMP)", Chemistry Communications, 2002(23): 2822-2823, Advance Publication Oct. 25, 2002.
Gitli et al. "Emulsion Templated Bicontinuous Hydrophobic-Hydrophilic Polymers: Loading and Release", Polymer, 52(1): 107-115, Available Online Nov. 13, 2010.
Gurevitch et al. "Nanoparticle-Based and Organic-Phase-Based AGET ATRP PolyHIPE Synthesis Within Pickering HIPEs and Surfactants-Stabilized HIPEs", Macromolecules, 44(9): 3398-3409, Apr. 15, 2011.
Gurevitch et al. "Polymerized Pickering HIPEs: Effects of Synthesis Parameters on Porous Structure", Journal of Polymer Science, Part A: Polymer Chemistry, 48: 1516-1525, 2010.
Ikem et al. "High Internal Phase Emulsions Stabilized Solely by Functionalized Silica Particles", Angewandte Chemie, International Edition, 47: 8277-8279, 2008.
Kabiri et al. "Novel Sulfobetaine-Sulfonic Acid-Contained Superswelling Hydrogels", Polymers for Advanced Technologies, 16(9): 659-666, Published Online Aug. 4, 2005.

(56) References Cited

OTHER PUBLICATIONS

Kapilov-Buchman et al. "Water-Filled Elastomers Through Droplet Microencapsulation: Release and Degradation", Department of Materials Science and Engineering, Technion—Israel Institute of Technology, Haifa, Israel, Poster, Dec. 31, 2015.
Kapilov-Buchman et al. "Water-Filled Elastomers Through Droplet Microencapsulation: Release and Degradation", Presentation in the Conference IMEC, BarIlan University, Israel, Feb. 1-2, 2016, 17 P., Feb. 2, 2016.
Kovacic et al. "Macroporous Double Network Hydrogels Through Emulsion Templating", Presented at the Polymer Chemistry Gordon Research Conference, Poster, Jun. 30, 2015.
Kovacic et al. "Superabsorbent, High Porosity, PAMPS?Based Hydrogels Through Emulsion Templating", Macromolecular Rapid Communications, 37(22): 1814-1819, Sep. 2016.
Lalani et al. "Electrospun Zwitterionic Poly(Sulfobetaine Methacrylate) for Nonadherent, Superabsorbent, and Antimicrobial Wound Dressing Applications", Biomacromolecules, 13(6): 1853-1863, Apr. 30, 2012.
Laschewsky "Structures and Synthesis of Zwitterionic Polymers", Polymers, 6(5): 1544-1601, May 23, 2014.
Luo et al. "One-Pot Interfacial Polymerization to Prepare PolyHIPEs With Functional Surface", Colloid and Polymer Science, 293(6): 1767-1779, Published Online Mar. 25, 2015.
Madhusudhana et al. "Bicontinuous Highly Cross-Linked Poly(Acrylamide-Co-Ethyleneglycol Dimethacrylate) Porous Materials Synthesized Within High Internal Phase Emulsions", Soft Matter, 7: 10780-10786, Sep. 28, 2011. p. 10781, Left Col. Lines 11-15, PolyHIPES Synthesis Section, p. 10782, Left Col. Lines 28-37, p. 10785, Right Col. Lines 5-8, p. 10786, Left Col. Lines 3-5.
Maji et al. "Dual-Stimuli-Responsive L-Serine-Based Zwitterionic UCST-Type Polymer With Tunable Thermosensitivity", Macromolecules, 48(14): 4957-4966, Jul. 20, 2015.
Menner et al. "High Internal Phase Emulsion Templates Solely Stabilised by Functionalised Titania Nanoparticles", Chemical Communications, p. 4274-4276, 2007.
Menner et al. "Particle-Stabilized Surfactant-Free Medium Internal Phase Emulsions as Templates for Porous Nanocomposite Materials: Poly-Pickering-Foams", Langmuir, 23: 2398-2403, 2007.
Mülhaupt "Catalytic Polymerization and Post Polymerization Catalysis Fifty Years After the Discover of Ziegler's Catalysts", Macromolecular Chemistry and Physics, 204(2): 289-327, Feb. 2003.
Oh et al. "Injectable, Interconnected, High-Porosity Macroporous Biocompatible Gelatin Scaffolds Made by Surfactant-Free Emulsion Templating", Macromolecular Rapid Communications, 36(4): 364-372, Published Online Dec. 10, 2014.
Silverstein "Emulsion-Templated Porous Polymers: A Retrospective Perspective", Polymer, 55(1): 304-320, Available Online Sep. 11, 2013. Abstract, p. 262, Lines 20-22, p. 271, Lines 23-35, p. 273, Lines 10-11, Table S-4.
Silverstein et al. "PolyHIPEs—Porous Polymers From High Internal Phase Emulsions", Encyclopedia of Polymer Science and Technology, p. 1-24, 2010.
Streifel et al. "Porosity Control in High Internal Phase Emulsion Templated Polyelectrolytes Via Ionic Crosslinking", Journal of Polymer Science, Part A: Polymer Chemistry, 54(16): 2486-2492, Published Online Apr. 13, 2016. Abstract, p. 1, col. 1, Lines 6-10.
Tan et al. "Synthesis and Aqueous Solution Properties of Sterically Stabilized PH-Responsive Polyampholyte Microgels", Journal of Colloid and Interface Science, 309: 453-463, Available Online Feb. 16, 2007.
Tobushi et al. "The Influence of Shape-Holding Conditions on Shape Recovery of Polyurethane-Shape Memory Polymer Foams", Smart Materials and Structures, 13: 881-887, 2005.
Unknown "Salt Solution-Filled Elastomeric Monoliths Through Templating Within Pickering Emulsions: Release and Degradation", 1 P., Jul. 2016.
Yakacki et al. "Strong, Tailored, Biocompatible Shape-Memory Polymer Networks", Advanced Functional Materials, 18(16): 2428-2435, Aug. 22, 2008.
Zhang et al. "Doubly-Crosslinked, Emulsion-Templated Hydrogels Through Reversible Metal Coordination", Polymer, 126: 386-394, Jul. 18, 2017. Esp. Sections 2.2-2.4, Section 3.9.
Zhang et al. "Highly Porous, Emulsion-Templated, Zwitterionic Hydrogels: Amplified and Accelerated Uptakes With Enhanced Environmental Sensitivity", Polymer Chemistry, 9(25): 3479-3487, Published Online May 21, 2018.
Zhang et al. "PMMA Based Foams Made Via Surfactant-Free High Internal Phase Emulsion Templates", Chemical Communications, p. 2217-2219, 2009.
Zheng et al. "Metal-Coordination Complexes Mediated Physical Hydrogels with High Toughness, Stick-Slip Tearing Behavior, and Good Processability", Macromolecules, 49(24), 9637-9646, Dec. 2016.
Zhou et al. "Ion-Responsive Alginate Based Macroporous Injectable Hydrogel Scaffolds Prepared by Emulsion Templating", Journal of Materials Chemistry B: Materials for Biology and Medicine, 1(37): 4736-4745, Oct. 7, 2013.
Zhu et al. "Monolithic Supermacroporous Hydrogel Prepared From High Internal Phase Emulsions (HIPEs) for Fast Removal of Cu2+ and Pb2+", Chemical Engineering Journal, 284: 422-430, Available Online Sep. 9, 2015.
Official Action dated Jun. 29, 2020 from the US Patent and Trademark Office Re. U.S. Appl. No. 16/579,942. (26 pages).
Restriction Official Action dated Apr. 7, 2020 from the US Patent and Trademark Office Re. U.S. Appl. No. 16/231,627. (10 pages).
David et al. "Porous Polyurethanes Synthesized within High Internal Phase Emulsions", Journal of Polymer Science: Part A: Polymer Chemistry, 2002(23): 5806-5814, 2009.
International Preliminary Report on Patentability dated Jan. 30, 2020 From the International Bureau of WIPO Re. Application No. PCT/IL2018/050803. (7 Pages).
International Preliminary Report on Patentability dated Jan. 23, 20120 From the International Bureau of WIPO Re. Application No. PCT/IL2018/050751. (10 Pages).
Supplementary European Search Report and the European Search Opinion dated Jan. 22, 2020 From the European Patent Office Re. Application No. 17819486.6. (11 Pages).
Avraham "Liraz Avraham—Materials Engineer—GOI (Government of Israel)", LinkedIn, XP055657899, 6 P., Jan. 14, 2020.
Avraham et al. "Porous, Polysaccharide-Containing Poly(Urethane Urea) Monoliths Through Emulsion Templating", Department of Materials Science and Engineering, Technion—Israel Institute of Technology, XP055657891, 1 P., Dec. 31, 2015.
Warwar Damouny et al. "Hydrogel-Filled, Semi-Crystalline, Nanoparticle-Crosslinked, Porous Polymers From Emulsion Templating: Structure, Properties, and Shape Memory", Polymer, XP029381315, 82: 262-273, Available Online Nov. 23, 2015.
Official Action dated Sep. 30, 2021 from the US Patent and Trademark Office Re. U.S. Appl. No. 16/747,575. (28 pages).
Notice of Allowance dated Apr. 11, 2022 from US Patent and Trademark Office Re. U.S. Appl. No. 16/747,575. (10 pages).
Yi et al. "Interconnectivity of Macroporous Hydrogels Prepared via Graphene Oxide-Stabilized Pickering High Internal Phase Emulsions", Langmuir, 32(4): 982-990, Jan. 11, 2016.
Official Action dated Mar. 11, 2022 from US Patent and Trademark Office Re. U.S. Appl. No. 16/758,882. (29 pages).
Annabi et al. "Controlling the Porosity and Microarchitecture of Hydrogels for Tissue Engineering", Tissue Engineering Part B: Reviews, 16(4): 371-383, Mar. 17, 2010.
Official Action dated Apr. 18, 2022 from US Patent and Trademark Office Re U.S. Appl. No. 16/629,577. (46 pages).
Polymer Database "Poly(2-Ethylhexyl Acrylate)", Polymer Database, 2 P., 2015.
Interview Summary dated Jul. 18, 2022 from US Patent and Trademark Office Re. U.S. Appl. No. 16/629,577. (2 pages).

\* cited by examiner

POLYHIPE-BASED SUBSTANCE-RELEASING SYSTEMS

FIELD AND BACKGROUND OF THE INVENTION

The present invention, in some embodiments thereof, relates to material science, and more particularly, but not exclusively, to polyHIPE-based systems for sustained release of substances, such as fertilizers.

Sustained and optionally controlled release of a substance into an environment oftentimes involves a reservoir or a container of the substance being exposed to the environment, whereas this exposure leads to a migration of the substance from the reservoir into the environment over extended periods of time. Sustained substance-releasing systems are needed, for example, in cases where the level of the substance is needed over an extended period of time, when high concentrations of the substance are harmful to the environment, and/or when the substance is unstable in the environment. In the case of fertilizers for plant cultivation, the substance is consumed by the plants as well as being washed and decomposed over time, while the environment that includes plants, soil and possibly water reservoirs, may suffer from an overexposure to fertilizers; hence, fertilizers are preferred substances for sustained release systems.

A controlled-release fertilizer is typically a substance that is slow to dissolve in water and thus can be made into pellets and dispersed in or on the soil. Since the degree of solubility and exposure to moisture may be predicted, and the size of the pellets can be determined accordingly, some degree of controllability can be achieved such that the release period can be controlled. The release period can thus be determined by the degree of solubility of the chemical compounds in the soil moisture. Since conventional fertilizers are highly soluble in water, the fertilizer pellets may have an insoluble substance mixed therein or a semi-permeable coating applied thereon to slow dissolution while allowing nutrients to flow outward into the environment.

Numerous attempts have been made to form fertilizer particles and coat them with semi-stable or semi-permeable polymer coatings with some partial degree of success in slowing the rate of release of the fertilizer to the environment. Some attempts have been made to encapsulate liquid fertilizers in polymeric blister packs in order to control the release of fertilizer. Exemplary prior art documents, reading on polymer-coated fertilizer particles or liquids include U.S. Pat. Nos. 8,883,914, 8,211,201, 7,931,729, 7,847,144, 6,793,964, 6,576,035, 6,413,292, 6,391,454, 5,803,946, 5,413,856, 5,211,985, 5,089,041, 4,990,371, 4,969,947, 4,828,882, 4,804,403, 4,772,490, 4,759,956 and 4,756,738.

Porous polymeric materials have multitude of uses and applications in almost every aspect of life, from insulation to living tissue scaffolds, from textile and consumer products to industrial and agricultural projects, from leisure and play to medical and pharmaceutical, and the likes. A family of porous polymers, generally known as polyHIPEs, have been synthesized using high internal phase emulsions (HIPEs) as templates for the porous structure. These porous polymers include both hydrophobic polymers synthesized within water-in-oil (W/O) emulsions and hydrophilic polymers synthesized within oil-in-water (O/W) emulsions. The types of materials synthesized include copolymers, interpenetrating polymer networks (IPNs), biodegradable materials, organic-inorganic hybrids that can be pyrolyzed to porous inorganics, nanocomposites, and hydrophobic-hydrophilic bicontinuous polymers.

HIPEs are viscous, paste-like emulsions in which the dispersed, internal phase constitutes more than 74% of the volume, which has been chosen after the volume fraction in the cubic close packing of monodisperse hard spheres. HIPEs are inherently unstable and have a tendency to undergo phase inversion or coalescence. Only a few of the available emulsifiers are able to keep the major internal phase dispersed within the minor external phase. Such an emulsifier must be highly insoluble in the internal phase and its molecular packing must promote the formation of a convex interface between the external and internal phases. If the internal phase, external phase, or both phases contain monomers then a polymer can be synthesized within the HIPE. The biphasic structure of HIPEs can be maintained during polymerization under the right conditions. A polyHIPE, a continuous polymer envelope surrounding the dispersed droplets of the internal phase, results if the continuous, external phase contains monomers that are polymerized.

In some cases there is a difference between the microstructure of a HIPE and the structure of the resulting polyHIPE, however, the microstructure of the polyHIPE generally resembles (is templated by) the microstructure of the HIPE. Ruptures, termed holes, interconnects or windows, may develop at the thinnest points of the external phase envelope surrounding the dispersed internal phase (walls) under the right conditions (e.g., appropriate surfactant and internal phase contents). Such holes can also form during post polymerization processing. The formation of these holes transforms the discrete droplets of the internal phase into a continuous interconnected phase. Removal of the internal phase, which is now continuous, yields an open-cell void structure templated by the droplets that formed the HIPE's internal phase. The holes in the polymer wall yield a highly interconnected porous structure. The porous structure of polyHIPEs can be manipulated through variations in the structure of the HIPEs.

A polyHIPE where the polymer walls remain intact, as in the precursor HIPE, is referred to as a closed-cell polyHIPE. The closed-cell microstructure is sometimes misleading when inspected visually under an electron microscope, as the tightness of the walls is not challenged by mechanical, physical and chemical conditions. Since the voids in a closed-cell microstructure still contain the dispersed phase medium, the impermeability of the cells should be tested by loss of mass of the polyHIPE under drying conditions over a period of time. A cell structure that visually resembles a closed-cell structure but from which the internal phase can essentially be removed, is termed herein a quasi-closed-cell structure. Research done on polymerizing monomers in the external phases of emulsions prior to 1982 include the synthesis of seemingly closed-cell structures from HIPEs containing up to 85% water in the internal phase and with styrene or methyl methacrylate (MMA) in the external phase. Other research produced seemingly closed-cell polyHIPEs containing up to 90% water in the internal phase and a mixture of unsaturated polyester and styrene in the external phase. A true closed-cell polyHIPE was first provided in U.S. Pat. No. 9,062,245, wherein a Pickering stabilized HIPE was formed under conditions that ensured the locus of initiation of polymerization, and the locus of crosslinking the polymer was at the interface of the phases.

U.S. Pat. No. 6,376,565 and WIPO Patent Application WO/2001/032761 disclose the use of a durable HIPE-derived foam material in devices intended to provide water and fertilizer to plants.

U.S. Pat. Nos. 6,218,440 and 6,048,908, and WIPO Patent Application WO/1999/000187, provide porous crosslinked hydrophilic polymeric material having cavities joined by interconnecting pores wherein some of the cavities at the interior of the material communicate with the surface of the material, which can be used as carriers to provide sustained release of an agent, such as a fragrance, a cosmetic, an insecticide, a fertilizer, or water (e.g., in agricultural applications).

U.S. Pat. Nos. 5,767,168 and 6,231,960, and WIPO Patent Application WO/1996/022796, provide HIPE-derived polymeric biodegradable and/or compostable foams which can be used for "controlled release" of an active from some products, such as encapsulated pesticides, herbicides, and fertilizers.

U.S. Pat. Nos. 7,820,729 and 8,898,955, and WIPO Patent Application WO/2010/040996, disclose plant growth support medium comprising a sulfonated porous and elastic polymeric material capable of absorbing and storing fertilizers within its pores for direct-targeted slow and nutrient release to the plant roots.

SUMMARY OF THE INVENTION

Provided herein is a composition-of-matter having a microstructure of a HIPE, which comprises a polymer or an elastomer that releasably encapsulates a substance therein in the closed cells (voids/pores) thereof, wherein the encapsulated substance is a highly concentrated solution or a room temperature solid. The presently provided substance-releasing polyHIPEs can serve as a substance-releasing systems being designed to release the substance in a substantially sustainable manner, linearly and/or controllably.

According to an aspect of some embodiments of the present invention there is provided a composition-of-matter that includes an elastomer and a substance encapsulated therein, wherein:

the elastomer is characterized structurally by a microstructure that is templated by an external phase of a high internal phase emulsion (HIPE);

the microstructure being a closed-cell microstructure and the substance being encapsulated in pores of the closed-cell microstructure;

the substance comprises less than 80% water; and the substance is releasable through the elastomer when the composition-of-matter is exposed to an aqueous environment.

According to some embodiments of the invention, the HIPE is a water-in-oil emulsion.

According to some embodiments of the invention, substance is selected from the group consisting of an aqueous solution having at least 20% by weight of dissolved solids, a saturated aqueous solution, an emulsion, an aqueous suspension of solids, an aqueous colloid of solids, an ionic liquid, a room temperature solid, and any combination thereof.

According to some embodiments of the invention, the pores constituting at least 60% by volume of the total volume of the composition-of-matter.

According to some embodiments of the invention, the elastomer is having a modulus of less than 600 MPa.

According to some embodiments of the invention, the elastomer includes residues of at least one monomer characterized by forming a homopolymer having a $T_g$ lower than 20° C.

According to some embodiments of the invention, the elastomer includes residues of at least one monomer being selected from the group consisting of an acrylic acid-based monomer, an acrylate, a methacrylate, a siloxane, a diene, caprolactone, an ethylene oxide and any oligomer or mixture thereof.

According to some embodiments of the invention, the acrylate is selected from the group consisting of methyl acrylate, ethyl acrylate, propyl acrylate, butyl acrylate, isobutyl acrylate, tert-butyl acrylate, 2-ethylhexyl acrylate, hexyl acrylate, octyl acrylate, isooctyl acrylate, decyl acrylate, isodecyl acrylate, lauryl acrylate, stearyl acrylate, behenyl acrylate, 3,5,5-trimethylhexyl acrylate, 2-chloroethyl acrylate, isobornyl acrylate, tetrahydrofurfuryl acrylate, 4-tert-butylcyclohexyl acrylate, 2-phenoxyethyl acrylate, trimethylsilyl acrylate, pentabromobenzyl acrylate, 2,2,2-trifluoroethyl acrylate 2,2,3,3,3-Pentafluoropropyl acrylate, 1,1,1,3,3,3-hexafluoroisopropyl acrylate, 2,2,3,4,4,4-hexafluorobutyl acrylate, 2,2,3,3,4,4,4-heptafluorobutyl acrylate, 2,2,3,3,4,4,5,5,6,6,7,7-dodecafluoroheptyl acrylate, 3,3,4,4,5,5,6,6,7,7,8,8-tridecafluorooctyl acrylate, pentafluorophenyl acrylate, and any mixtures thereof.

According to some embodiments of the invention, the methacrylate is selected from the group consisting of methyl methacrylate, ethyl methacrylate, propyl methacrylate, butyl methacrylate, isobutyl methacrylate, tert-butyl methacrylate, sec-butyl methacrylate, 2-ethylhexyl methacrylate, hexyl methacrylate, cyclohexyl methacrylate, isodecyl methacrylate, lauryl methacrylate, stearyl methacrylate, isobornyl methacrylate, furfuryl methacrylate, tetrahydrofurfuryl methacrylate, 2-ethoxyethyl methacrylate, (trimethylsilyl) methacrylate, benzyl methacrylate, phenyl methacrylate, glycidyl methacrylate, poly(ethylene glycol) methacrylate, 3,3,5-trimethylcyclohexyl methacrylate, 2,2,2-trifluoroethyl methacrylate, 2,2,3,3-Tetrafluoropropyl methacrylate, 2,2,3,3,3-pentafluoropropyl methacrylate, 1,1,1,3,3,3-hexafluoroisopropyl methacrylate, 2,2,3,4,4,4-hexafluorobutyl methacrylate, 2,2,3,3,4,4,4-heptafluorobutyl methacrylate, 2,2,3,3,4,4,5,5-octafluoropentyl methacrylate, 3,3,4,4,5,5,6,6,7,7,8,8,8-tridecafluorooctyl methacrylate, 3,3,4,4,5,5,6,6,7,7,8,8,9,9,10,10,10-heptadecafluorodecyl methacrylate, 2,4,6-tribromophenyl methacrylate, pentafluorophenyl methacrylate, pentabromobenzyl methacrylate, and mixtures thereof.

According to some embodiments of the invention, the diene is selected from the group consisting of 1,4-butadiene and oligomers thereof, 2-methyl-1,3-butadiene and oligomers thereof, 2-chlorobuta-1,3-diene and oligomers thereof, a polybutadiene oligomer and any combination thereof.

According to some embodiments of the invention, the siloxane is selected from the group consisting of dimethylsiloxane and oligomers thereof, a polydimethylsiloxane oligomer and any combination thereof.

According to some embodiments of the invention, the elastomer includes a plurality of HIPE-stabilizing particles arranged at or near the interface of the elastomer with the substance.

According to some embodiments of the invention, the HIPE-stabilizing are polymeric particles or inorganic particles, which are modified to exhibit a plurality of polymerizable moieties and/or a plurality of initiation moieties attached thereon.

According to some embodiments of the invention, the elastomer is substantially devoid of crosslinks in a bulk thereof.

According to some embodiments of the invention, the elastomer includes crosslinks also in a bulk thereof (not only at the phase interface).

According to some embodiments of the invention, the closed-cell microstructure is characterized and identified such that less than 20% of the solid is released from the composition-of-matter over a period of at least 10 days when the composition-of-matter is exposed to the aqueous environment.

According to some embodiments of the invention, the closed-cell microstructure is characterized and identified such that less than 50% of the mass of the volatile part of the substance are lost from the composition-of-matter over a time period of at least 7 days of exposure to a vacuum of 0.05 atm at room temperature.

According to some embodiments of the invention, the elastomer is degradable (labile; biodegradable or generally capable of breaking down to benign and/or environmentally friendly byproducts).

According to some embodiments of the invention, the elastomer includes at least one labile unit and/or at least one polymer-degradation inducing agent.

According to some embodiments of the invention, the releasably encapsulated substance includes at least one fertilizer.

According to some embodiments of the invention, the fertilizer is selected from the group consisting of ammonium nitrate, ammonium polyphosphate, ammonium sulfate, anhydrous ammonia, ammonia derivatives, calcium nitrate, diammonium phosphate, gypsum (calcium sulfate dihydrate), urea and urea derivatives, urea nitrate, urea phosphate, urea sulfate, ureaform, isobutylidene diurea, methylene urea, potassium magnesium chloride, monoammonium phosphate, monocalcium phosphate, monopotassium phosphate, magnesium oxide or hydroxide, calcium oxide or hydroxide, potassium chloride, potassium sulphate, potassium magnesium sulfate, potassium nitrate, magnesium sulphate, magnesium nitrate, zinc sulphate, zinc nitrate, boric acid, borate salts, tetraborates, phosphoric acid, sulfuric acid, nitric acid, iron sulfate, manganese sulfate, and any combination thereof.

According to some embodiments of the invention, the fertilizer is a room temperature solid and/or a eutectic material selected from the group consisting of calcium nitrate tetrahydrate and other hydrates, calcium chloride hydrates, magnesium nitrate hydrates, magnesium sulfate, ammonium sulfate, urea ammonium nitrate (UAN) or as obtained from mixtures of urea with salts such as potassium or ammonium or calcium or magnesium nitrate, sulphate, bisulfate, phosphate, dihydrogenphosphate, monohydrogen phosphate, polysulfide or thiocyanate, and hydrates or combinations thereof.

According to some embodiments of the invention, the substance further includes any mineral or organic fertilizer, an herbicide, a pesticide, a plant growth stimulator and any other biostimulant, a plant protector and any other biocontrol agent, a plant disease control agent, an agent that enhance ectomycorrhiza in the rhizosphere, plant growth-promoting rhizobacteria and rhizofungi, a growth regulator, a hormone, plant extract, an amino acid, a peptide, an odoriferous material, a fragrance, a pH-adjusting agent, a colorant, a disinfectant, and any combination thereof.

According to some embodiments of the invention, the elastomer further includes a colorant, and any combination thereof.

According to an aspect of some embodiments of the present invention there is provided a process of preparing the composition-of-matter presented herein, the process is effected by:

providing a first liquid that includes the substance;
providing a second liquid that includes a pre-polymerization mixture of the elastomer and is immiscible in the first liquid;
adding dropwise the first liquid to the second liquid under stirring to thereby obtain a HIPE;
optionally adding a polymerization initiator and/or a polymerization catalyst to the HIPE; and
allowing the HIPE to polymerize,
thereby obtaining the composition-of-matter.

According to some embodiments of the invention, the organic solution further includes an emulsion stabilizer.

According to some embodiments of the invention, the emulsion stabilizer includes a plurality of particles being polymeric particles or inorganic particles, and being modified to exhibit a plurality of polymerizable moieties and/or a plurality of initiation moieties attached thereon.

According to an aspect of some embodiments of the present invention there is provided a substance-releasing system that includes the composition-of-matter presented herein.

According to some embodiments of the invention, the substance-releasing system presented herein is selected from the group consisting of a fertilizer-releasing system, a plant growth stimulant-releasing system, an herbicide-releasing system, a pesticide-releasing system, a disinfectant-releasing system, a fragrance-releasing system, and any combination thereof.

According to some embodiments of the invention, the substance-releasing system is a fertilizer-releasing system.

According to some embodiments of the invention, the substance-releasing system is a degradable, and/or a biodegradable and/or a labile system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a certain property or characteristic, refer to a process, a composition, a structure or an article that is totally devoid of the property or characteristic or characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is expected that during the life of a patent maturing from this application many relevant substance-releasing polyHIPEs will be developed and the scope of the phrase "substance-releasing polyHIPEs" is intended to include all such new technologies a priori.

BRIEF DESCRIPTION OF THE SEVERAL VIEWS OF THE DRAWINGS

Some embodiments of the invention are herein described, by way of example only, with reference to the accompanying drawings or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A-B present comparative plots showing the hydrolytic degradation profiles of two series of polyHIPEs, prepared according to some embodiments of the present invention, based on the free-radical copolymerization of EHA with a vinyl-terminated PCL oligomer (PCL-MA), encapsulating aqueous solutions of 4.4% $Na_2SO_4$, wherein FIG. 2A is of polyHIPEs prepared from MNP-stabilized HIPEs and FIG. 2B is of polyHIPEs prepared from PNP-stabilized HIPEs;

FIG. 4 presents a comparative plot showing the release profiles measured by electric conductance (EC) as a function of time in days in exemplary polyHIPE having sample Nos. 26, 67, 68, 76, 87, 88, 89, 90, 103 and 107, listed in Table 18, as.

Figure 1A:
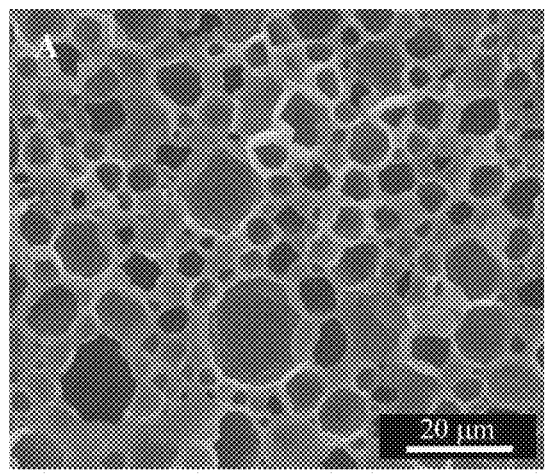
FIGS. 1A-D present SEM micrographs of some fertilizer-encapsulating polyHIPEs, according to some embodiments of the present invention, wherein FIG. 1A of sample kb-206 and FIG. 1B of sample kb-261 present EHA/PCL-MA2 copolymer polyHIPEs stabilized by MNPs and encapsulating UAN, and FIG. 1C of sample kb-260 and FIG. 1D of kb-265 present polyHIPEs stabilized by PNPs and encapsulating solid $Ca(NO_3)_2$.

DESCRIPTION OF SPECIFIC EMBODIMENTS
OF THE INVENTION

The present invention, in some embodiments thereof, relates to material science, and more particularly, but not exclusively, to polyHIPE-based systems for sustained release of substances, such as fertilizers.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The presently known polyHIPE-based foams, being soaked or loaded with a substance, have been suggested as substance-delivery and release systems. As discussed hereinabove, foams in general, and polyHIPE foams included, having a highly interconnected network of pores by definition of a foam, have been proposed and used as scaffolds and matrices for absorbing, storing and releasing fertilizers. However, foams and open-cell polyHIPE structures are crucially limited in their ability to be used for sustained, controllable and long-term release of substances since the exposure of the substance kept in the foams to the environment is immediate and continuous due to its highly accessible and enlarged surface area, leading to a sharp release peak in the release of the substance from the foam, referred to as a burst release phase, possibly trailed by a phase of low trickle of the reminder of the substance thereafter.

While searching for a more robust solution to the problem of short and intense burst in the release profile typical to the presently known polymeric-based substance-releasing systems, the present inventor has contemplated a porous polymer that will exhibit a prolongs and sustained release profile, stemming from being characterized by a closed-cell microstructure wherein the released substance is entrapped within the closed cells (pores; voids; droplets). The present inventor envisioned a highly concentrated aqueous fertilizer solution, or room temperature solid fertilizer, being releasably entrapped in a polyHIPE, while the release profile is controlled by the selection of components making the polyHIPE. It was further contemplated that the polyHIPE may comprise degradable components that can contribute to the controlled release mechanism.

While reducing the present invention to practice, polyHIPEs made from a wide range of polymeric substances and encapsulating a wide range of fertilizer compositions, including highly concentrated solutions, eutectics and phase-change materials, jointly referred to herein as room temperature solids, have been produced and tested for their contents release profiles. These fertilizer-encapsulating and releasing polyHIPE-based systems have been shown to sustainably release the encapsulated fertilizer over an extended period of time according to a release that is notably different than those typical to open-cell polyHIPE systems, inter alia by not exhibiting a burst release phase in which a substantial portion of the content is released.

According to an aspect of some embodiments of the present invention, there is provided a composition-of-matter that comprises a polymeric matrix and a substance releasably encapsulated in the polymer. The polymer of the composition-of-matter is essentially a monolithic (continuous) polymeric structure which has been formed from the continuous external phase of a high internal phase emulsion (HIPE), therefore this polymer has a microstructure that has been templated by the external phase of the HIPE. In some embodiments, the polymer is preferably an elastomer, namely a polymeric material having mechanical properties of a rubbery material by virtue of being elastic and ductile (a polymer that displays rubber-like elasticity). It is noted that polymers other than elastomers are contemplated within the scope of the present invention.

HIPE-Templated Elastomeric Compositions-of-Matter:

The phrase "HIPE-templated monolithic elastomeric composition-of-matter" is used herein interchangeably with the shortened phrases "elastomeric composition-of-matter", "monolithic composition-of-matter", "HIPE-templated composition-of-matter", or "composition-of-matter". By being templated by a HIPE, it is meant that the microstructure of the composition-of-matter presented herein is a projection of the microstructure of the external continuous phase of a HIPE, substantially before and specifically after it has undergone polymerization. Briefly, a HIPE is a plurality of tightly-packed spheroidal droplets of various sizes, constituting a liquid internal dispersed phase, separated by walls of a continuous liquid constituting the external continuous phase. The term "polyHIPE" can therefore be used as a structure-defining term to describe a highly porous monolithic structure of thin walls separating a plurality of tightly-packed voids, also referred to herein as pores or cells. The walls are typically thinner at tangential points of contact between what was tightly-packed droplets before polymerization, and thicker at the spaces between adjacent droplets. When a HIPE is polymerized to yield a polyHIPE, essentially the same microstructure is substantially preserved. It is noted that the polyHIPE is templated by the HIPE's external phase to the extent of minor dimensional shifts and possibly gas bubbles that may be formed during the polymerization process of some particular polymers, however, for the purpose of defining the structure of the composition-of-matter described herein, the polyHIPE preserves the structure of the external phase of the precursor HIPE. Hence the term "templated by", used in a phrase such as "a polymer/an elastomer having a microstructure templated by an external phase of a HIPE", is a structural term rather than a process-related term, since it relates the microstructure of the HIPE (or polyHIPE) to the microstructure of the resulting monolithic polymer/elastomer in the composition-of-matter, which is no longer an emulsion but a solid matter.

According to some embodiments of the present invention, the microstructure of the compositions-of-matter is structurally-templated by a water-in-oil (W/O) HIPE. In the formation of a polyHIPE from a W/O HIPE, the polymerization reaction of the external phase entraps the internal phase of the HIPE, wherein some embodiments of the present invention, the internal phase is essentially the substance being the dispersed internal phase, while the walls of the polymerized external phase serve as the encapsulation material of the entrapped substance.

In the context of embodiments of the present invention, the phrase "HIPE-templated monolithic elastomeric composition-of-matter", is used herein to refer to the presently provided and claimed macroscopic entities, which are characterized by being formed from an elastomer (an elastic polymer) releasably entrapping therein a highly concentrated aqueous solution (at least 20% by weight solids dissolved in an aqueous media) of a substance or a room temperature solid substance (regarded as a 100% weight solids), and having a closed-cell microstructure projected by its structural precursor being a high internal phase emulsion (HIPE), whereas the entrapped substance being encapsulated in the pores (voids; cells) of that closed-cell microstructure.

In some embodiments of the present invention, the pores in the polyHIPE, which are filled with and encapsulate the substance, constitute at least 60% by volume of the total volume of the composition-of-matter. In some embodiments the pores constitute at least 65%, 70%, 75%, 80%, 85%, 90% or 95% of the total volume of the composition-of-matter.

Closed-Cell Microstructure:

The composition-of-matter presented herein can be designed to have a closed-cell microstructure, wherein at least the majority of the voids in the elastomer (more than 90%) are substantially not interconnected and the contents of which is not accessible from outside the voids and is not easily exposed to the surrounding environment or and cannot be easily removed without rupturing the elastomer walls. Without being bound by a particular theory, a closed-cell microstructure is afforded when the integrity of the continuous walls of the HIPE is preserved intact throughout the polymerization process. In the context of embodiments of the present invention, the term "closed-cell microstructure" is meant to encompass quasi-closed-cell microstructure, wherein the closedness of the cells is defined, characterized or estimated according to criteria presented hereinbelow.

When a polyHIPE having a closed-cell microstructure is placed under desiccating conditions, the dispersed phase or the remainder thereof, cannot be easily removed as the droplets are entrapped in the voids. Such closed-cell microstructure is also referred to herein as a "true" closed-cell microstructure.

One way of defining the closedness of a polyHIPE microstructure is by recording the initial mass of the composition-of-matter and the rate of a change in that mass over a period of time during which the composition is subjected to conditions that are conducive to drying the entrapped phase (e.g., vacuum). The change in mass refers to the vaporizable part of the polyHIPE, primarily the solvent in the entrapped substance, which is typically water, while the elastomer and the dissolved solids are not expected to evaporate under the drying conditions and their mass is not expected to change under drying conditions. The mass of the entrapped internal phase can be assessed, based on the amount and composition of the internal phase prior to the polymerization step, however, in some embodiments some of the solvent of the internal phase may evaporate to some extent during the HIPE formation and polymerization. Thus, according to some embodiments of the present invention, the composition-of-matter presented herein is considered as having a closed-cell microstructure when it is exposed to desiccating vacuum at room temperature and loses less than 50% of the mass of the vaporizable/volatile part of the internal phase of the HIPE over a time period of 7 days. In some embodiments, the desiccating vacuum is lower than 1 atm, typically 0.5-0.05 atm or less. In some embodiments, the closed-cell microstructure is characterized such that less than 50% of the mass of the vaporizable/volatile part of the entrapped substance are lost from the composition-of-matter over a time period of at least 7 days of exposure to a vacuum of 0.05 atm at room temperature (desiccating vacuum conditions). In some embodiments, the mass of the vaporizable/volatile part of the entrapped substance decreases by less than 55%, 60%, 65% or less than 75% over a period of at least 7 days under desiccating vacuum conditions.

An alternative way of defining the closedness of a polyHIPE microstructure is by assessing direct accessibility to the entrapped substance. In structures having an open-cell microstructure (e.g., foams), the substance incorporated into such structures is in direct contact with the surrounding medium (a direct contact interface), these systems are typically identified by exhibiting a high burst release. In the case of some embodiments of the present invention, the substance reservoir is a plurality of individually closed pores (voids; cells) distributed within an elastomer (an elastic polymer) and filled with the substance, namely the interface between the reservoir and the environment is a thin polymeric membrane being the walls of the polyHIPE. This wall or barrier is permeable or semi-permeable to the substance or at least to some components thereof, however if the cells are closed, there is no direct contact between the substance and the receiving environment. In embodiments where the entrapped substance is soluble in water and the resulting aqueous solution conducts electricity, the solvent-accessibility assessment can be carried out by, for example, placing the composition-of-matter in water and monitoring the increase in electric conductance as a function of time, which increases as the entrapped substance permeates through the walls. It is assumed that a closed-cell microstructure will not show a significant burst release phase in the substance-release profile, hence a low burst release, or no observable burst release, has a structural meaning in the context of embodiments of the present invention. Definitions of release profile and burst release are presented hereinbelow.

Notwithstanding the above, in some embodiments of the present invention, the substance entrapped in the closed-cell microstructure of the composition-of-matter presented herein, can be released from the encapsulating polymer. The release of the releasably encapsulated substance can also be effected by compromising the integrity of the encapsulating polymeric walls. Once the encapsulating polymeric walls are fractured, broken, dissolved or otherwise lose their capacity as physical barrier to the encapsulated substance, the substance, or at least a component thereof, is no longer entrapped. For example, if the encapsulating polymeric walls are stressed sufficiently to cause substantial deformation and mechanical failure, by applying, e.g., compressive strain to the composition-of-matter, the walls will fracture thereby exposing and releasing the encapsulated substance that was entrapped therein.

Substance-Releasing System:

A typical substance-releasing system, also referred to herein interchangeably as a substance release system and a sustained release system, relevant in the context of the present embodiments, comprises a reservoir containing a predetermined and exhaustible amount of the substance, and an interface between the substance's reservoir and the surrounding environment that the system is placed within. Typically, substance release commences at the initial time point when the system is exposed to the environment, and in some embodiments follows typical diffusion-controlled kinetics. In the context of embodiments of the present invention, the (dissolved) solids, which are releasably entrapped/encapsulated in the elastomer, are releasable through the elastomer when the composition-of-matter is exposed to an aqueous environment.

In some applications it is desirable to deliver a large amount of a substance at a relatively short period of time, however, for most substance-releasing applications, the initial burst stage releases more substance than is necessary (and in some cases more than optimal, e.g., at a harmful level) while depleting the reservoir from the substance, leading to premature shortening of the delivery period. Such problems are common to most substance-releasing systems wherein the substance is in direct contact with the environment, as in substance-releasing systems based on polymeric foams which tend to deploy their content, namely the substance, too rapidly.

In the context of embodiments of the present invention, the composition-of-matter presented herein serves as an effective substance-releasing system, since the interface between the substance's reservoir and the environment is essentially not a direct contact but rather a polymer/elastomer (a typically thin polymeric membrane in the form of a polyHIPE wall) which can be designed to exhibit predetermined substance-release profile that is characterized by the presence of a minimal burst release, or lack of an initial burst release, and characterized by the duration of a sustained release.

A "substance-release profile" is a general expression which describes the temporal concentration of a substance (e.g., a solute) as measured in the environment or medium in which the system is present as a function of time, while the slope of a concentration versus time represents the rate of release at any given time point or range. A substance-release profile may be sectioned into rate dependent periods, or phases, whereby the rate is rising or declining linearly or exponentially, or staying substantially constant. Some of the most commonly referred to rates include burst release and the sustained release.

The release rate known as "burst release", as used herein, is consistent with a rapid release of the substance into the bodily site of interest, and is typically associated with an exponential increase of the substance's concentration, growing exponentially from zero to a high level at a relatively short time. Typically, the burst release section of the substance-release profile ends briefly and then gradually changes to a plateau, or a sustained release phase in the release profile.

The phrase "sustained release", as used herein, refers to the section of the substance-release profile which comes after the burst release part, and is typically characterized by constant (substantially linear) rate and relative long duration over an extended periods of time until the substance's reservoir is exhausted.

The main differences between the burst and the sustain phases of a substance-release profile are therefore the rate (slope characteristics) and duration, being exponential and short for the burst release, and linear and long for the sustained release; and both play a significant role in designing systems for substance release, as presented herein. In most cases, the presence of both a burst release phase and a sustained release phase is unavoidable and stems from chemical and thermodynamic properties of the substance-releasing system.

In the context of embodiments of the present invention, the phrase "high burst release" is an attribute of a substance-releasing system, as described herein, which refers to the amount of the substance that is being released from the system during the initial stage of exposure of the system to the environment of its action (e.g., aqueous medium, irrigated soil etc.), wherein the amount is in excess of 20% of the total amount of the substance contained (encapsulated) in the system and the initial phase is within the first 10 days from commencement of exposure. Alternatively, a high burst release is defined as the release of 20% of the contained substance within the first 5 days of exposure, or release of 20% of the contained substance within the first 15 days of exposure, or release of 20% of the contained substance within the first 20 days of exposure, or release of 20% of the contained substance within the first 25 days of exposure. In some embodiments of the present invention, "high burst release" describes an attribute of a substance-releasing system, as described herein, in which 30%, 40%, 50%, 60% and even higher percentages of the substance are released during the first 10 days of exposing the system to an environmental medium. Any value between 20% and 100% of the substance are contemplated.

Accordingly, the phrase "low burst release" refers to substance-releasing systems wherein less than 20% of the contained substance is released within the first 10 days of exposure. Alternatively, a low burst release is defined as the release of 20% or less of the contained substance within the first 25 days of exposure, or release of 20% or less of the contained substance within the first 20 days of exposure, or release of 20% or less of the contained substance within the first 15 days of exposure, or release of 20% or less of the contained substance within the first 5 days of exposure. In some embodiments of the present invention, "low burst release" describes an attribute of a substance-releasing system, as described herein, in which 15%, 10%, 5% and even lower percentages of the substance are released during the first 10 days of exposing the system to an environmental medium. Any value between 20% and 1% of the substance are contemplated.

According to some embodiments of the present invention, the closed-cell microstructure of the composition-of-matter presented herein, is identified and characterized by a low burst release such that less than 20% of the entrapped (dissolved) solids are released from the composition-of-matter over a period of at least 10 days when the composition-of-matter is exposed to the aqueous environment. In some embodiments, the substance-release profile exhibited from the presently disclosed composition-of matter is essentially devoid of an exponential phase.

Alternatively, or at least 95% of the time during which the substance is released from the composition-of-matter is not exponential (substantially linear) as can be assessed qualitatively by inspecting the substance-release profile. In some embodiments the substance-release profile is substantially linear for at least 90% of the time during which the substance is released from the composition-of-matter, or at least 85%, 80% 75%, or at least 70%.

According to some embodiments of the present invention, the time period over which the composition-of-matter presented herein is capable of exhibiting a sustained (substantially linear or constant over time) release profile when in contact with an aqueous environment, such as wet soil, ranges from 1 month to one year. In some embodiments, the time period is more than 1 month, or more than 2, 3, 4, 5, 6, 7, 8, 9, 10, 11, 12, 13, 14, 15, 16, 17, 18, 19, 20, 21, 22, 23, 24 months or more. In some embodiments, the time period ranges from 1 to 2 months, 2-3 months, 3-4 month, 4-5 months, 5-6 months, 6-7 months, 7-8 months, 8-9 months, 9-10 months, 10-11 months, or 11-12 months.

The composition-of-matter presented herein is highly effective serving as a substance-releasing system in moist and wet environments, wherein such an environment is defined as a medium that can contain water to some extent and that can come in direct physical contact with the composition-of-matter. According to some embodiments, an environment into which the composition-of-matter presented herein can release its encapsulated substance, at least to some extent, includes water, aqueous solutions, soil, synthetic plant bed material, wood and wood particles, humus, sand, silt, gravel, loam, clay, any material that can become wet, soaked or moist with water, and any combination thereof.

In some embodiments, the aqueous environment into which the composition-of-matter presented herein can release its encapsulated substance, at least to some extent, is characterized by having a water content that ranges from 0.01 to 1 volume per volume (vol/vol), wherein water is considered as having a water content of 1; or from 0.01 to 0.25 vol/vol, which is considered the minimum soil moisture at which a plant wilts; or from 0.1 to 0.35 vol/vol, which is considered to be the moisture in soil about 2-3 days after rain or irrigation; or from 0.2 to 0.5 vol/vol, which is considered as the moisture of fully saturated soil (equivalent to effective porosity of the soil); or from 0.4 to 0.75 vol/vol, or from 0.5 to 1 vol/vol. In some embodiments, the water content of the aqueous environment to which the composition-of-matter presented herein can release its encapsulated substance upon contact is at least 0.01 vol/vol, 0.02 vol/vol, 0.04 vol/vol, 0.06 vol/vol, 0.08 vol/vol, 0.1 vol/vol, 0.12 vol/vol, 0.14 vol/vol, 0.16 vol/vol, 0.18 vol/vol, 0.2 vol/vol, 0.22 vol/vol, 0.24 vol/vol, 0.26 vol/vol, 0.28 vol/vol, 0.3 vol/vol, 0.32 vol/vol, 0.34 vol/vol, 0.36 vol/vol, 0.38 vol/vol, 0.4 vol/vol, 0.42 vol/vol, 0.44 vol/vol, 0.46 vol/vol, 0.48 vol/vol, 0.5 vol/vol, 0.52 vol/vol, 0.54 vol/vol, 0.56 vol/vol, 0.58 vol/vol, 0.6 vol/vol, 0.62 vol/vol, 0.64 vol/vol, 0.66 vol/vol, 0.68 vol/vol, 0.7 vol/vol, 0.72 vol/vol, 0.74 vol/vol, 0.76 vol/vol, 0.78 vol/vol, 0.8 vol/vol, 0.82 vol/vol, 0.84 vol/vol, 0.86 vol/vol, 0.88 vol/vol, 0.9 vol/vol, 0.92 vol/vol, 0.94 vol/vol, 0.96 vol/vol, 0.98 vol/vol or at least 0.99 vol/vol.

Elastomer:

As stated hereinabove, the composition-of-matter presented herein is contemplated with any polymeric material that can form a closed-cell polyHIPE and entrap in its pores a highly concentrated solution of a substance or a room temperature solid. Preferably, the polymer is an elastomer, and the elastomer of the composition-of-matter is essentially the monolithic (continuous) polymeric structure which has been formed from the polymerization reaction in the continuous external phase of a high internal phase emulsion (HIPE), therefore this elastomer has a microstructure that has been templated by the external phase of the HIPE.

The elastomer in some embodiments of the present invention is selected such that it can afford a closed-cell polyHIPE with the substance encapsulated in its pores. By being soft and deformable, the walls of the elastomer are capable of withstanding deformation and swelling without cracking or breaking, thereby preserving the closed-cell microstructure during preparation of the composition-of-matter, during post-synthesis manipulation, storage and use. Without being bound by any particular theory, it is assumed that the soft, ductile and deformable properties of the polyHIPE allows osmotic swelling to occur in the composition-of-matter presented herein when it is exposed to wet conditions, and the osmotic swelling may be one of the driving forces conferring partial permeability of the encapsulated substance, leading to the sustained-release profile characteristic thereto.

The mechanical properties of the composition-of-matter are derived from the structural, mechanical and chemical composition of the polyHIPE and the encapsulated substance entrapped therein. While it is possible to describe the chemical composition and the macroscopic and microscopic structure of the polyHIPE, the overall mechanical properties of the composition-of-matter depend also on the presence of the encapsulated substance. For example, if the voids in the composition-of-matter could be emptied from their contents, the mechanical properties of the resulting "empty polyHIPE" would not be the same as those of the "full polyHIPE", and the differences in mechanical properties are expected also for different entrapped substances, including differences between encapsulated liquids versus encapsulated solids. Nonetheless, as known in the art of polymers and elastomers, one can select monomers and combinations of monomers and use specific crosslinking in order to afford the required softness, ductility and deformability of the elastomer from which the polyHIPE is made.

Open-cell polyHIPEs generally exhibit compressive stress-strain curves typical of foams. These curves contain three distinct regions: a linear elastic stress-strain region at low strains from which the modulus (E) can be derived; a stress plateau region; a densification or crushing region exhibiting a rapid rise in stress. The modulus and the stress plateau decrease with decreasing density for the same wall material, reflecting the volumetric replacement of solid polymer with air. The modulus of polyHIPEs is also dependent upon the modulus of the wall material (the polymer/elastomer). Typical compressive stress-strain curves of quasi-closed-cell (capsule-like structures that can be dried within a week in desiccating conditions) and "true" closed-cell polyHIPEs differ from those of open-cell polyHIPEs essentially in the absence of a stress plateau, as the substance that is entrapped in the polymer's voids cannot be displaced rapidly and/or easily. The voids of a quasi-closed-cell polyHIPE contain air after the non-reactive part of the internal phase has been removed. Without being bound by any particular theory, it seems that the rate of the displacement of air from the voids of a quasi-closed-cell polyHIPE is slower than the rate of compressing the sample's height, thus registration as resistance to the compression. The nature of the entrapped substance governs the compressive stress-strain curve essentially according to its own compressive attributes. In the case of a condensed entrapped substance, the compressive stress-strain curve will have a steep incline that could be broken at points of mechanical failure of the closed-cell polyHIPE. It has been observed by the present inventors, that some of the compositions-of-matter do not exhibit a break, although the ejection of the non-reactive part of the internal phase, and the flattening of the final sample, is similar.

Mechanical properties of a polymer are typically referred to in terms of stress-strain relationships, such as the compressive strain at failure (compressive failure strain) or the ratio of stress to strain at low strains, known as the modulus of the polymer. The modulus of a stiff polymer far below its Tg (glass transition temperature) can be orders of magnitude larger than the modulus of a flexible elastomer far above its Tg.

In some embodiments, the elastomer comprising the polyHIPE is characterized by a modulus (E) of less than 600 MPa. Optionally, the modulus of the elastomer, or of the composition-of-matter, is less than 600 MPa, 550 MPa, 500 MPa, 450 MPa, 400 MPa, 350 MPa, 300 MPa, 250 MPa, 200 MPa, 150 MPa, 100 MPa, 90 MPa, 80 MPa, 70 MPa, 60 MPa, 50 MPa, 40 MPa, 30 MPa, 20 MPa, 10 MPa, 9 MPa, 8 MPa, 7 MPa, 6 MPa, 5 MPa, 4 MPa or less than 3 MPa.

The external phase of the precursor HIPE can be formed from monomers that, when polymerized, afford an elastomer with the desired mechanical properties. For example, the elastomer has residues of at least one monomer, which is selected by its capacity to form a homopolymer having a glass transition temperature ($T_g$) lower than about 20° C.

The elastomer of the composition-of-matter presented herein, according to some embodiments of the present invention, is capable of absorbing aqueous media also when considered as a polymeric material per-se (not necessarily in the context of the composition-of-matter). Without being bound by any particular theory, it is assumed that the ability to swell and absorb water, which is common to both the composition-of-matter and the elastomer by itself, is related to the ability of the substance encapsulated therein to permeate through the walls of the polyHIPE. In some embodiments the equilibrium absorption of aqueous medium exhibited by the elastomer forming the composition-of-matter presented herein is at least 2 gram of aqueous medium per gram of elastomer (g/g), or at least 4 g/g, 6 g/g, 8 g/g, 10 g/g, 12 g/g, 14 g/g, 16 g/g, 18 g/g, 20 g/g, 25 g/g, 30 g/g, 35 g/g, 40 g/g, 45 g/g, 50 g/g, 60 g/g, 70 g/g, 80 g/g, 90 g/g, 100 g/g, 150 g/g, 200 g/g, 250 g/g, 300 g/g, 350 g/g, 400 g/g, 450 g/g, 500 g/g, 600 g/g, 700 g/g, 800 g/g, 900 g/g or at least 1000 grams aqueous medium per one gram of the elastomer.

The elastomer of the composition-of-matter presented herein, according to some embodiments of the present invention, is degradable or biodegradable, jointly referred to herein as "labile", making the composition-of-matter more environmentally friendly. In some embodiments, the elastomer is degradable by, but not limited to, spontaneous bond cleavage (e.g., spontaneous bond hydrolysis), degradation by exposure to ambient conditions (humidity, oxidation, UV radiation, heat etc.), chemical degradation effected by a chemical found in the environment or in the encapsulated substance, enzymatic degradation conferred by microorganisms in the environment, and any polymer degradation mechanism known in the art. Degradability can be achieved by cleaving bonds in the main chain of the polymer/elastomer, by cleaving crosslinking bonds, or by a combination thereof.

Degradability of the elastomer can be achieved by using a liable elastomer, or by using labile units as part of the external phase of the HIPE, such that these labile units are incorporated into the elastomer during the polymerization process to afford an elastic labile co-polymer. Such labile units include labile monomers, labile oligomers, labile crosslinking agents, block copolymers with a labile block and graft copolymers with a labile graft.

In the context of the present embodiments, an oligomer is a short polymer, having from 2-100 residues. Degradable polymers and oligomers include, but are not limited to, polylactic acid (PLA), polyglycolic acid (PGA), poly(lactic-co-glycolic acid) (PLGA), polycaprolactone (PCL), polyorthoesters, polydioxanones, polyanhydrides, poly(trimethylene carbonates), polyphosphazenes and the likes. The incorporation of at least some labile monomers, labile oligomers and/or labile crosslinking agents, into the pre-polymerization mixture, requires adjustment of the monomer composition so as to afford an elastomer with the required modulus, which is within the skills of an expert in the field of polymer synthesis.

In some embodiments, the pre-polymerization mixture, which constitutes the external phase of the HIPE, is formulated to include an additive that renders the resulting elastomer labile without becoming a part of the main-chain, a side-chain or a crosslink of the polymer. These additives, or polymer-degradation inducing agents, typically based on metal ions such as Fe, Co, Mn, Ce, Cu and Ni, or organic acid salts such as benzoates, hexanoates, octanoates and naphthenates, form weak links in a polymer chain that oxidize to render the polymer unstable and labile through exposure to light and oxygen (photodegradable; oxydegradable).

Any person skilled in the art would find ample guidance to the formation of labile polymers, for example in U.S. Pat.

Nos. 4,056,499, 5,681,873, 5,874,486, 6,277,899, 7,037,983, 7,812,066, 7,816,424, 8,222,316 and 8,513,329.

In some embodiments of the present invention, the elastomer is formed primarily from the residues of monomers that confer elasticity in the resulting polymer, such as any acrylic acid-based monomer, acrylate monomers, alkyl acrylate monomers, fluorinated and/or chlorinated acrylates, siloxane monomers, diene monomers, caprolactone oligomers, ethylene oxide oligomers and any oligomer or mixture thereof.

Optional oligomers include, for a non-limiting example, polyisoprene (PI) oligomers (either 1,2-PI or hydroxy-terminated PI which can become vinyl-terminated), polychloroprene oligomers, nitrile rubber oligomers, ethylene-propylene rubber oligomers with terminal reactive groups, ethylene-propylene rubber (EPR) oligomers, ethylene-propylene-diene-monomer (EPDM) rubber oligomers, butadiene oligomers, isoprene oligomers, ethylene oligomers and the likes.

Acrylic acid-based monomers suitable for use in the formation of the elastomer, according to some embodiments of the present invention, include compounds defined by Formula I:

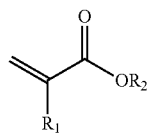

Formula I wherein $R_1$ can be, for example, H, methyl or ethyl, and $R_2$ can be, for example, $C_{1-10}$ substituted or unsubstituted, saturated or unsaturated alkyl, cycloalkyl, aryl, heteroalkyl and heteroaryl.

As used herein, the term "alkyl" describes an aliphatic hydrocarbon including straight chain and branched chain groups. The alkyl may have 1 to 10 carbon atoms, and may be branched or unbranched, substituted or unsubstituted. According to some embodiments of the present invention, the alkyl is a low (or lower) alkyl, having 1-4 carbon atoms (namely, methyl, ethyl, propyl and butyl).

Whenever a numerical range; e.g., "1-10", is stated herein, it implies that the group, in this case the alkyl group, may contain 1 carbon atom, 2 carbon atoms, 3 carbon atoms, etc., up to and including 10 carbon atoms. In some embodiments, the alkyl is a lower alkyl, including 1-6 or 1-4 carbon atoms. For example, a $C_{1-6}$ alkyl group refers to any one of the moieties methyl, ethyl, n-propyl, i-propyl, n-butyl, s-butyl, i-butyl, t-butyl, n-pentyl, t-pentyl, neopentyl, i-pentyl, s-pentyl, 3-pentyl, n-hexyl, 2-methylpentyl, 3-methylpentyl, 2,2-dimethylbutyl and 2,3-dimethylbutyl.

When substituted, the substituent can be, for example, a substantially linear alkyl, a substantially cyclic alkyl (cycloalkyl), an alkenyl, an alkynyl, an aryl, a heteroaryl, a hydroxy, an alkyl interrupted by an O atom (alkoxy), an alkyl terminated by an O atom (a hydroxyalkyl), an alkyl interrupted by N atom (a secondary or tertiary amine), an alkyl terminated by an N atom (a primary amine), and/or a halogen (halo) substituent. The term "alkyl", as used herein, may also encompasses in some embodiments, saturated or unsaturated hydrocarbon, hence this term further encompasses alkenyl and alkynyl.

The term "alkenyl" describes an unsaturated alkyl, as defined herein, having at least two carbon atoms and at least one carbon-carbon double bond. The alkenyl may be substituted or unsubstituted by one or more substituents, as described hereinabove.

The term "alkynyl", as defined herein, is an unsaturated alkyl having at least two carbon atoms and at least one carbon-carbon triple bond. The alkynyl may be substituted or unsubstituted by one or more substituents, as described hereinabove.

The terms "alicyclic" and "cycloalkyl", refer to an all-carbon monocyclic or fused ring (i.e., rings which share an adjacent pair of carbon atoms), branched or unbranched group containing 3 or more carbon atoms where one or more of the rings does not have a completely conjugated pi-electron system, and may further be substituted or unsubstituted. The cycloalkyl can be substituted or unsubstituted by one or more substituents, as described hereinabove.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl hereinabove.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl group may be substituted or unsubstituted as described for alkyl hereinabove.

Monomers suitable for use in the formation of the elastomer, include, without limitation, methyl acrylate, ethyl acrylate, hydroxyethyl acrylate, phenoxyethyl acrylate, propyl acrylate, butyl acrylate, 2-ethylhexyl acrylate, glycidyl acrylate, ethylene glycol diacrylate, diethylene glycol diacrylate, 1,6-hexanediol diacrylate, trimethylolpropane triacrylate, pentaerythritol triacrylate, pentaerythritol tetraacrylate, methyl methacrylate, ethyl methacrylate, hydroxyethyl methacrylate, dimethylaminoethyl methacrylate, propyl methacrylate, butyl methacrylate, 2-ethylhexyl methacrylate, glycidyl methacrylate, ethylene glycol dimethacrylate, diethylene glycol dimethacrylate, triethylene glycol dimethacrylate, tetraethylene glycol dimethacrylate, trimethylolpropane trimethacrylate, bisphenol A dimethacrylate, and mixtures thereof.

Exemplary acrylate monomers include, without limitation, methyl acrylate, ethyl acrylate, propyl acrylate, butyl acrylate, isobutyl acrylate, tert-butyl acrylate, 2-ethylhexyl acrylate, hexyl acrylate, octyl acrylate, isooctyl acrylate, decyl acrylate, isodecyl acrylate, lauryl acrylate, stearyl acrylate, behenyl acrylate, 3,5,5-trimethylhexyl acrylate, 2-chloroethyl acrylate, isobornyl acrylate, tetrahydrofurfuryl acrylate, 4-tert-butylcyclohexyl acrylate, 2-phenoxyethyl acrylate, trimethylsilyl acrylate, pentabromobenzyl acrylate, 2,2,2-trifluoroethyl acrylate 2,2,3,3,3-Pentafluoropropyl acrylate, 1,1,1,3,3,3-hexafluoroisopropyl acrylate, 2,2,3,4,4,4-hexafluorobutyl acrylate, 2,2,3,3,4,4,4-heptafluorobutyl acrylate, 2,2,3,3,4,4,5,5,6,6,7,7-dodecafluoroheptyl acrylate, 3,3,4,4,5,5,6,6,7,7,8,8-tridecafluorooctyl acrylate, pentafluorophenyl acrylate, and any mixtures thereof.

Exemplary methacrylate monomers include, without limitation, methyl methacrylate, ethyl methacrylate, propyl methacrylate, butyl methacrylate, isobutyl methacrylate, tert-butyl methacrylate, sec-butyl methacrylate, 2-ethylhexyl methacrylate, hexyl methacrylate, cyclohexyl methacrylate, isodecyl methacrylate, lauryl methacrylate, stearyl methacrylate, isobornyl methacrylate, furfuryl methacrylate, tetrahydrofurfuryl methacrylate, 2-ethoxyethyl methacrylate, (trimethylsilyl)methacrylate, benzyl methacrylate, phenyl methacrylate, glycidyl methacrylate, poly(ethylene glycol) methacrylate, 3,3,5-trimethylcyclohexyl methacrylate, 2,2,2-trifluoroethyl methacrylate, 2,2,3,3-Tetrafluoropropyl methacrylate, 2,2,3,3,3-pentafluoropropyl methacrylate, 1,1,1,3,3,3-hexafluoroisopropyl methacrylate, 2,2,3,4,4,4-hexafluorobutyl methacrylate, 2,2,3,3,4,4,4-heptafluorobutyl methacrylate, 2,2,3,3,4,4,5,5-octafluoropentyl methacrylate, 3,3,4,4,5,5,6,6,7,7,8,8,8-tridecafluorooctyl methacrylate, 3,3,4,4,5,5,6,6,7,7,8,8,9,9,10,10,10-heptadecafluorodecyl methacrylate, 2,4,6-tribromophenyl methacrylate, pentafluorophenyl methacrylate, pentabromobenzyl methacrylate, and mixtures thereof.

Exemplary diene monomers include, without limitation, 1,4-butadiene and oligomers thereof, 2-methyl-1,3-butadiene and oligomers thereof, 2-chlorobuta-1,3-diene and oligomers thereof, a polybutadiene oligomer and any combination thereof.

Exemplary siloxane monomers include, without limitation, dimethylsiloxane and oligomers thereof, a polydimethylsiloxane oligomer and any combination thereof.

In some embodiments, the elastomer is selected from the group consisting of a rubber, natural polyisoprene such as cis-1,4-polyisoprene natural rubber (NR) and trans-1,4-polyisoprene gutta-percha, synthetic polyisoprene (isoprene rubber), polybutadiene (butadiene rubber), chloroprene rubber, polychloroprene, neoprene, baypren, butyl rubber (copolymer of isobutylene and isoprene), halogenated butyl rubbers (chloro- and bromo-butyl rubber), styrene-butadiene rubber (copolymer of styrene and butadiene), nitrile rubber (copolymer of butadiene and acrylonitrile), hydrogenated nitrile rubbers (therban and zetpol), ethylene propylene rubber (a copolymer of ethylene and propylene), ethylene propylene diene rubber (a terpolymer of ethylene, propylene and a diene-component), epichlorohydrin rubber, polyacrylic rubber, silicone rubber, fluorosilicone rubber, fluoroelastomers, viton, tecnoflon, fluorel, aflas and dai-el, perfluoroelastomers, tecnoflon PFR, kalrez, chemraz, perlast, polyether block amides, chlorosulfonated polyethylene (Hypalon), ethylene-vinyl acetate, polysulfide rubber and elastolefins.

In some embodiments, the external phase includes optional ingredients that form a part of the elastomer. In some embodiments, the optional ingredients in the external phase are meant to confer some properties to the composition-of-matter, such as colorants and the likes.

Emulsion Stabilizers:

One of the challenges in forming a polyHIPE is stabilizing the precursor HIPE thoughout the polymerization reaction. Typically, a HIPE is stabilized by an emulsion stabilizer, which in the context of embodiments of the present invention, include surface active agents, surfactants and solid particles.

In some embodiments, emulsion stabilization is afforded in the context of a Pickering emulsion, which is an emulsion that is stabilized by solid particles, such as surface-modified colloidal silica (silica nanoparticles) that adsorb onto the interface between the two phases. In the context of embodiments of the present invention, the solid particles can be modified so as to present certain functionalities on their surface, referred to herein as polymerizable moieties, which can take part in the polymerization reaction. For example, silanes bearing silica particles can be modified to present acryl or diene functionalities that can react with corresponding monomers, thereby rendering the silica particle a cross-linking hub for the growing polymer chains.

According to some embodiments of the present invention, the solid particles are inorganic or organic (polymeric) nanoparticles which are suspendable in liquid media and can stabilize a HIPE, namely capable of forming Pickering HIPE compositions. As noted hereinabove, HIPEs can be stabilized with nanometer-sized particles to micrometer-sized particles, hence the description of surface modification of the particles applies to particles of all sizes. Additional information regarding emulsion stabilizing solid particles can be found in the art [Silverstein, M. S., *Polymer*, 2014, 55, pp. 304-320; and Silverstein, M. S. and Cameron, N. R., *PolyHIPEs—Porous Polymers from High Internal Phase Emulsions*, Encyclopedia of Polymer Science and Technology, 2010]. Silica nanoparticles which are modified so as to afford closed-cell polyHIPEs are described elsewhere [Gurevitch, I. et al., *Macromolecules*, 2011, 44, 3398-3409]. Additional information regarding HIPE-stabilizing inorganic nanoparticles is provided, for example, in U.S. Pat. No. 9,062,245, which is incorporated herein by reference. Additional information regarding HIPE-stabilizing organic (polymeric) nanoparticles is provided in the Examples section that follows below.

It is noted that the closed-cell microstructure is afforded inter alia due to the use of HIPE-stabilizing particles that serve as initiation agents for the polymerization reaction as well as the hubs for crosslinking the polymer/elastomer. Thus, the HIPE-stabilizing nanoparticles can be modified to act as crosslinking hubs, by virtue of having a plurality of polymerizable moieties attached thereto, and/or the center of the initiation by virtue of having a plurality of initiation moieties attached thereto. The same particles can serve for both actions, or for one of the actions, and can be used in mixtures of one type of modified particles or more. According to some embodiments of the present invention, the HIPE-stabilizing particles, being polymeric particles or inorganic particles, are modified to exhibit a plurality of polymerizable moieties and/or a plurality of initiation moieties attached thereon.

Since the HIPE-stabilizing particles are localized at the interface of the HIPE's phases, the particles form a part of the polymer/elastomer, localized at or near the interface of the polymer/elastomer and the encapsulated substance. The presence of HIPE-stabilizing particles at or near this interface can therefore serve as one of the means of identifying the composition-of-matter.

In some embodiments of the present invention, the emulsion stabilizer is a surfactant, being a synthetic (man-made) hydrophilic non-ionic molecule. Exemplary hydrophilic non-ionic surfactants include, without limitation, poloxamers, members of the alkylphenol hydroxypolyethylene family and a polyethoxylated sorbitan esters (polysorbitans). Other types of surfactants, such as anionic and cationic surfactants are also contemplated within the scope of the present invention.

Crosslinking:

As disclosed elsewhere (e.g., U.S. Pat. No. 9,062,245), one of the factors that drive a HIPE to polymerize into a closed-cell polyHIPE, is the locus of the crosslinks in the polymer. Briefly, it was found that the closeness of the cells is correlated to the location of crosslinks with respect to the interface of the HIPE phases, such that the cell closedness increases when the crosslinks are closer or at the HIPE phase interface. Preferably, the crosslinks are at the interface, and more preferably the crosslinks are substantially made by the HIPE-stabilizing particles, when the latter are modified to exhibit polymerizable moieties on their surface.

In some embodiments of the present invention, the elastomer forming the composition-of-matter presented herein is substantially devoid of crosslinks in its bulk, namely substantially devoid of crosslinks, which are not at or near the interface between the elastomer and the encapsulated substance. In such embodiments, the elastomer is crosslinked at the interface by the modified HIPE-stabilizing particles.

Optionally, in order to obtain controllable substance-releasing profile, namely a shortened release period, or a more intense release at the beginning, middle or final stages of the release period, the elastomer can be made to exhibit some crosslinks at the bulk thereof, namely not at the interface of the elastomer and the encapsulated substance. Thus, in some embodiments of the present invention, the elastomer forming the composition-of-matter presented herein, includes residues of crosslinking agents in any location therein, thus it is said that the elastomer exhibits crosslinks in its bulk, which are obtained by including a crosslinking agent in the pre-polymerized monomer mixture constituting the external phase of the HIPE. Such crosslinking agents are referred to herein as bulk crosslinking agents. In some embodiments, the mass percentage of the bulk crosslinking agent in the pre-polymerized monomer mixture (the external phase of the HIPE) ranges from 0.1 to 60, or less than 60%, 55%, 50%, 45%, 40%, 35%, 30%, 25%, 20%, 15%, 10%, 9%, 8%, 7%, 6%, 5%, 4%, 3%, 2%, or less than 1% of the total weight of the external phase of the precursor HIPE.

In some embodiments, the crosslinking agent is used to confer degradability (lability) to the polyHIPE, namely the crosslinking agent introduces chemical functionalities to the elastomer that can cause the elastomer to degrade and break down under ambient conditions. Crosslinking agents which are known for use in crosslinking of degradable (labile) polymers include formaldehyde, glutaraldehyde, dialdehyde starches, epoxides, carbodiimides, isocyanates, metallic crosslinking agents, ionic crosslinking agents, heterocyclic compounds, acrylic derivatives, vinyl-terminated oligomers, acryl-terminated oligomers, and mixtures thereof.

In embodiments using degradable (labile) crosslinking agents in the bulk of the elastomer, the substance-releasing profile is influenced by the presence of bulk crosslinks and by the rate of crosslinks breakdown, both affecting, albeit at different rates, the closeness of the cells in the elastomer as well as the permeability of the elastomer to the encapsulated substance.

According to some embodiments, degradable crosslinking agents suitable in the context of the present invention, include any compound with at least two polymerizable functionalities that can partake in the formation of a polymer, and can undergo a cleavage reaction under ambient or specific conditions, thereby breaking the crosslinks in the polymer. Exemplary degradable (labile) crosslinking agents include, but are not limited to, methacrylate-terminated polycaprolactone oligomers, methacrylate-terminated polylacticide oligomers, methacrylate-terminated polyglycolide oligomers, methacrylate-terminated poly(lactide-co-glycolide) oligomers. It is noted herein that the term "metacrylate-terminated" indicates the presence of at least two methacrylate groups, one at each end of the original diol oligomer, therefore a "metacrylate-terminated" oligomer is a crosslinker of a polymer.

Encapsulated Substance:

As discussed hereinabove, the composition-of-matter presented herein is unique in the capacity to releasably encapsulate substances that are entrapped in the polyHIPE at considerably highly concentrations, which renders the formation of a HIPE and the polymerization of its external phase a challenging feat. Considering that the substance essentially constitutes the internal phase of the precursor HIPE, any reference herein to the encapsulated substance of the composition-of-matter presented herein is equivalent to a reference to the internal phase of the precursor HIPE, unless stated otherwise. According to some embodiments of the present invention, the encapsulated substance is characterized by having no more than 80% of water therein, or less than 75%, less than 70%, less than 65%, less than 60%, less than 55%, less than 50%, less than 45%, less than 40%, less than 35%, less than 30%, less than 25%, less than 20%, less than 15%, less than 10%, or less than 5 percent by weight water of the total weight of the internal phase of the precursor HIPE.

While the internal phase of the HIPE can be chemically inert as far as the polymerization process of the external phase is concerned, the contents of the internal phase may have a beneficial or a deleterious effect on the stability of the HIPE. Thus, one of criteria for defining the encapsulated substance in the context of embodiments of the present invention, includes inter alia, the ability of the substance to partake as the internal phase of the precursor HIPE in the generation of the precursor HIPE en route to a polyHIPE. In addition, the substance is required to be conducive to, or at least passively allow the polymerization process to occur in the external phase of the HIPE.

Another criterion for defining the encapsulated substance in the context of embodiments of the present invention, is that at least a part and/or a component thereof, which is not a solvent thereof (e.g., water), is released from the polyHIPE when the composition-of-matter is exposed to an environment, as discussed herein.

In some embodiments, the internal phase is a concentrated aqueous solution having at least 20% of dissolved solids therein. In some embodiments, the internal phase is a saturated aqueous solution exhibiting an equilibrium of solid and dissolved species of the substance. Alternatively, internal phase is a liquefied (molten) room temperature solid. In some embodiments, the internal phase is an ionic liquid, or a room temperature ionic liquid. Alternatively, internal phase of the HIPE is an emulsion by itself, and the HIPE can be an oil-in-water-in-oil emulsion prior to polymerization of the external phase of the HIPE. Alternatively, the internal phase is a suspension or a slurry of solid particles in a liquid medium. In some embodiments, the internal phase is a colloid of solid particles in a liquid medium. In any of the aforementioned forms of the encapsulated substance, it is regarded as at least a part of a liquid internal phase of the precursor HIPE, and since it is immiscible with the external organic phase, it may be referred to as the dispersed internal phase albeit the content of water therein may be null or minimal, as in the case of some hydrate melts.

Unlike water or low concertation aqueous solutions, highly concentrated solutions, suspensions, colloids, emulsions and/or molten materials that are room temperature solids, present a challenge in stabilizing the precursor HIPE en route to polymerization to the corresponding polyHIPE. These internal phase forms comprising highly concentrated substances differ from water or their corresponding low concentration solutions by their chemical, physical and mechanical properties, such as ionic strength, specific gravity, rheology, flow behavior, temperature and the like, all of which play a role in the ability of a HIPE to form and be sufficiently stable. Molten room temperature solids add, on top of the aforementioned challenges, the heat required to maintain the room temperature solids in a liquid form until the HIPE has been formed and stabilized.

In some embodiments, the solute or solid, forming a part of the internal phase, is a substance that is a salt or a highly soluble, moderately soluble or poorly soluble inorganic or organic material.

In some embodiments of the present invention, the encapsulated substance is a liquid having at least 20% by weight solids dissolved and/or suspended in the liquid media. In some embodiments, the total dissolved and/or suspended solids in the encapsulated substance (the internal phase of the precursor HIPE) is at least 20% by weight of the total weight of the internal phase, or at least 25%, 30%, 35%, 40%, 45%, 50%, 55%, 60%, 65%, 70%, 75%, 80%, 85%, 90%, or at least 95%. In some embodiments where the internal phase is a molten room temperature solid, the total dissolved and/or suspended solids in the encapsulated substance is essentially about 100%.

In some embodiments, the solute or solid matter in the internal phase is a fertilizer or a precursor of a fertilizer, or a substance that is known to be beneficial for plant growth, such as, but not limited to ammonium nitrate, ammonium polyphosphate, ammonium sulfate, anhydrous ammonia, ammonia derivatives, calcium nitrate, diammonium phosphate, gypsum (calcium sulfate dihydrate), urea and urea derivatives, urea nitrate, urea phosphate, urea sulfate, ureaform, isobutylidene diurea, methylene urea, potassium magnesium chloride, monoammonium phosphate, monocalcium phosphate, monopotassium phosphate, magnesium oxide or hydroxide, calcium oxide or hydroxide, potassium chloride, potassium sulphate, potassium magnesium sulfate, potassium nitrate, magnesium sulphate, magnesium nitrate, zinc sulphate, zinc nitrate, boric acid, borate salts, tetraborates, phosphoric acid, sulfuric acid, nitric acid, iron sulfate, manganese sulfate, and any combination thereof.

In some embodiments, the entrapped substance is a room temperature solid, which is seen as equivalent in the context of embodiments of the present invention, to a TDS (total dissolved solids) content of 100%. In the context of embodiments of the present invention, the term "room temperature solid" refers to a substance that can be rendered liquid (molten) under conditions in which a HIPE can be formed, stabilized and polymerized. In some embodiments, the room temperature solid is a substance with a melting point lower than 90° C., lower than 80° C., or lower than 70° C. In some embodiments, the room temperature solid is a substance that can be liquefied into a liquid which is immiscible in an organic solvent, and more specifically, immiscible in the external phase of the HIPE. This term excludes room temperature solids that cannot be encapsulated in the voids of a polyHIPE by adding them as suspended particles in the droplets of the dispersed internal phase of the precursor HIPE. In the context of some embodiments of the present invention, the room temperature solid can be a eutectic, a phase-change material (PCM) and the likes. In some embodiments, the room temperature solid is a fertilizer or a substance that is known to be beneficial for plant growth, such as, but not limited to hydrates of calcium nitrate, such as the tetrahydrate. Other room temperature solid fertilizers, that can be encapsulated in a polyHIPE, according to some embodiments of the present invention, include hydrates of calcium chloride such as calcium chloride hexahydrate and calcium chloride tetrahydrate, hydrates of magnesium nitrate such as magnesium nitrate heptahydrate and magnesium nitrate undecahydrate, hydrates of magnesium sulfate, ammonium sulfate, various eutectics of urea ammonium nitrate (UAN) or as obtained from mixtures of urea with salts such as potassium or ammonium or calcium or magnesium nitrate, sulfate, bisulfate, phosphate, dihydrogenphosphate, monohydrogen phosphate, polysulfide or thiocyanate, sodium sulfate decahydrate, sodium carbonate decahydrate, sodium phosphate dibasic dodecahydrate, iron (III) nitrate nonahydrate, aluminum nitrate nonahydrate, sodium phosphate tribasic dodecahydrate, sodium aluminium sulfate dodecahydrate, zinc nitrate terahydrate, sodium thiosulfate pentahydrate, sodium metasilicate penta- or nonahydrate, magnesium nitrate hexahydrate, and any combinations thereof. In some embodiments, the room temperature solid is a deep eutectic solvent of different types that from a eutectic mixture of Lewis or Brønsted acids and bases which can contain a variety of anionic and/or cationic species, such as choline chloride and urea in a 1:2 mole ratio, and deep eutectic mixtures of urea with benzoquinones that polycondense to form water soluble oligomer chains.

In some embodiments, the internal phase includes optional ingredients that form a part of the entrapped substance. In some embodiments, the optional ingredients in the internal phase are meant to be released with the releasably entrapped substance such as insecticides and herbicides, or confer some properties to the composition-of-matter, such as polymer-degradation inducing agents, corrosion inhibitor, colorants, odoriferous and scented materials, pH-setting agents, and the likes.

Process of Preparation:

In general, the composition-of-matter presented herein is prepared by first forming a stable HIPE from a liquid form of the encapsulated substance (the internal phase; also referred to herein as a "first liquid") such as an aqueous solution or a molten solid that may also include a polymerization initiation agent and/or a polymerization catalyst, and a pre-polymerization monomer mixture (the external phase; also referred to herein as a "second liquid") that may also include the HIPE-stabilizing agents. The HIPE is prepared by dropwise-addition of the internal phase, namely the first liquid, into a container where the external phase, namely the second liquid, is being stirred continuously.

Once a stable HIPE is obtained, the initiation agent and/or the polymerization catalyst) is activated spontaneously or by external stimulation (heat, radiation, etc.), or optionally added to the HIPE with some limited stirring, and then the stirring is ceased and the HIPE is allowed to polymerize (cure), to thereby afford a polyHIPE. In the context of embodiments of the present invention, the polymerization initiator and/or the catalyst is a chemical compound that drives the polymerization reaction without being consumed in the process, thus without becoming an integral part of the polymer.

In some embodiments, the external phase further includes HIPE-stabilizing NPs that exhibit polymerization initiation functionalities on their surface.

In some embodiments, the internal phase further includes an emulsion stabilizer, as this ingredient is discussed hereinabove.

In some embodiments, the process involves UV-initiated polymerization, effected in a HIPE that contains photosensitizers in addition to a polymerization initiator.

In some embodiments, the HIPE polymerization process is initiated by heat using a methodology referred to as "sedimentation polymerization", wherein the HIPE is introduced (e.g., dropped or injected) into hot water bath at 50-70° C., and polymerized while sinking into the bottom of the hot bath. In some embodiments where the HIPE's specific density is lower than that of water, the polyHIPE is afforded by introducing the HIPE at the bottom of a hot bath in a methodology referred to herein as "buoyancy polymerization", in which the HIPE polymerizes while floating to the top of the hot bath.

In some embodiments wherein the polyHIPE is afforded by introducing the HIPE into a bath, the bath can be filled with water, or it can be filled with the same or similar medium as the internal phase of the HIPE. This methodology can be used in order to further stabilize the HIPE during the polymerization initiation and polymer curing stages, by suppressing osmotic pressure across the HIPE's external phase, and by suppressing diffusion of the substance from the HIPE to the bath's medium. This unique polyHIPE formation methodology has been demonstrated successfully, as presented in the Examples section that follows below.

Applications and Uses:

The composition-of-matter presented herein can be designed as a substance-releasing system that is custom-made for a specific utility, such as needed in agriculture and plant management. In some embodiments, the composition-of-matter releasably encapsulates a fertilizer composition, while being designed to release the fertilizer in a substantially linear profile over a time-period when the plant requires more nutrition. In some embodiments, an insecticide or an herbicide is present in the releasably encapsulated substance to afford a composition-of-matter that can be incorporated into an agricultural device for delivering insecticides or herbicides. In some embodiments, the composition-of-matter releasably encapsulates a disinfecting composition for potable, irrigation or recreational water reservoirs (swimming pools), while being designed to release the disinfectant(s) in a substantially linear profile over an extended time-period such that the rate of release commensurate the rate of decomposition and degradation of the disinfectant(s) in the water due to ambient conditions (light, heat, reactivity etc.).

Hence, according to an aspect of some embodiments of the present invention, the composition-of-matter forms a part, or is a substance-releasing system, having a releasably encapsulated substance therein. In some embodiments, the substance induces, without limitation, any mineral or organic fertilizer, an herbicide, a pesticide, a plant growth stimulator and any other biostimulant, a plant protector and any other biocontrol agent, a plant disease control agent, an agent that enhance ectomycorrhiza in the rhizosphere, plant growth-promoting rhizobacteria and rhizofungi, a growth regulator, a hormone, plant extract, an amino acid, a peptide, an odoriferous material, a fragrance, a pH-adjusting agent, a colorant, a disinfectant, and any combination thereof.

Due to their unique mechanical properties, the composition-of-matter can be cast in the liquid HIPE form into any shape and size mold before polymerization, or they can be reshaped and further processed post casting and polymerization. The composition-of-matter can therefore take any size of a block, a sphere, a bead, a rod, a particle (powder), a flat or shaped sheet, a tube or a fiber.

A non-limiting example of a product based on the substance-releasing system presented herein is a degradable polyHIPE that in the form of pellets that can be spread over agricultural land, which releases an encapsulated fertilizer into the soil when the soil is wet, whereas the fertilizer is released substantially linearly over a period of time that overlaps with the crop's growth period, and decomposes at the end of the fertilizer releasing period into benign and environmentally friendly degradation products.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Encapsulation of Highly Concentrated Solutions and Solid in polyHIPEs

The following is a reduction to practice of the challenge of encapsulating and controllably releasing highly concentrated aqueous solutions, having as high as about 80% total dissolved solids (TDS), or even 100% solids (an encapsulated solid such as a eutectic or phase-change material) in a polyHIPE. The non-trivial substance encapsulation challenge stems from the expected difficulties in stabilizing a HIPE with a dispersed phase that contains such a high concentration of substances, and the challenge of obtaining a polyHIPE with substantially closed-cell microstructure that will give rise a substantially the controlled release of these challenging encapsulated substances.

The following example is a demonstration of an exemplary polyHIPE-based system designed and formulated for slow-release of materials such as a fertilizer of the NPK family, according to some embodiments of the present invention. The example includes structural characterization, and fertilizer release profile, and studies of effect of various synthesis parameters on NPK release profile, aiming at controlled and sustained (constant and extended) release under suitable conditions.

This example focused on polyHIPEs containing highly concentrated urea ammonium nitrate (UAN-32) fertilizer and room temperature solid calcium nitrate tetrahydrate (CN-TH), wherein the elastomer of the polyHIPEs was synthesized from 2-ethylhexylacrylate (EHA) and lauryl acrylate (A12) combined with degradable methacrylate-capped polycaprolactone oligomer (PCL-MA), serving as a bulk crosslinking agent. The polyHIPEs were polymerized through chain-growth polymerization of Pickering HIPEs stabilized by two types of nanoparticles (NPs):

Mineral (silica) nanoparticles (MNPs): 7 nm commercially available fumed silica NPs treated with 3-(methacryloyloxy)propyltrimethoxy-silane) (MPtMS) using acid-catalyzed hydrolysis and condensation; and Polymeric (organic) nanoparticles (PNPs): 50 nm copolymer NPs based on co-polymerization of styrene (St), divinylbenzene (DVB) and maleic anhydride (MAn) that were synthesized within an oil-in-water emulsion.

In all samples initiation of polymerization was effected at the interface between the two phases of the HIPE. In all samples the stabilizing NPs served also as crosslinking hubs in order to afford HIPE interface crosslinking, and in some samples bulk crosslinking was added.

Materials:

The chemical structures of the monomer 2-ethylhexyl acrylate (EHA); monomer lauryl acrylate (A12); crosslinking agent polycaprolactone oligomers functionalized with methacrylic groups at both ends (PCL-MA1 and PCL-MA2); HIPE stabilizing surfactant polyglycerol polyricinoleate (PGPR); and polymerization initiator potassium persulfate (KPS); MNP surface modification reagent 3-(methacryloyloxy)propyltrimethoxy-silane) (MPtMS); polymer NP monomer styrene (St); PNP crosslinking monomer divinylbenzene (DVB); PNP surface modification reagent maleic anhydride (MAn); and oil-in-water emulsion surfactant Triton X-405 (X-405), are illustrated schematically in Scheme 1 below. Deionized water was used throughout.

The reactions for the synthesis of biodegradable crosslinking agents PCL-MA1 and PCL-MA2 are schematically illustrated in Scheme 2 and Scheme 3 below respectively.

Commercially available fumed silica ($SiO_2$) nanoparticles had an average diameter of 7 nm and a surface area of 390 $m^2/g$. The urea ammonium nitrate (UAN-32) fertilizer, consisting of 45% ammonium nitrate, 35% urea and 20% water, was supplied by Israel Chemicals Ltd. (ICL) as a solution. The calcium nitrate tetrahydrate ($Ca(NO_3)_2 \cdot 4H_2O$; CN-TH) fertilizer, having a melting point of 44° C., was supplied by ICL as a crystalline solid. The highly concentrated urea

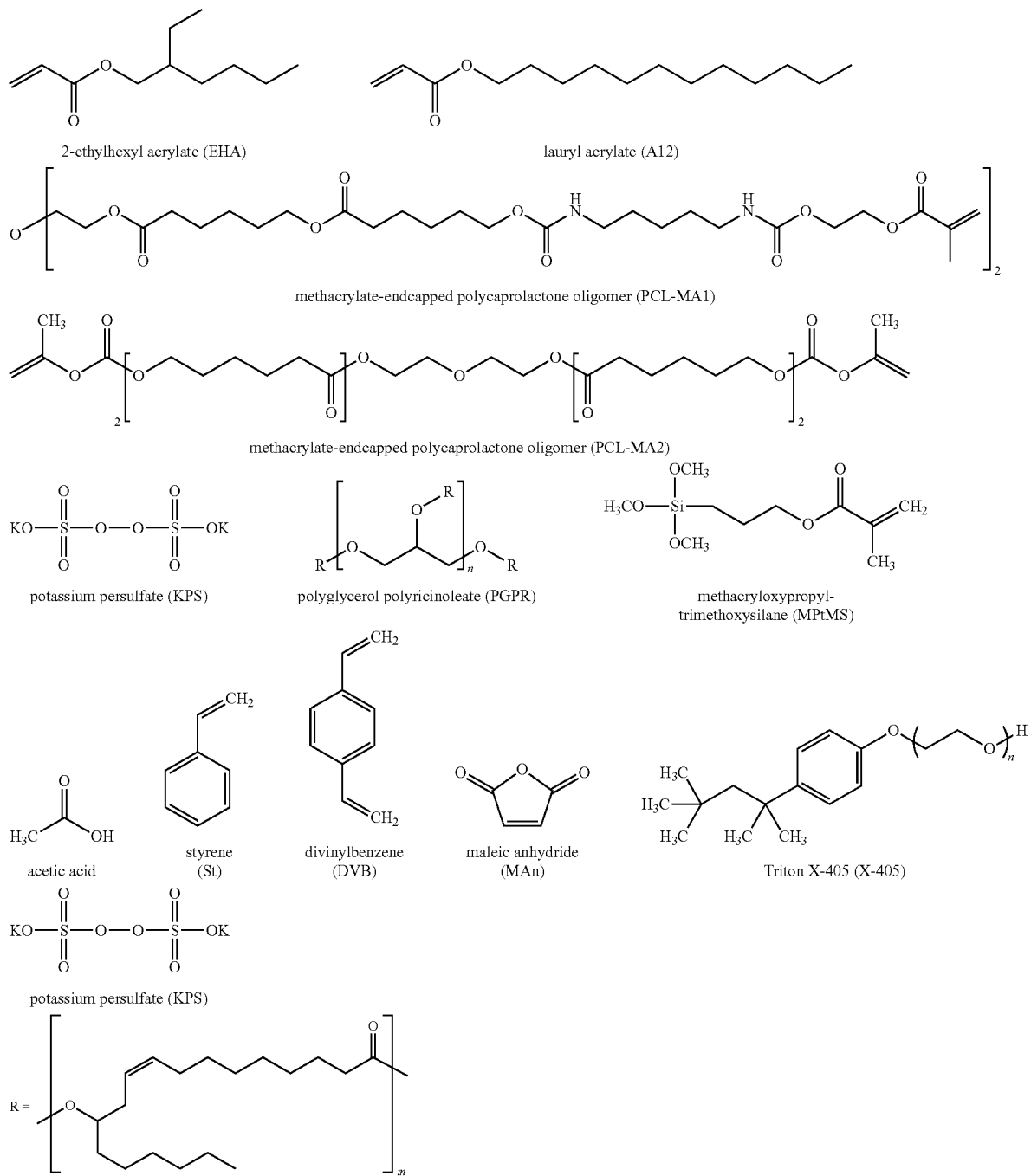

ammonium nitrate (UAN) fertilizer supplied by ICL is described in Table 1. The highly concentrated UAN fertilizer contains around 32% nitrogen. UAN has a total dissolved solids (TDS) content of around 80%. The CN-TH fertilizer is described in Table 1 below.

TABLE 1

| | Encapsulated fertilizer | | |
|---|---|---|---|
| | 12-6-6 | Urea/Ammonium Nitrate Abbreviation | $Ca(NO_3)_2 \cdot 4H_2O$ |
| | F | UAN | CN-TH |
| TDS, % | 45.2 | 80.6 | 100 |
| d, g/mL | 1.221 | 1.324 | 1.896 |
| N—$NH_4$, % | 3.0 | 8.1 | — |
| N—$NO_3$, % | 3.0 | 8.0 | 11.9 |
| N—$NH_2$, % | 6.3 | 16.1 | — |
| N-Total, % | 12.3 | 32.2 | 11.9 |
| $P_2O_5$, % | 6.1 | — | — |
| $K_2O$, % | 6.1 | — | — |

Silane-Modification of Silica Nanoparticles (Acid-Catalyzed Hydrolysis)

An ethanol/water solution (95% by volume ethanol) and an aqueous acetic acid solution (5.5 vol % acetic acid, 1 M) were prepared. The pH of the ethanol solution was adjusted to 4.5 by adding 3 vol % of the acetic acid solution. To produce MNPs, MPtMS, at 4.2% by weight of the solvents, was added and left for 1 hour. Silica NPs, at 0.7 wt % of the solvents, were then added. The mass ratio of MPtMS to silica was 6. The silane-silica mixture was stirred for 1 hour. The NPs were then filtered using Whatman No. 1 filter paper and dried overnight at 75° C. in a convection oven. A typical recipe providing general amounts of reagents taken for acid-catalyzed $SiO_2$ NPs surface modification, is presented in Table 2.

TABLE 2

| Reagent | Weight or Volume |
|---|---|
| absolute EtOH | 95 mL |
| $H_2O$ | 5 mL |
| 5.5 vol % acetic acid, 1M | 3 mL |
| MPtMS | 4.2 g |
| $SiO_2$ NPs | 0.7 g |

Polymer Nanoparticle Synthesis:

Polymeric NPs (PNPs) having an average diameter of about 50 nm were synthesized using an oil-in-water emulsion copolymerization of St/DVB/MAn at mass ratios of 85/10/5, respectively. Following polymerization for 24 hours at 85° C., the polymer was coagulated in MeOH. The coagulant was then filtered with Whatman No. 1 filter paper through a Buchner funnel, washed twice with MeOH, and dried overnight at 75° C. in a convection oven. The typical emulsion recipe for PNP synthesis is presented in Table 3 below.

TABLE 3

| | Reagents | Content, wt % |
|---|---|---|
| External phase | $H_2O$ | 95.76 |
| | MAn | 0.172 |
| | KPS | 0.022 |
| | X-405 | 0.766 |
| | Total | 96.72 |
| Internal phase | St | 2.95 |
| | DVB | 0.33 |
| | Total | 3.28 |

Synthesis of Methacrylic Functionalized Polycaprolactone Oligomers:

Two approaches were used to endcap the PCL oligomers, yielding two slightly different PCL-MA products. PCL-MA1 was synthesized by reacting PCL-diol (PCL-D), first with excess HDI (hexamethylene diisocyanate) to produce isocyanate-endcapped oligomer, and then, after distillation of the residual unreacted HDI, with HEMA (hydroxyethyl methacrylate) to produce the methacrylate-endcapped PCL oligomer. The two steps were catalyzed by organo-metal complex dibutyltin dilaurate (DBTDL). The material produced is actually a mixture of two main products: PCL-D-HDI-HEMA adduct and HDI-HEMA adduct (decrypted by the $^1$H-NMR spectrum) at a ratio of 1.0:0.2. The material is a waxy solid at room temperature.

PCL-MA2 was synthesized by reacting PCL-D oligomer with methacryloyl chloride (MAC) in $CH_2Cl_2$ using dry conditions in the presence of trimethylamine (TEA). TEA was used as a trap for the hydrochloric acid released during the reaction and pushes the reaction toward the products, avoiding a chemical equilibrium. After completion of the reaction, the product was isolated by a few washing steps that separated the main product from the by-products. The resulting material, PCL-MA2, is a viscous liquid at room temperature.

PCL-MA1 was synthesized using PCL-D (about 530 g/mol), HDI and HEMA as presented in Scheme 2 below.

Scheme 2

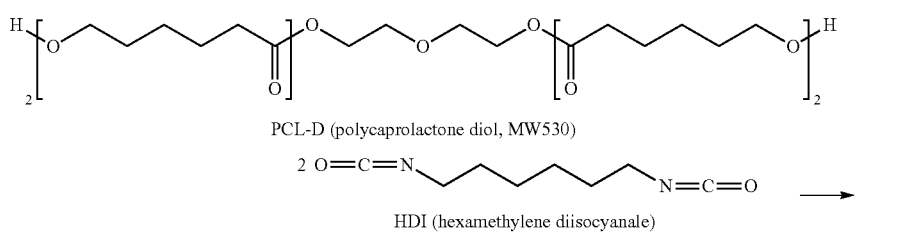

PCL-D (polycaprolactone diol, MW530)

HDI (hexamethylene diisocyanate)

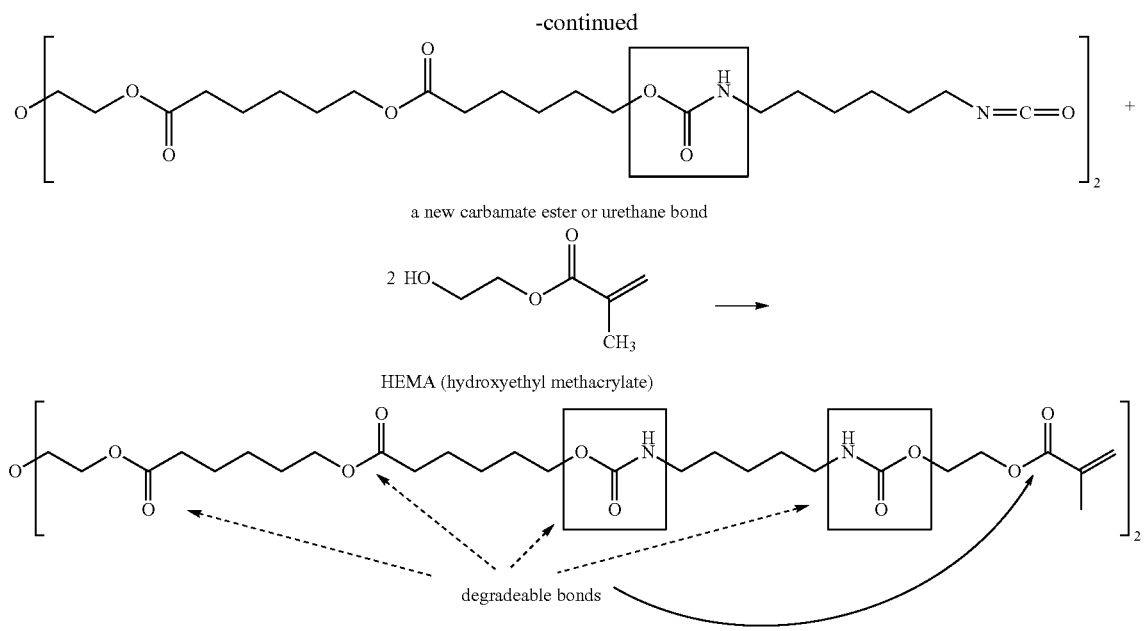

a new carbamate ester or urethane bond

HEMA (hydroxyethyl methacrylate)

degradeable bonds

Briefly, PCL-D was loaded (0.039 mol, 20.7 grams) into a dry, weighed three-neck flask and degassed overnight at 60° C. Freshly distilled hexamethylene diisocyanate (HDI, 0.16 mol, 26.2 grams) and DBTDL (2-3 drops) were added and the mixture was stirred overnight at about 50° C. under an $N_2$ flow. Distillation of excess HDI took place using low pressure (10 mmHg, about 120° C.). The unreacted HDI could be not be distilled (about 1.36 grams). HEMA was added at the same amount as the residual HDI (0.086 mol, 11.2 grams) to endcap all isocyanate groups. DBTDL (2 to 3 drops) was added to the flask and the reaction took place overnight under an $N_2$ flow at 50° C. No work-up was needed after the reaction and the resulting product was used as-is. An NMR spectrum (not shown) was recorded and corroborated the two main products: HDI and HEMA endcapped PCL-diol and HEMA endcapped HDI. PCL-MA2 was synthesized using PCL-D and methacryloyl chloride, as presented in Scheme 3 below.

Briefly, a three-necked flask was charged with PCL-D (0.0377 mol, 20.0 g) dissolved in dichloromethane (DCM, $CH_2Cl_2$, 160 mL) containing trimethylamine (TEA, $NEt_3$, 0.0906 mol, 9.99 grams). The system was then purged with nitrogen gas and the flask cooled by immersion in an ice bath. Methacryloyl chloride (MAC, 0.0906 mol, 9.47 g) dissolved in DCM (18 mL) was added dropwise using a pressure-equalizing dropping funnel at about 1 drop/s while stirring the solution at 0° C. The reaction was allowed to proceed for overnight in the ice bath. The resulting solution was filtered to remove the triethylamine hydrochloride crystals produced during the reaction. The filtered solution was washed with a 1% aqueous HCl solution and then with a 3% aqueous NaOH solution until the aqueous layer remained colorless. The organic layer was dried over $MgSO_4$, filtered and the solvent removed by vacuum evaporation. The detailed amounts of the reagents used in in PCL-MAs synthesis are presented in Table 4 below.

Scheme 3

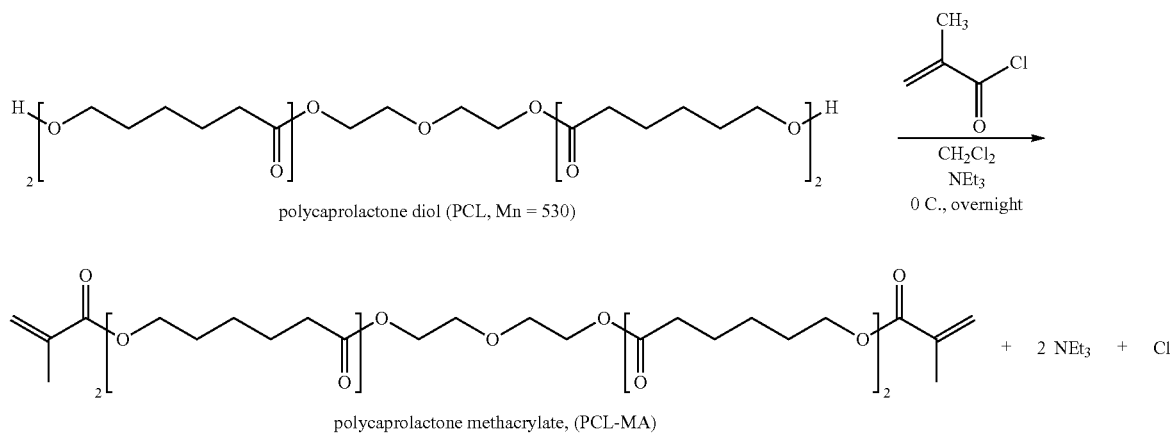

TABLE 4

| | Weight or Volume | moles |
|---|---|---|
| PCL-D | 20.0 grams | 0.0377 |
| CH₂Cl₂ | 160 mL | — |
| NEt₃ | 13.75 mL (9.99 g) | 0.0906 |
| MAC | 8.85 mL (9.47 g) | 0.0906 |

PolyHIPE Synthesis:

PolyHIPEs containing the degradable PCL-MA1 oligomer were based upon surfactant-stabilized HIPEs using PGPR as the surfactant. Table 5 lists two such polyHIPEs based on PCL-MA1 encapsulating about 80 wt % UAN or about 80 wt % molten $Ca(NO_3)_2$ (CN-TH). Later, polyHIPEs containing the degradable PCL-MA2 oligomer were based upon Pickering HIPEs. Table 6 lists fertilizer-containing polyHIPEs synthesized from Pickering HIPEs using MNPs and PNPs for HIPE stabilization.

Briefly, the external phase and the internal phase were prepared separately. The NPs or PGPR were dispersed within the organic phase containing the monomer(s) using mechanical stirring (600 rpm). The internal phase containing the fertilizer composition and the initiator KPS was slowly added to the organic phase in a beaker with continuous stirring.

Encapsulation of the solid CN-TH fertilizer was attained by using a slightly modified procedure to prevent CN-TH premature crystallization and solidification. First, the fertilizer, which is a solid hydrate, was melted on a hotplate, and KPS was added thereto and stirred until total solubility was reached. Thereafter, the warm fertilizer solution was transferred into a thermally jacketed addition funnel that was pre-heated to 45-46° C. The receiving beaker, containing a monomer(s)/NP mixture, was heated in a water bath to 45° C. The internal phase containing the molten fertilizer hydrate was slowly added to the organic phase in a beaker with continuous stirring (400-500 rpm) keeping the contents at a stable 44-45° C.

The resulting HIPE was transferred into a silicone mold (about 6.0 grams of HIPE in each mold cell). The mold was then encased in two layers of plastic wrap, and the HIPEs were allowed to polymerize and cure in an oven at 65° C. for 24 hours without stirring.

Details of the PCL-MA1-based fertilizer-containing polyHIPEs, synthesized by chain-growth free radical polymerization (FRP), stabilized by PGPR as an emulsion stabilizer and containing UAN or CN-TH, are presented in Table 5, wherein "SMPL" denotes sample code, "INPH" denotes internal phase, "EXPH" denoted external phase, "STBN" denoted HIPE stabilizing agent, and "INPH, %" denotes the mass percentage of the internal phase in the HIPE.

TABLE 5

| SMPL | INPH | EXPH | STBN | INPH, % |
|---|---|---|---|---|
| kb-172 | CN-TH | PCL/EHA 1/1 | PGPR | 79.2 |
| kb-173 | UAN | PCL/EHA 1/1 | PGPR | 78.9 |

Details of the PCL-MA2-based fertilizer-containing polyHIPEs, synthesized from Pickering HIPEs (MNP or PNP stabilized) by chain-growth FRP and containing UAN or CN-TH, are presented in Table 6.

TABLE 6

| SMPL | INPH | EXPH | STBN | INPH, % |
|---|---|---|---|---|
| kb-200 | UAN | PCL/EHA 1/4 | 8% MNPs | 79.1 |
| kb-201 | UAN | PCL/EHA 2/3 | 8% MNPs | 79.4 |
| kb-206 | UAN | PCL/EHA 3/2 | 8% MNPs | 80.6 |
| kb-210 | CN-TH | PCL/EHA 1/4 | 8% MNPs | 79.5 |
| kb-258 | CN-TH | PCL/EHA 1/4 | 10% PNPs | 79.8 |
| kb-259 | CN-TH | PCL/EHA 2/3 | 10% PNPs | 80.6 |
| kb-260 | CN-TH | PCL/EHA 1/1 | 10% PNPs | 84.9 |
| kb-261 | UAN | PCL/A12 1/4 | 8% MNPs | 84.9 |
| kb-265 | CN-TH | PCL/A12 1/1 | 10% PNPs | 84.8 |
| kb-266 | UAN | PCL/A12 1/4 | 10% PNPs | 84.9 |
| kb-278 | UAN | PCL/A12 1/1 | 8% MNPs | 84.9 |
| kb-279 | UAN | PCL/EHA 1/1 | 8% MNPs | 84.9 |

General recipes for PCL-MA1 containing polyHIPEs stabilized by surfactant is presented in Table 7.

TABLE 7

| | Amount of total, % | Amount of phase, % |
|---|---|---|
| External phase | | |
| PGPR | 4.13 | 21.43 |
| PCL-MA1 | 7.57 | 39.29 |
| EHA | 7.57 | 39.29 |
| Total | 19.28 | 100 |
| Internal phase | | |
| UAN/CN-TH | 79.17 | 98.08 |
| KPS | 1.55 | 1.92 |
| Total | 80.72 | 100 |

General recipe for 20 wt % containing PCL-MA2 (80% other monomer) HIPE synthesis using 8 wt % MNPs filled with about 80% fertilizer is presented in Table 8.

TABLE 8

| | Amount of total, % | Amount of phase, % |
|---|---|---|
| External phase | | |
| MNPs | 1.54 | 8.00 |
| PCL-MA2 | 3.55 | 18.39 |
| EHA/A12 | 14.19 | 73.61 |
| Total | 19.28 | 100.00 |
| Internal phase | | |
| UAN/CN-TH | 79.17 | 98.08 |
| KPS | 1.55 | 1.92 |
| Total | 80.72 | 100.00 |

General recipe for 40 wt % containing PCL-MA2 (60% other monomer) HIPE synthesis using 8 wt % MNPs filled with about 80% fertilizer is presented in Table 9.

TABLE 9

| | Amount of total, % | Amount of phase, % |
|---|---|---|
| External phase | | |
| MNPs | 1.54 | 8.00 |
| PCL-MA2 | 7.09 | 36.80 |
| EHA/A12 | 10.64 | 55.20 |
| Total | 19.28 | 100.00 |

TABLE 9-continued

|  | Amount of total, % | Amount of phase, % |
|---|---|---|
| Internal phase | | |
| UAN/CN-TH | 79.17 | 98.08 |
| KPS | 1.55 | 1.92 |
| Total | 80.72 | 100.00 |

General recipe for 60 wt % containing PCL-MA2 (40% other monomer) HIPE synthesis using 8 wt % MNPs filled with about 80% fertilizer is presented in Table 10.

TABLE 10

|  | Amount of total, % | Amount of phase, % |
|---|---|---|
| External phase | | |
| MNPs | 1.44 | 8.00 |
| PCL-MA2 | 9.95 | 55.20 |
| EHA/A12 | 6.64 | 36.80 |
| Total | 18.04 | 100.00 |
| Internal phase | | |
| UAN/CN-TH | 80.52 | 98.23 |
| KPS | 1.45 | 1.77 |
| Total | 81.97 | 100.00 |

General recipe for 20 wt % containing PCL-MA2 (80% other monomer) HIPE synthesis using 8 wt % MNPs filled with about 85% fertilizer is presented in Table 11.

TABLE 11

|  | Amount of total, % | Amount of phase, % |
|---|---|---|
| External phase | | |
| MNPs | 1.09 | 8.00 |
| PCL-MA2 | 2.50 | 18.39 |
| EHA/A12 | 10.00 | 73.61 |
| Total | 13.59 | 100.00 |
| Internal phase | | |
| UAN/CN-TH | 84.95 | 98.31 |
| KPS | 1.46 | 1.69 |
| Total | 86.41 | 100.00 |

General recipe for 50 wt % containing PCL-MA2 (50% other monomer) HIPE synthesis using 8 wt % MNPs filled with about 85% fertilizer is presented in Table 12.

TABLE 12

|  | Amount of total, % | Amount of phase, % |
|---|---|---|
| External phase | | |
| MNPs | 1.09 | 8.00 |
| PCL-MA2 | 6.25 | 46.00 |
| EHA/A12 | 6.25 | 46.00 |
| Total | 13.59 | 100.00 |
| Internal phase | | |
| UAN/CN-TH | 84.95 | 98.31 |
| KPS | 1.46 | 1.69 |
| Total | 86.41 | 100.00 |

General recipe for 20 wt % containing PCL-MA2 (80% other monomer) HIPE synthesis using 10 wt % PNPs filled with about 80% fertilizer is presented in Table 13.

TABLE 13

|  | Amount of total, % | Amount of phase, % |
|---|---|---|
| External phase | | |
| MNPs | 1.86 | 10.00 |
| PCL-MA2 | 3.35 | 18.00 |
| EHA/A12 | 13.42 | 72.00 |
| Total | 18.64 | 100.00 |
| Internal phase | | |
| UAN/CN-TH | 79.87 | 98.16 |
| KPS | 1.50 | 1.84 |
| Total | 81.36 | 100.00 |

General recipe for 40 wt % containing PCL-MA2 (60% other monomer) HIPE synthesis using 10 wt % PNPs filled with about 80% fertilizer is presented in Table 14.

TABLE 14

|  | Amount of total, % | Amount of phase, % |
|---|---|---|
| External phase | | |
| MNPs | 1.80 | 10.00 |
| PCL-MA2 | 6.49 | 36.00 |
| EHA/A12 | 9.74 | 54.00 |
| Total | 18.04 | 100.00 |
| Internal phase | | |
| UAN/CN-TH | 80.52 | 98.23 |
| KPS | 1.45 | 1.77 |
| Total | 81.96 | 100.00 |

General recipe for 20 wt % containing PCL-MA2 (80% other monomer) HIPE synthesis using 10 wt % PNPs filled with about 85% fertilizer is presented in Table 15.

TABLE 15

|  | Amount of total, % | Amount of phase, % |
|---|---|---|
| External phase | | |
| MNPs | 1.36 | 10.00 |
| PCL-MA2 | 2.45 | 18.00 |
| EHA/A12 | 9.78 | 72.00 |
| Total | 13.59 | 100.00 |
| Internal phase | | |
| UAN/CN-TH | 84.91 | 98.26 |
| KPS | 1.50 | 1.74 |
| Total | 86.41 | 100.00 |

General recipe for 50 wt % containing PCL-MA2 (50% other monomer) HIPE synthesis using 10 wt % PNPs filled with about 85% fertilizer is presented in Table 16.

TABLE 16

|  | Amount of total, % | Amount of phase, % |
|---|---|---|
| External phase |  |  |
| MNPs | 1.36 | 10.00 |
| PCL-MA2 | 6.11 | 45.00 |
| EHA/A12 | 6.11 | 45.00 |
| Total | 13.59 | 100.00 |
| Internal phase |  |  |
| UAN/CN-TH | 84.91 | 98.26 |
| KPS | 1.50 | 1.74 |
| Total | 86.41 | 100.00 |

PolyHIPE Disks:

Commercially available silicone molds, such as used for candy, soap, and cupcake preparation, were used for producing cylindrical disks of about 2.5 cm diameter and 0.9 cm height. The silicone molds enabled easy handling, produced consistent sample masses and smooth surfaces, and involved "clean" separation between the polyHIPEs and the molds.

PCL-based PolyHIPEs:

The polyHIPEs presented in Table 6 were based upon EHA and A12 combined with PCL-MA2 oligomer at different weight ratios (1/4, 2/3 3/2 and 1/1 PCL-MA to either EHA or A12). All the polymerizations were effected by interfacial initiation using KPS in the internal phase. Two different amounts of internal phase have been encapsulated 80% and 85 wt %.

Figure 1B:
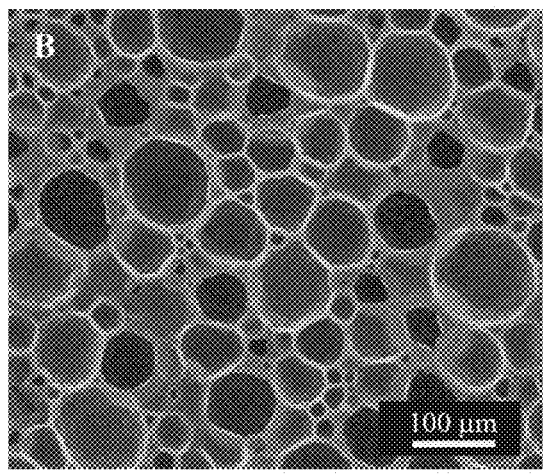
Figure 1C:
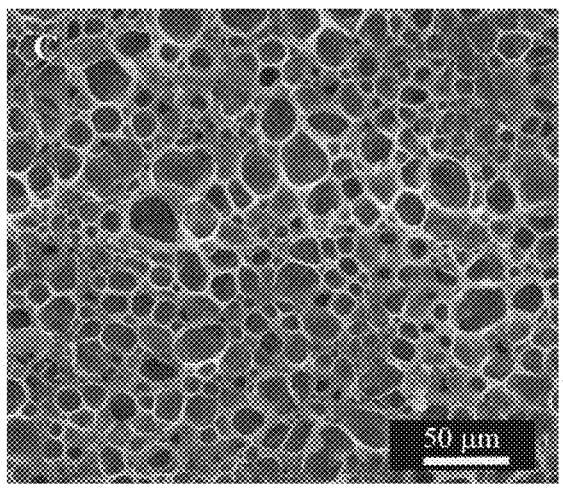
Figure 1D:
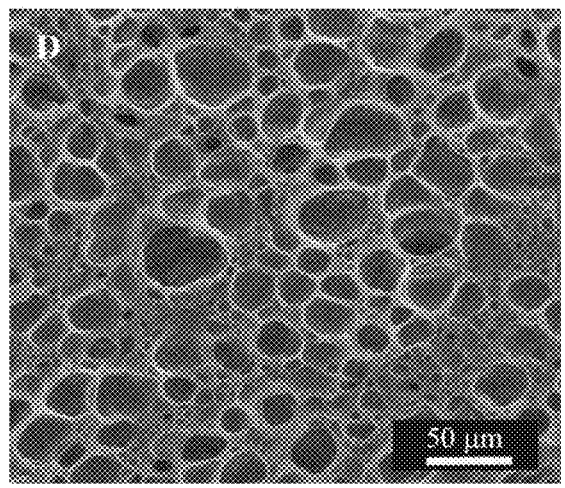

FIGS. 1A-D present SEM micrographs of some fertilizer-encapsulating polyHIPEs, according to some embodiments of the present invention, wherein FIG. 1A of sample kb-206 and FIG. 1B of sample kb-261 present EHA/PCL-MA2 copolymer polyHIPEs stabilized by MNPs and encapsulating UAN, and FIG. 1C of sample kb-260 and FIG. 1D of kb-265 present polyHIPEs stabilized by PNPs and encapsulating solid $Ca(NO_3)_2$.

As can be seen in FIGS. 1A-D, all exemplary fertilizer-encapsulating PCL-based polyHIPEs, prepared according to some embodiments of the present invention, have a closed-cell microstructure and a relatively homogeneous droplet size distribution, showing intact walls without interconnecting windows. As much as 89 wt % UAN was successfully encapsulated within EHA-based polyHIPEs, while increasing the fertilizer content further destabilized the HIPE and caused phase separation.

In conclusion, the experimental results presented hereinabove serve as a proof of concept that HIPEs containing very highly concentrated solutions (UAN with a TDS of 80%) and room temperature solids (CN-TH, with a TDS of 100%) in the internal dispersed phase can be stabilized, and that the external phase can be polymerized to encapsulate these non-trivial substances having more than 45% TDS.

Example 2

Degradable Substance Releasing PolyHIPE-Based Systems

PolyHIPE Degradation Assays:

The study was conducted using two series of polyHIPEs, prepared according to some embodiments of the present invention, based on the free-radical copolymerization of EHA with a vinyl-terminated PCL oligomer (PCL-MA2), encapsulating aqueous solutions of 4.4% $Na_2SO_4$. The mass of $Na_2SO_4$ constitutes 15.9% of the completely dry polymer (assuming a polymerization yield of 100%). Each series of solution-encapsulating polyHIPEs was prepared using a different type of stabilizing NP, either MNPs or PNPs. Each series contained various mass ratios of EHA to PCL-MA. The MNPs constituted 5 wt % of the organic phase, while the PNPs constituted 10 wt % of the organic phase. The mass ratios of PCL-MA/EHA were 0/100, 20/80, 40/60 and 60/40.

The MNP-stabilized HIPEs were termed as ML-x, where x is the mass percentage of PCL-MA (from 0 to 60), while the PNP-stabilized HIPEs were termed PL-x. Procedure for the synthesis is presented in Example 6, and recipes are presented in Table 29 hereinbelow.

The samples were dried in vacuum at room temperature for about 20 hours before the degradation tests to remove as much water as possible. The accelerated degradation test used consisted of immersing polyHIPE samples (9 mm×8 mm×1.8 mm) in 3 M aqueous solution of NaOH. At the end of each week the samples were washed, dried in vacuum for around 20 hours at room temperature for the first 9 weeks and then at 40° C. for the remaining weeks, weighed, and placed in a fresh NaOH solution. Starting on the $18^{th}$ week, the NaOH solution was replaced every few weeks.

Figure 2A:
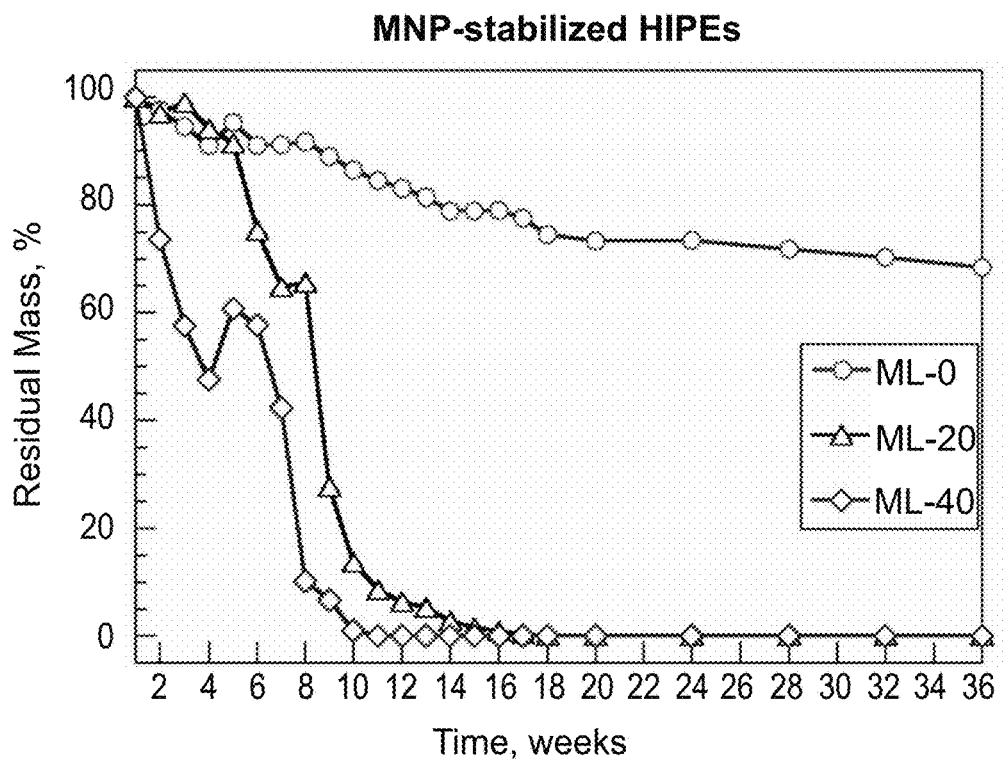
Figure 2B:
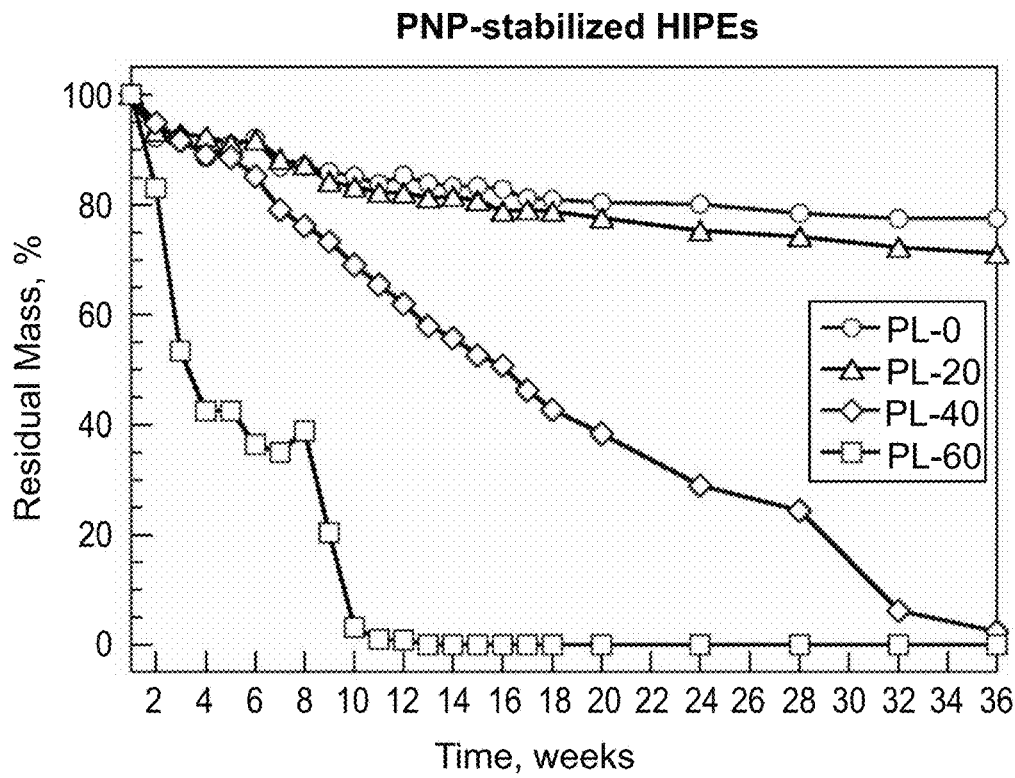

FIGS. 2A-B present comparative plots showing the hydrolytic degradation profiles of two series of polyHIPEs, prepared according to some embodiments of the present invention, based on the free-radical copolymerization of EHA with a vinyl-terminated PCL oligomer (PCL-MA2), encapsulating aqueous solutions of 4.4% $Na_2SO_4$, wherein FIG. 2A is of polyHIPEs prepared from MNP-stabilized HIPEs and FIG. 2B is of polyHIPEs prepared from PNP-stabilized HIPEs.

As can be seen in FIGS. 2A-B: ML-40 and PL-60 degraded completely after 10-11 weeks, ML-20 degraded completely after 14-15 weeks, and PL-40 degraded after 36 weeks.

As can further be seen in FIGS. 2A-B, polyHIPEs from MNP-stabilized HIPEs are more prone to complete degradation than polyHIPEs from PNP-stabilized HIPEs. The silica NPs act as crosslinking centers. It is noted that NaOH etching of the silica surface would de-crosslink the polymer and enhance the rate of degradation and its extent.

In general, these results prove that using a degradable crosslinker like PCL-MA as a partial comonomer in free radical polymerizations enables the total disintegration of the entire polyHIPE.

In conclusion, polyHIPEs containing degradable PCL-MA2 oligomers that serve as a crosslinkers for either EHA or A12, were synthesized successfully within Pickering HIPEs stabilized using either MPtMS-modified $SiO_2$ or polymeric nanoparticles. This serves as a proof of concept that degradable polyHIPEs, obtainable by free radical polymerization, can be harnessed for the controlled release of concentrated solutions.

Example 3

Acrylate/Methacrylate PolyHIPEs and Hydrogel-Filled PolyHIPEs

Substance Release Assays:

The release of polyHIPE-encapsulated solutes was investigated to determine the release profiles of the different polyHIPE systems, using electric conductance measurements as a function of time against a constant reservoir of water, and against a once-weekly replenished reservoir of water. The water that was replaced in the replenished reservoir assay were also tested for solute content. Determination of the amount of NPK in all the aqueous filtrates of the polyHIPEs was conducted after completion of the release tests. In this test liquid fertilizer 12-6-6 (45% TDS) was encapsulated in polyHIPE sample 26 based on poly(lauryl acrylate) (PA12), according to some embodiments of the present invention.

Figure 3:
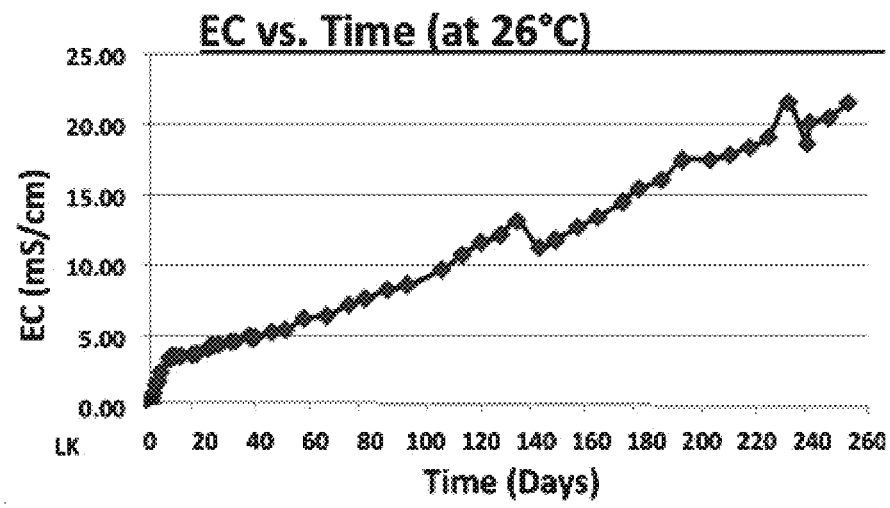
FIG. 3 presents a comparative plot of electric conductance (mS/cm) as a function of time (days), showing the release profile of fertilizer concentrate "12-6-6" from A12-based polyHIPE sample 26-LK, according to some embodiments of the present invention.

FIG. 3 presents a comparative plot of electric conductance (mS/cm) as a function of time (days), showing the release profile of fertilizer concentrate "12-6-6" from A12-based polyHIPE sample 26, according to some embodiments of the present invention.

As can be seen in FIG. 3, the release profile, measured by EC, shows slow release properties over time. From the release profile it can be seen that the release is continuous for more than six months.

The water reservoir against which the release test was conducted using NPK-encapsulating polyHIPE sample 26-LK, was analyzed for NPK content. The results of the percent fertilizer released in comparison to the expected values are summarized in Table 17.

TABLE 17

| Parameter checked | N—NO$_3$ | N—NH$_4$ | N-Urea | N-Total | P$_2$O$_5$ | K$_2$O |
|---|---|---|---|---|---|---|
| Released, % | 73.1 | 100 | 18.9 | 50.9 | 69.2 | 96.1 |

As can be seen in Table 17, the percent nitrogen released from the polymer is about half than the theoretical amount, and about 20% for urea, while most the K2O has been released from the polymer and about 70% of the P2O5.

The following experiments were conducted to study the release of concentrated aqueous solutions from highly deformable polyHIPE based on acrylates and methacrylates, and the effect of the presence of a hydrogel encapsulated therein. The assumption underlying these studies was that polymer's flexibility and swelling of an encapsulated hydrogel would alter the rate of release.

PolyHIPE Preparation:

A concentrated aqueous solution of the fertilizer composition NPK 12-6-6 (45% TDS) was encapsulated in acrylates and methacrylates polyHIPEs (PA/PMA polyHIPEs), with or without hydrogel, that were synthesized via chain-growth polymerization. The recipes of the PA/PMA polyHIPEs are presented in Table 18, wherein "SMPL" denotes sample code, "INPH" denotes internal phase; "EXPH" denoted external phase; "STBN" denoted HIPE stabilizing agent; "INIT" denotes the polymerization initiator; "F" denotes NPK 12-6-6 fertilizer; "ALG" denotes alginate; "A12" denotes lauryl acrylate; "BPO" denotes benzoyl peroxide; "CMNP" denotes MNPs modified with ATRP initiating function; "DMAAm" denotes N,N-dimethylacrylamide; "MBAAm" denotes N,N-methylene bisacrylamide; "A18" denotes stearyl (C$_{18}$) acrylate; "MA18" denotes stearyl (C$_{18}$) methacrylate; "ATRP" denotes atom transfer radical polymerization; and "ATRP-NP" denotes atom transfer radical polymerization initiating nanoparticles.

TABLE 18

| SMPL | INPH | EXPH | STBN | INIT | Comments |
|---|---|---|---|---|---|
| 26 | F | A12 | MNP | KPS | |
| 67 | F | EHA | PNP | BPO | |
| 68 | F | EHA | PNP | KPS | |
| 76 | F | EHA | CMNP | ATRP-NP | |
| 87 | F/DMAAm/MBAAm | EHA | MNP | KPS | EHA/DMAAm/MBAAm 10/10/1 |
| 88 | F/DMAAm | EHA | MNP | KPS | EHA/DMAAm 1/1 |
| 89 | F | EHA/A18 1/1 | MNP | KPS | |
| 90 | F | EHA/MA18 1/1 | MNP | KPS | |
| 103 | F/ALG | EHA | MNP | KPS | EHA/ALG 16/1 |
| 107 | F | EHA | MNP | ATRP | |

Figure 4:
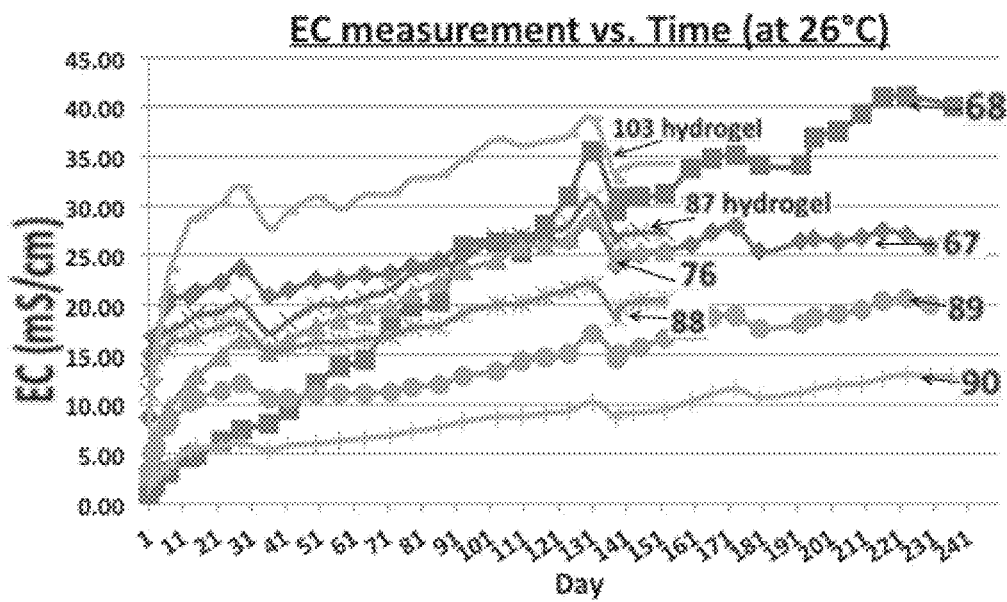

Release Rates from PA/PMA polyHIPEs:

FIG. 4 presents a comparative plot showing the release profiles measured by electric conductance (EC) as a function of time in days in exemplary polyHIPE having sample Nos. 26, 67, 68, 76, 87, 88, 89, 90, 103 and 107, listed in Table 18, as.

As can be seen in FIG. 4, sample Nos. 67, 88 and 103 exhibited a fast release, with 80% of the fertilizer released within 22-28 days, and 100% release after 131 days. Sample Nos. 76 and 87 exhibited a moderate release rate, with 80% of the fertilizer released within 93 days, and 100% release after 131 days. Sample Nos. 68 and 89 exhibited a moderate release rate, with 80% of the fertilizer released within about 131 days, and 100% release after about 220 days. Sample No. 90 exhibited slow release properties, with 80% of the fertilizer released within 160 days, and 100% release after 223 days. It is noted that Sample No. 68 changed during the release test, wherein the polyHIPE underwent swelling, increasing its volume.

The final aqueous solutions from the release test runs were analyzed for their NPK content and the results of percent fertilizer released are summarized in Table 19.

TABLE 19

| SMPL | N—NO$_3$ % | N—NH$_4$ % | N-Urea % | N-Total % | P$_2$O$_5$ % | K$_2$O % |
|---|---|---|---|---|---|---|
| 67 | 212.5 | 48.1 | 1.6 | 64.6 | 40.6 | 56.25 |
| 68 | 158.6 | 49.0 | 1.1 | 52.6 | 31.0 | 41.4 |
| 76 | 80.0 | 93.3 | 49.2 | 67.2 | 72.1 | 95.1 |
| 87 | 69.0 | 87.8 | 8.9 | 44.2 | 65.1 | 88.4 |
| 88 | 69.3 | 89.7 | 1.2 | 40.5 | 58.9 | 83.3 |
| 89 | 86.7 | 43.2 | 92.1 | 77.8 | 33.9 | 45.2 |
| 90 | 180.0 | 60.0 | 5.8 | 62.5 | 37.75 | 50.0 |
| 103 | 83.3 | 94.4 | 3.4 | 46.8 | 74.3 | 105.7 |

As can be seen in Table 19, most of the polyHIPEs released the encapsulated fertilizer composition to some extent. The NPK release results for polyHIPEs samples Nos. 76, 87, 88 and 103 show that most of the K$_2$O content was released, about 60-70% of P$_2$O$_5$ was released, while the total release of the percent N was lower.

In parallel release tests, described above, duplicate samples of sample Nos. 68, 67, 88, and 90 were tested with water replacement. The water was replaced once a week and the aqueous solution was analyzed for NPK. Electric conductance measurements were also performed at regular intervals.

Figure 5:
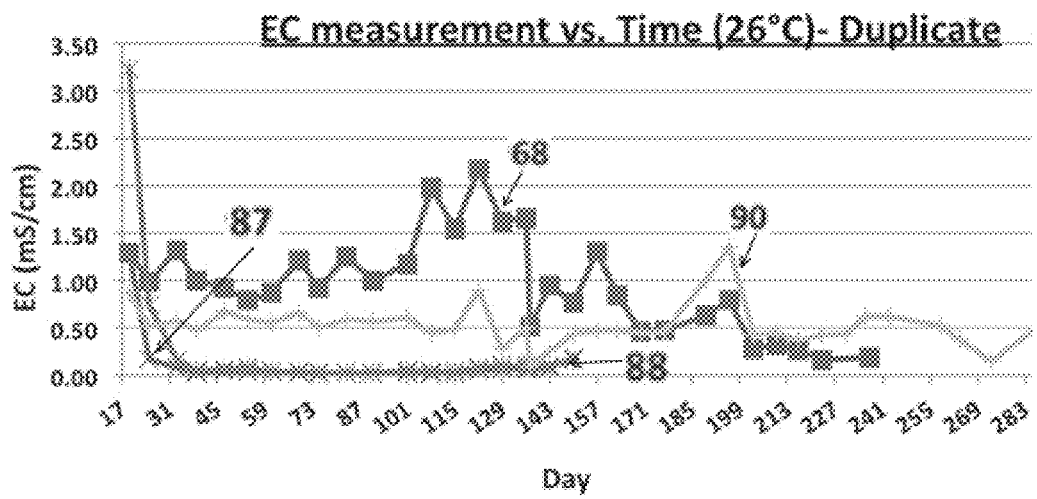
FIG. 5 presents a comparative plot showing the release profiles of the tested polyHIPE sample Nos. 68, 90, 67 and 88, as measured by electric conductance (EC) as a function of time in days, whereas the water surrounding being replaced once a week.

FIG. 5 presents a comparative plot showing the release profiles of the tested polyHIPE sample Nos. 68, 90, 67 and 88, as measured by electric conductance (EC) as a function of time in days, whereas the water surrounding being replaced once a week.

As can be seen in FIG. 5, most of the fertilizer was released from sample Nos. 88 and 87 within about 38 days. PolyHIPE sample No. 68 released most of the fertilizer encapsulated therein 241 days, and sample No. 90 did not complete the fertilizer release even after 283 days.

Figure 6:
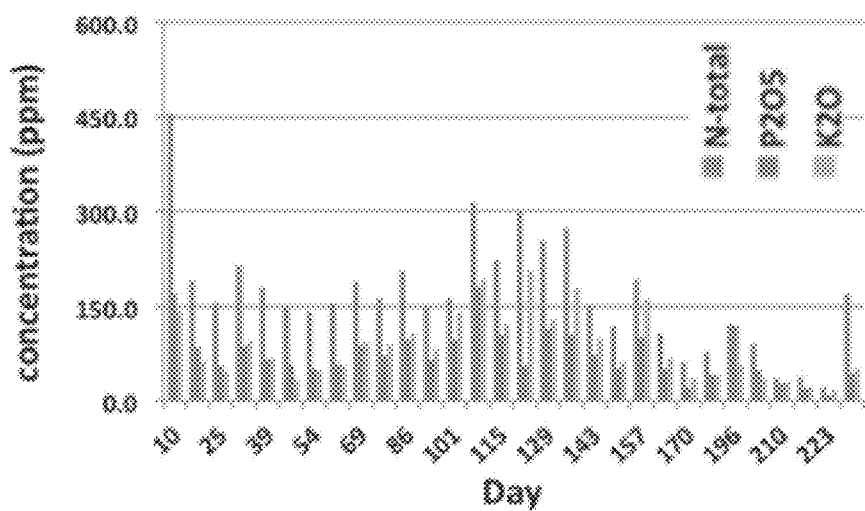
FIG. 6 presents a bar plot showing the total nitrogen ("N-total" left bar), P2O5 (center bar) and K2O (right bar), releases in to water from polyHIPE sample No. 68 as a function of time after each water replacement.

FIG. 6 presents a bar plot showing the total nitrogen ("N-total" left bar), $P_2O_5$ (center bar) and $K_2O$ (right bar), releases in to water from polyHIPE sample No. 68 as a function of time after each water replacement.

As can be seen in FIG. 6, the NPK release was continuous over time in most of the measurements. The concentration of total nitrogen was approximately twice that for $P_2O_5$ and $K_2O$, in accordance with the composition of the encapsulated liquid fertilizer, 12-6-6.

After completion of the release test (day 239), the total amount of NPK released was calculated and compared to the amount present in the original fresh polymer. The sum amount of NPK released from duplicate polyHIPE sample No. 68 was determined by analysis of the water once a week, and the total release was calculated and is presented in Table 20.

TABLE 20

| Analysis | N-total | $P_2O_5$ | $K_2O$ |
| --- | --- | --- | --- |
| Analysis, g | 0.43 | 0.19 | 0.22 |
| Expected, g | 0.41 | 0.20 | 0.20 |
| Total release, % | 104.9 | 95.0 | 110.0 |

As can be seen in Table 20, all of the NPK was released from the polyHIPE sample No. 68 after 239 days. The analytical results reveal that the NPK ratio is approximately 2:1:1, as expected.

Figure 7:
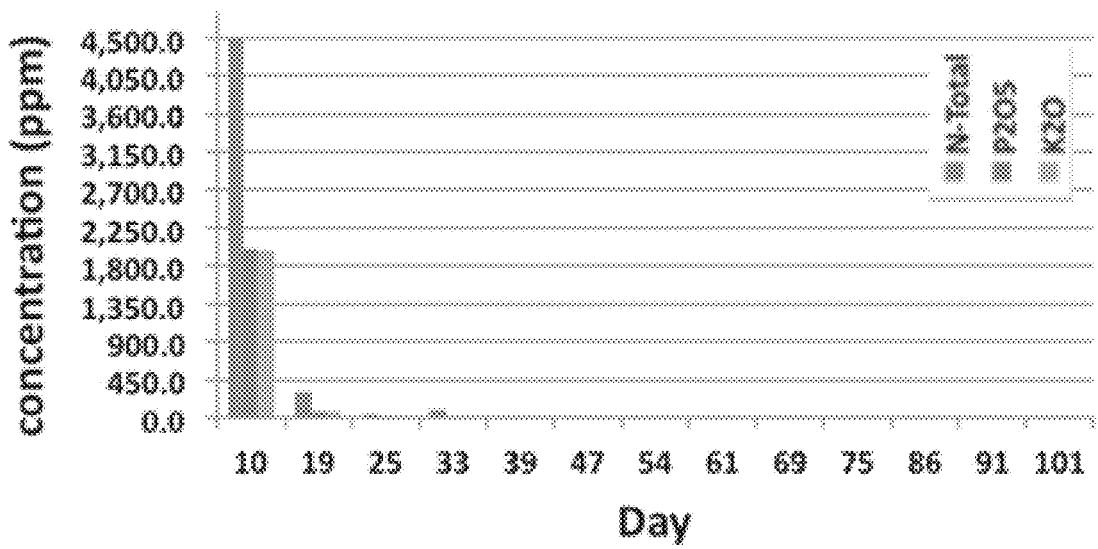
FIG. 7 presents a bar-chart showing the NPK release profile for polyHIPE sample No. 87, measured after each water replacement by elemental analysis as a function of time in days.

FIG. 7 presents a bar chart showing the NPK release profile for polyHIPE sample No. 87, measured after each water replacement by elemental analysis as a function of time in days.

After completion of the NPK release test (day 101), the total amount of released NPK was calculated and compared to the amount present originally in polyHIPE sample No. 87, and the results are summarized in Table 21.

TABLE 21

| Analysis | N-total | $P_2O_5$ | $K_2O$ |
| --- | --- | --- | --- |
| Analysis, g | 0.42 | 0.18 | 0.175 |
| Expected, g | 0.35 | 0.17 | 0.17 |
| Total release, % | 120 | 106 | 103 |

As can be seen in FIG. 7 and Table 21, complete release was achieved after 33 days, whereas most of the NPK was released within the first 10 days, and that the NPK ratio is approximately 2:1:1, as expected.

Figure 8:
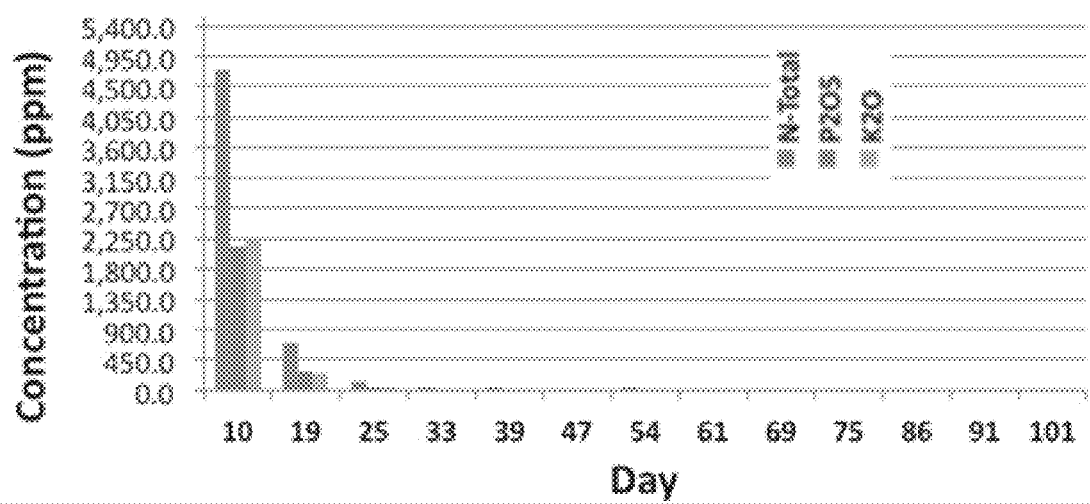
FIG. 8 presents a bar-chart showing the NPK release profile for polyHiPE sample No. 88, measured after each water replacement by elemental analysis as a function of time in days.

FIG. 8 presents a bar chart showing the NPK release profile for polyHIPE sample No. 88, measured after each water replacement by elemental analysis as a function of time in days.

After completion of the NPK release test (day 101), the total amount of released NPK was calculated and compared to the amount present originally in polyHIPE sample No. 88, and the results are summarized in Table 22.

TABLE 22

| Analysis | N-total | $P_2O_5$ | $K_2O$ |
| --- | --- | --- | --- |
| Analysis, g | 0.49 | 0.21 | 0.22 |
| Expected, g | 0.40 | 0.20 | 0.20 |
| Total release, % | 122.5 | 105 | 110 |

As can be seen in FIG. 8 and Table 22, complete release was achieved, whereas most of the NPK was released within the first 19 days, and that the NPK ratio is approximately 2:1:1, as expected.

Figure 9:
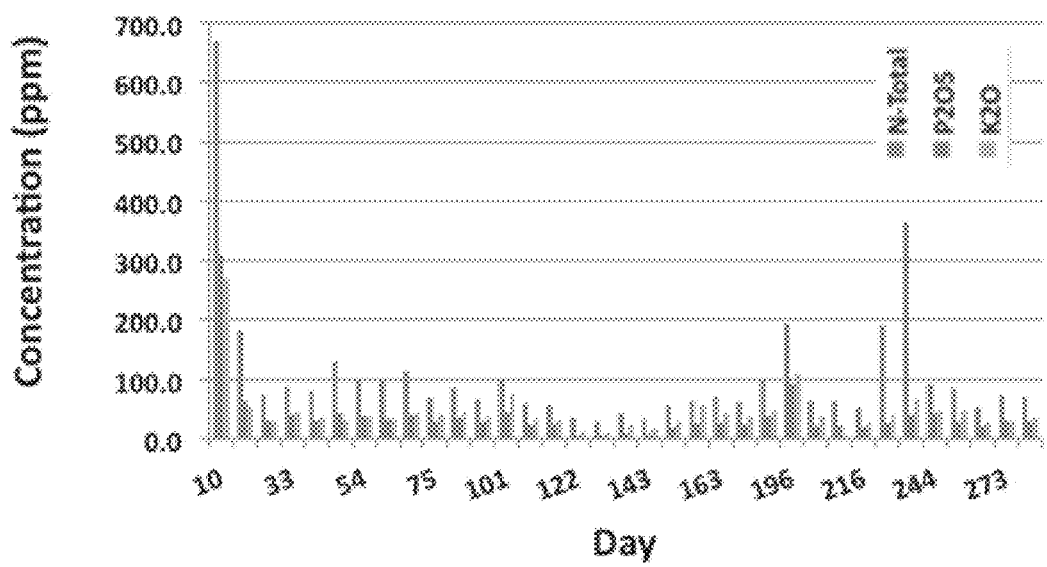
FIG. 9 presents a bar-chart showing the NPK release profile for polyHiPE sample No. 90, measured after each water replacement by elemental analysis as a function of time in days.

FIG. 9 presents a bar chart showing the NPK release profile for polyHIPE sample No. 90, measured after each water replacement by elemental analysis as a function of time in days.

After completion of the release test (day 287), the total amount of NPK released was calculated and compared to the amount present originally in polyHIPE sample No. 90, and the results are summarized in Table 23.

TABLE 23

| Analysis | N-Total | $P_2O_5$ | $K_2O$ |
| --- | --- | --- | --- |
| Analysis, g | 0.32 | 0.11 | 0.13 |
| Expected, g | 0.37 | 0.19 | 0.19 |
| Total release, % | 83.8 | 58 | 58 |

As can be seen in FIG. 9 and Table 23, complete release was not achieved, after 287 days, and that the NPK ratio was not as expected.

Figure 10:
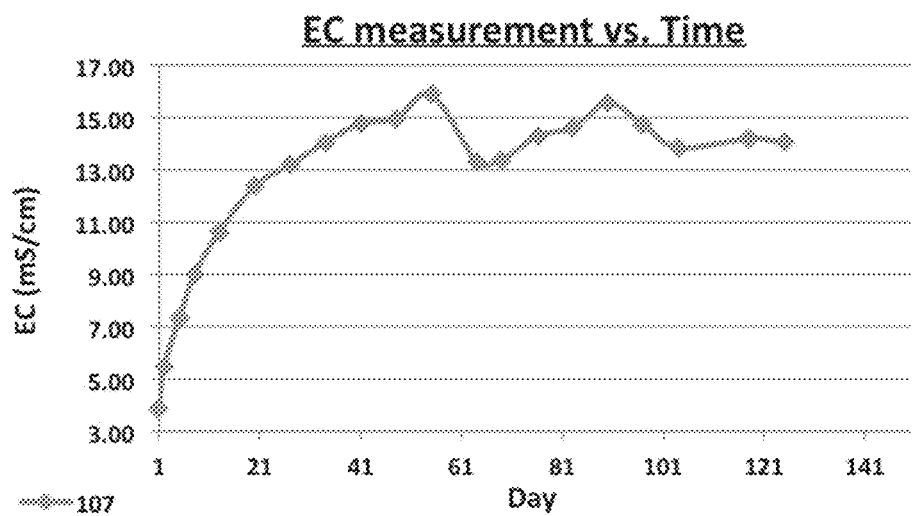
FIG. 10 presents a plot showing the NPK release profile for polyHIPE sample No. 107, measured continuously by electric conductance of the surrounding water as a function of time in days.

FIG. 10 presents a plot showing the NPK release profile for polyHIPE sample No. 107, measured continuously by electric conductance of the surrounding water as a function of time in days.

The results of elemental analysis of the receiving water and final release from polyHIPE sample No. 107 after 120 days are presented in Table 24.

TABLE 24

| Parameter checked | N—$NO_3$ | N—$NH_4$ | N-Urea | N-Total | $P_2O_5$ | $K_2O$ |
| --- | --- | --- | --- | --- | --- | --- |
| Released, % | 70.2 | 77.6 | 20.5 | 47.0 | 64.7 | 82.4 |

As can be seen in FIG. 10 and Table 24, not all the NPK was released from polyHIPE sample No. 107; about 70% of the PK was released, while most of the urea was not released, giving a total N release of about 50%.

In conclusion, the results presented above show that acrylate/methacrylate-based polyHIPEs, encapsulating a highly concentrated solution of a fertilizer, can exhibit relatively rapid release rate of less than 1 month, moderate controlled release for over 1-3 months, or very slow and controlled release for over 4-8 months.

Example 4

Biodegradable Poly(Urethane Urea) PolyHIPEs

PolyHIPE Preparation:

Concentrated aqueous solutions of fertilizer compositions NPK 12-6-6 (45% TDS) or NPK 12-6-6 with KCl (46% TDS) were encapsulated in poly(urethane urea) (PUU) polyHIPEs stabilized with polyglycerol polyricinoleate (PGPR) and polymerized by step-growth polymerization, with or without hydrogel. The recipes of the PUU polyHIPEs are presented in Table 25, wherein "SMPL" denotes sample code, "INPH" denotes internal phase, "EXPH" denoted external phase, "F" denotes NPK 12-6-6 fertilizer, "ALG" denotes alginate, "DXI" denotes dextrin, "CSN" denotes chitosan, "UAN" denotes urea ammonium nitrate, "PCL-T" denotes an oligomeric polycaprolactone triol, "PCL-D" denotes PCL-diol, "HDI" denotes 1,6-hexane diisocyanate, "TOL" denotes toluene and "C-Oil" denotes castor oil.

TABLE 25

| SMPL | INPH | EXPH | Comments |
|---|---|---|---|
| 12-04 | F/ALG | PCL-T/HDI/TOL | PCL-T/HDI/ALG 1.1/1.0/1.1 |
| 13-01 | F | PCL-T/HDI/TOL | PCL-T/HDI 1.1/1.0/1.1 |
| 13-07 | F/ALG | PCL-D/HDI/TOL | PCL-D/HDI/ALG 1.1/1.0/1.1 |
| 14-01 | F/ALG | PCL-T/PCL-D/HDI/TOL | PCL-T/PCL-D/HDI/ALG 0.55/1.0/0.55 |
| 14-02 | F/ALG | PCL-T/HDI/TOL | PCL-T/HDI/ALG 1.1/1.0/0.22 |
| 14-08 | F/ALG | PCL-T/HDI/TOL | PCL-T/HDI/ALG 1.1/1.0/0.54 |
| 14-09 | F/DXI | PCL-T/HDI/TOL | PCL-T/HDI/DXI 1.1/1.0/1.1 |
| 14-10 | F/CSN | PCL-T/HDI/TOL | PCL-T/HDI/CSN 1.1/1.0/1.1 |
| 15-01 | F | C-Oil/HDI/TOL | C-Oil/HDI 1.1/1.0 |
| 15-02 | UAN | PCL-T/HDI/TOL | PCL-T/HDI 1.1/1.0 |

Figure 11:
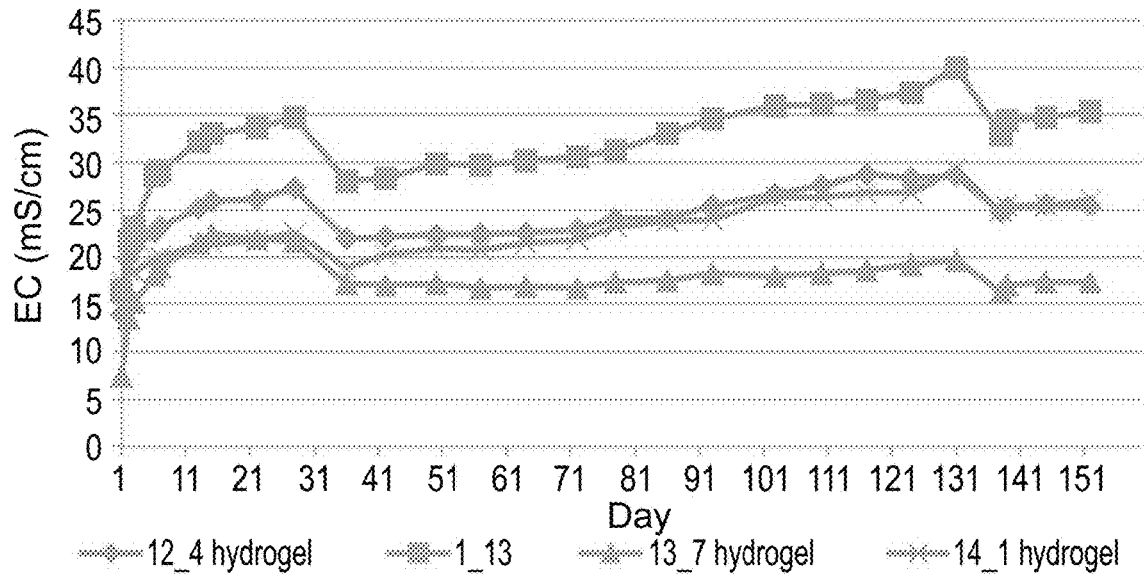
FIG. 11 presents a comparative plot of electric conductance as a function of time, showing the rate of release of a concentrated NPK fertilizer solution from polyHIPE sample Nos. 12-4, 13-1, 13-7, 14-1.

Release Rate from PUU polyHIPEs:

Two aqueous solutions of fertilizers were encapsulated in the biodegradable PUUs that appear in FIG. 11: 12-6-6 (45% TDS) in polyHIPE sample Nos. 13-7 and 14-1, and 12-6-6 with KCl (46% TDS) in polyHIPE sample Nos. 13-1 and 12-4.

FIG. 11 presents a comparative plot of electric conductance as a function of time, showing the rate of release of a concentrated NPK fertilizer solution from polyHIPE sample Nos. 12-4, 13-1, 13-7, 14-1.

As can be seen in FIG. 11, polyHIPE sample Nos. 13-1, 12-4, and 14-1 released most of the fertilizer within about 30 days. After 30 days, there was a moderate EC increase until day about day 120. For poly-HIPE sample No. 13-7, most of the fertilizer was released within about 30 days, and after about 130 days it seems that no further fertilizer was released. In general, all four polyHIPE samples exhibited similar fertilizer release profiles, while the recorded decrease in EC occurred when the calibration solution was changed. PolyHIPE sample No. 14-1 showed a moderate release profile in which 80% of the fertilizer was released within 78 days and 100% release was observed after about 130 days. For polyHIPE sample Nos. 12-4 and 13-1 a fast release was observed, with 80% of the fertilizer released within 6 and 13 days respectively and 100% release after about 130 days. For polyHIPE sample No. 13-7, a very fast release was observed within a few days wherein 80% of the fertilizer was released within 6 days, and 100% release was observed after 15 days.

The elemental analysis of the fertilizer released into water from PUU polyHIPE sample Nos. 12-4, 13-1, 13-7 and 14-1 are summarized in Table 26 in terms of percent NPK.

TABLE 26

| SMPL | N—NO$_3$ | N—NH$_4$ | N-Urea | N-Total | P$_2$O | K$_2$O |
|---|---|---|---|---|---|---|
| 12-4 | 76.5 | 95.6 | 3.8 | 45.56 | 86.9 | 126.1 |
| 13-1 | 67.1 | 105.2 | 41.9 | 64.5 | 77.4 | 116.1 |
| 13-7 | 66.9 | 72.0 | 7.05 | 39.5 | 68.2 | 100.0 |
| 14-1 | 52.2 | 52.2 | 2.7 | 26.1 | 50 | 69.6 |

As can be seen in Table 26, for PUU-based polyHIPEs sample Nos. 12-4, 13-1 and 13-7, all the K$_2$O was released, about 70% of the P$_2$O$_5$ was released and lower results were obtained for the N release due to the very low release of the N from the urea. For polyHIPE sample No. 14-1, not all the NPK was released. It is noted that for the PUU polyHIPEs, N from the urea showed low release results, presumably due to a reaction between the urea from the fertilizer and the polymer's skeleton.

Figure 12:
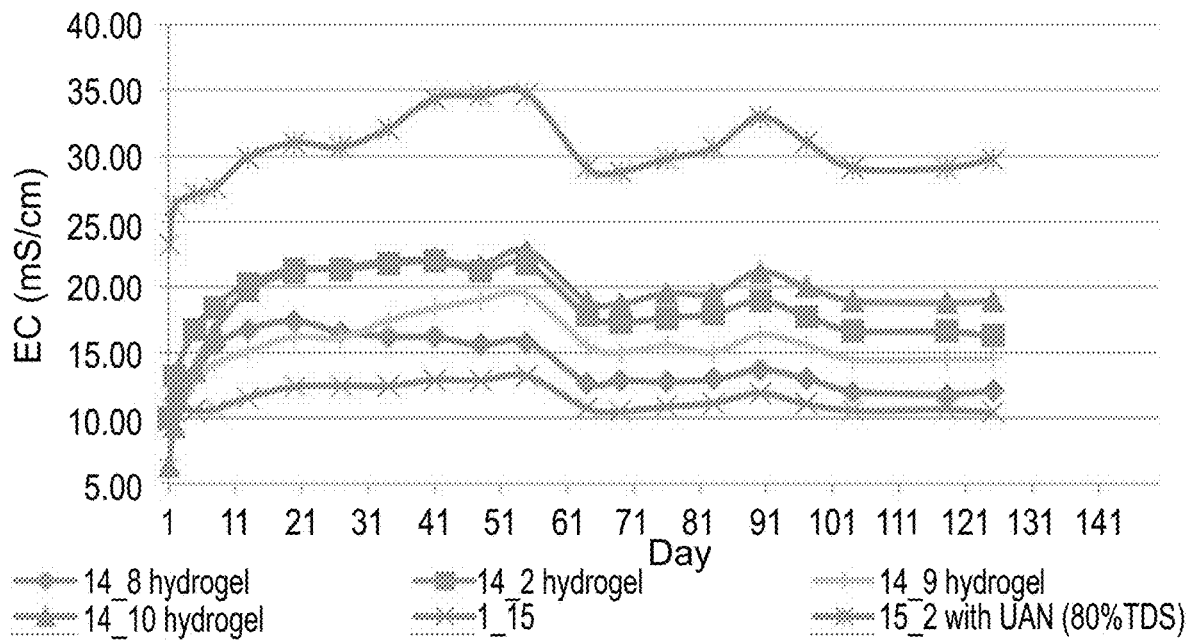
FIG. 12 presents a comparative plot of electric conductance as a function of time, showing the rate of release of a concentrated fertilizer solution from polyHIPE sample Nos. 14-8, 14-2, 14-9, 14-10, 15-1 and 15-2.

Two aqueous solutions of fertilizers were encapsulated in the biodegradable PUUs that appear in FIG. 12: 12-6-6 (45% TDS) in polyHIPE sample Nos. 14-8, 14-2, 14-9, 14-10 and 15-1, and UAN (80.6% TDS) in polyHIPE sample No. 15-2.

FIG. 12 presents a comparative plot of electric conductance as a function of time, showing the rate of release of a concentrated fertilizer solution from polyHIPE sample Nos. 14-8, 14-2, 14-9, 14-10, 15-1 and 15-2.

As can be seen in FIG. 12, polyHIPE sample No. 15-1 exhibited higher EC values due to the fact that the UAN encapsulated inside contains a higher TDS. Most of the fertilizer (80%) was released from the PUU-based polyHIPEs (sample Nos. 14-8, 14-2, 14-9, 14-10, 15-1 and 15-2) over a time period ranging from 5 to 20 days, while 100% release was observed after 55 days. The decrease in the EC measurement was due to the replacement of the calibration solution.

The elemental analysis of the fertilizer released into water from PUU polyHIPE sample Nos. 14-8, 14-2, 14-9, 14-10, 15-1 and 15-2 are summarized in Table 27 in terms of percent NPK.

TABLE 27

| SMPL | N—NO$_3$ | N—NH$_4$ | N-Urea | N-Total | P$_2$O | K$_2$O |
|---|---|---|---|---|---|---|
| 14-8 | 62.5 | 50.0 | 12.5 | 30.8 | 68.8 | 193.8 |
| 14-2 | 56.0 | 71.1 | 38.6 | 51.1 | 78.3 | 104.3 |
| 14-9 | 58.2 | 66.8 | 36.7 | 41.2 | 76.5 | 105.9 |
| 14-10 | 45.5 | 65.9 | 7.4 | 31.15 | 54.8 | 83.9 |
| 15-1 | 26.5 | 24.5 | 19.6 | 41.7 | 75.0 | 166.7 |
| 15-2 | 8.5 | 99.7 | 5.8 | 30.1 | ND | ND |

As can be seen in Table 27, the K$_2$O concentration obtained by analysis is 100% or above, the P$_2$O$_5$ concentration obtained is about 70%, and the nitrogen concentration obtained by analysis is lower than the calculated values. NPK release from polyHIPE sample No. 14-10 was not complete after the designated experiment duration. For polyHIPE sample No. 15-2, in which a UAN with a relatively high TDS was encapsulated, the N concentration obtained by analysis was lower than the calculated concentration. In general, analyses were performed for nitrate nitrogen, ammonia nitrogen and urea nitrogen, and it can be seen that the urea nitrogen concentration obtained is systematically lower than the total concentration of nitrate and ammonia nitrogen.

In conclusion, PCL-containing PUU polyHIPEs were shown as capable of encapsulating and releasing high concentration solutions of NPK fertilizers over time periods that range from a few days to 2-3 months or longer. In general, nitrogen-containing species are releases at levels lower than expected, presumably due to urea being consumed during polymerization with diisocyanate.

Example 5

Fertilizer-Encapsulating PolyHIPE Pellets

Preparation of Beads:

The sedimentation polymerization technique which were successful in case of water-filled reference polyHIPEs was adapted and modified in order to be suitable for fertilizer-containing polyHIPEs. In sedimentation polymerization, beads are produced by injection of HIPE droplets into a column filled with water at 65° C. or higher, temperatures high enough to initiate polymerization. The droplets sink through the column, polymerization is initiated, and solid bead are formed before the sinking droplets reach the bottom of the column. This methodology was found inadequate for fertilizer-filled polyHIPEs, and possibly for any polyHIPE encapsulating an aqueous solution of a high concentration of solutes. In the case of high fertilizer content polyHIPE, according to some embodiments of the present invention, a concentration gradient developed between the fertilizer-filled HIPE and the surrounding water phase, leading to diffusion of the fertilizer out of the HIPE. In order to avoid this concentration gradient, it was suggested to polymerize the HIPEs in a concentrated fertilizer solution at 65° C. or higher. Injecting HIPE into hot UAN solution, instead of water, would suppress diffusion of the fertilizer from the HIPE. However, since the density of the HIPE is less than that of the hot fertilizer solution, the HIPE droplets will not sink in the column, but rather float on the surface. Therefore, the present inventors have developed a suitable technology wherein the HIPE droplets are injected into the bottom of a column of a hot fertilizer solution at 65° C. or higher. The droplets then rise through the column due to density difference, thereby producing polymerized beads by "buoyancy polymerization" technology.

Figure 13:
FIG. 13 is a photograph of bead- and rod-shaped pellets of UAN-filled, EHA-based polyHIPEs, according to some embodiments of the present invention, produced by polymerization in hot solution of UAN fertilizer, wherein the pile of rod-shaped and talcum powder coated pellets of polyHIPE sample No. kb-151 is shown on the left, the pile of bead-shaped and $Ca_3(PO_4)_2$ coated pellets of polyHIPE sample No. kb-163 is shown on the right, and a centimeter ruler is shown for proportion.

FIG. 13 is a photograph of bead- and rod-shaped pellets of UAN-filled, A12-based polyHIPEs, according to some embodiments of the present invention, produced by polymerization in hot solution of UAN fertilizer, wherein the pile of rod-shaped and talcum powder coated pellets of polyHIPE sample No. kb-151 is shown on the left, the pile of bead-shaped and $Ca_3(PO_4)_2$ coated pellets of polyHIPE sample No. kb-163 is shown on the right, and a centimeter ruler is shown for proportion.

As can be seen in FIG. 13, the formation of bead- and rod-shaped pellets of UAN-filled, A12-based polyHIPEs serves as a proof of concept for some embodiments of the present invention, which was successfully demonstrated by injecting the HIPEs onto hot UAN fertilizer solution using a wide-mouth plastic syringe. After 2-3 minutes of polymerization in hot fertilizer, the rods/beads were dried using wipes and coated with baby powder or insoluble $Ca_3(PO_4)_2$ to prevent sticking. To ensure full polymerization, the coated beads were placed overnight in an oven at 65° C.

Preparation of Disks:

Larger disk-shaped polyHIPEs were also produced using "cookie sheet" processing. PolyHIPE objects were produced by casting or injecting HIPE from a syringe. The HIPEs were placed on a smooth, low surface tension, polymer substrate, much as balls of dough on a cookie sheet. The high viscosity of the HIPE prevented the samples from spreading over the surface. Polymerization was effected by placing the "cookie sheets" bearing the HIPEs in an oven at 65° C. for 24 hour.

Figure 14:
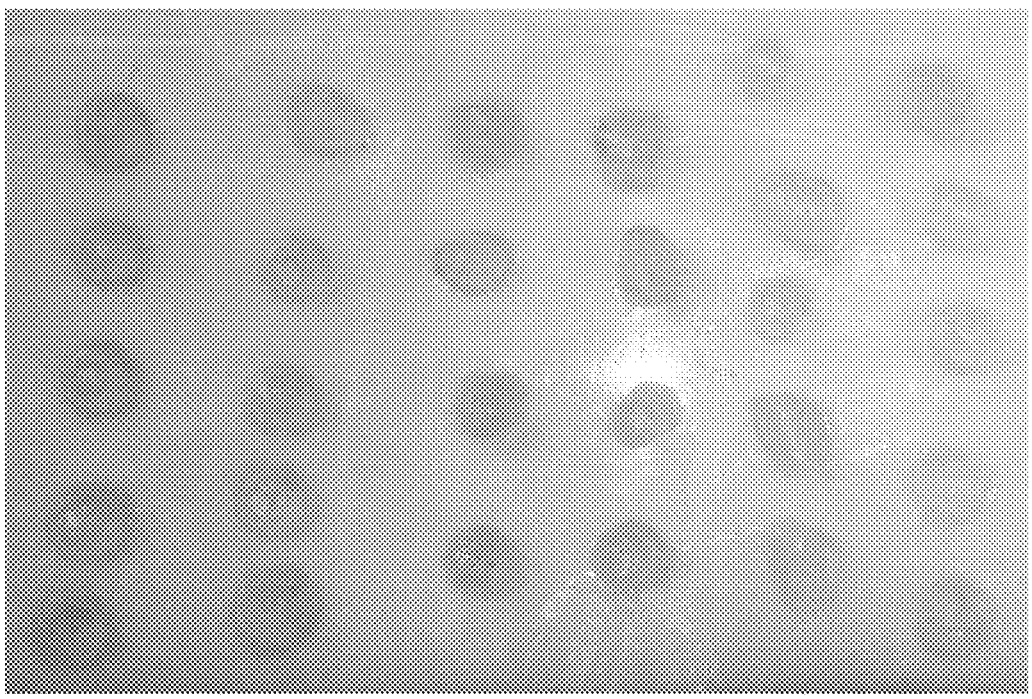
FIG. 14 is a photograph a sample of UAN-filled, EHA-based polyHIPE disks produced by the "cookie sheet" process.

FIG. 14 is a photograph of a sample of UAN-filled, A12-based polyHIPE disks produced by the "cookie sheet" process.

In conclusion, fertilizer-encapsulating polyHIPEs can be produced commercially in any shape and form using well known methodologies, such as casting and injection molding. The results show that standardized disk-shaped samples of polyHIPEs, controllably releasing encapsulated solutions of very high concentrations, can be produced. Exemplary fertilizer-containing polyHIPE beads were successfully produced while taking into account concentration gradient, buoyancy, and surface, considerations, thereby serving as proof of concept of a novel and general bead-producing methodology.

Example 6

Bulk Crosslinking Effect

The following study is aimed at studying the correlation between the microstructure of a substance-encapsulating polyHIPE and the substance-release profile. The base assumption is that substance-releasing systems based on closed-cell polyHIPEs will exhibit a low burst release phase. Since the closedness of the cells in a polyHIPE depend, inter alia, on keeping the crosslinking hubs at the interface between the HIPE phases, and since adding a bulk crosslinking agent to the continuous organic phase (the polymerization mixture) negates this notion, it is expected that the closedness of the cells in the polyHIPE will decrease with the increase in the amount of the bulk crosslinking. Albeit the concentration of solute (highly soluble sodium sulfate salt) used in these experiments is considerably lower than the concentration of the solute in a typical/practical fertilizer application, the following model was used to study the effect of the polyHIPE microstructure on substance-release profile, rather than the combined effect of the microstructure and the osmotic swelling.

Theoretical Basis:

The most generally accepted mathematical model for describing release profile of a substance from a polymeric matrix is based on a combination of two types of diffusion processes, known as Fickian and non-Fickian diffusions, wherein Fickian diffusion follows Fick's laws of diffusion, and non-Fickian diffusion covers all other modes of diffusion. It is assumed that the polymer may augment the diffusion characteristics being a barrier that must be passed before the substance can be detected outside the polymeric matrix. The capacity of a substance to pass a polymeric barrier relates inter alia to the relaxation properties of the polymer, which are derived from its chemical composition and the degree of crosslinking. Thus, other than being dependent on the charge, polarity, solubility, size, chemical composition and concentration of the substance, the rate of diffusion and transport of the substance through a polymeric barrier depends on the permeability of the polymer; and the permeability of the polymer depends on its permeability to molecules of the transport media (e.g., water), its capacity to swell in the transport media, its mechanical properties such as elasticity and glass transition temperature, and the presence of structural defects in the polymer that may be permanent or temporary (reversible/mendable) as a result of swelling and/or degradation of the polymer.

Thus, the level of deviation from Fickian diffusion depends inter alia on the tightness and permeability of the polymeric barrier, and in the context of a polyHIPE, level of deviation from Fickian diffusion correlates to the chemical composition and the microstructure of the polyHIPE, and more specifically to the level of closedness of the cells (pores). As discussed hereinabove, the closedness of the polyHIPE's cells depends inter alia on the chemical composition and the degree of crosslinking of the polymer. Thus, a study of the level of deviation from Fickian diffusion is an indirect study of the microstructure and the molecular structure of the substance-releasing polyHIPE.

A general mathematical model that successfully describes Fickian and non-Fickian of the first 60% of the substance transport (diffusion) from polymer carriers, which has been found useful in covering erosion of the polymer carrier, has been proposed by Peppas and co-workers [*J. Controlled Release*, 1987, 5(1), pp. 23-36; *J. Controlled Release*, 1987, 5(1), pp. 37-42; and *Int. J. Pharmaceutics*, 1989, 57(2), pp. 169-172], is presented in Equation 1 below:

$$\frac{Mt}{M\infty} = kt^n \quad \text{Equation 1}$$

wherein $M_t$ represents the fraction of substance released at time t, $M_\infty$ is the total amount of salt encapsulated in the system and thus $M_t/M_\infty$ is the fractional drug release, k is the kinetic constant of apparent release, and n is the diffusion exponent characterizing the release and transport mechanism of the substance from the polymer matrix. When n=0.5 the release mechanism is Fickian diffusion mechanism (Case I), when n=1, Case II transport occurs leading to zero-order release, and when n is between 0.5 and 1, the substance diffusion/transport is referred to as anomalous.

Equation 1 is not simply heuristic but is based on fundamental physical principles, i.e., the fact that in relaxation or erosion based systems the slow displacement of the macromolecular chains creates a system that is not at mechanical equilibrium. Thus, substance release and transport through a polymeric system cannot be described by a simple Fickian equation. This observation led to the realization that a diffusion/relaxation equation would be more appropriate. Thus, the final model/equation is based on physical phenomena and principles and is not a simple "fitting equation" or an exercise in parametric fitting.

Equation 1 has also been shown to be applicable to ensembles of microparticles of a wide distribution, and to polymeric releasing systems exhibiting phase transition or erosion (degradation).

While Equation 1 has been developed for planar geometry (thin film), it can be used also for analysis of spherical or cylindrical devices, although the limiting values of the exponent n would be different from the commonly known 0.5 and 1 (of the slab/planar devices) as shown in Table 28, reproduced from the work of Peppas and co-workers [*J. Controlled Release*, 1987, 5(1), pp. 23-36].

TABLE 28

| | Diffusional exponent, n | | |
|---|---|---|---|
| Thin film | Cylindrical sample | Spherical sample | Release mechanism |
| 0.5 | 0.45 | 0.43 | Fickian diffusion (Case I) |
| 0.5 < n < 1.00 | 0.45 < n < 1.00 | 0.43 < n < 1.00 | Anomalous transport (Non-Fickian diffusion) |
| 1.0 | 1.0 | 1.0 | Zero-order release (Case II) |

According to the relative rates of diffusion ($R_{diff}$) and polymer relaxation ($R_{relax}$), in Fickian diffusion mechanism (Case I; n=0.5) the rate of diffusion is much smaller than the rate of polymer relaxation ($R_{diff} \ll R_{relax}$, system controlled by diffusion), in Case II (n=1.0) the diffusion process is much faster than the relaxation process ($R_{diff} \gg R_{relax}$, system controlled by relaxation), and in non-Fickian or anomalous diffusion mechanism (0.5<n<1.0) the diffusion and relaxation rates are comparable ($R_{diff} \approx R_{relax}$). Occasionally, values of n>1 are referred to as Super Case II kinetics. When the release rate is much below the polymer chain relaxation rate, it is possible to record the n values below 0.5. This situation, which is classified also as Fickian diffusion, is called as 'Less Fickian' behavior. In some embodiments, for cylindrical geometry Case I n=0.45, Case II n=0.89 and non-Fickian 0.45>n>0.89. Experimental results for diffusion from an assembly of polydisperse spheres, as in the case of a substance-releasing polyHIPE, n can be as low as 0.3.

PolyHIPE Synthesis:

The basic exponential equation has a simple form and thus it has been used to analyze data by a simple mathematical and statistical analysis. In order to characterize the microstructure of the polyHIPE systems which are useful for the release a fertilizer composition, various polyHIPEs encapsulating an aqueous solution of 4.4% by weight $Na_2SO_4$, which is considerably lower than the concentration of a fertilizer in a typical agricultural application. The experiment was designed to follow changes in electric conductance of deionized water in which samples of the polyHIPE systems have been placed, and the diffusional exponent was found by plotting the ratios of released $Na_2SO_4$ as a function of time in log-log plots and fitting a power law curve in Equation 1.

Briefly, the mass ratio of the internal phase to the external phase was maintained at around 81/19 for all the syntheses. The organic phase and the internal phase were prepared separately. The HIPE-stabilizing nanoparticles (NPs) were dispersed within the monomer mixtures (EHA only or EHA/PCL-MA mixture) using overhead stirrer at 500-600 rpm. The internal phase containing 10 wt % $Na_2SO_4.10H_2O$ solution (or 4.4 wt % $Na_2SO_4$ solution) and KPS was slowly dripped into the organic phase with continuous stirring (400-500 rpm). The HIPE was transferred into a silicone mold, about 6.0 grams of emulsion in each mold cell. The mold was then wrapped with two layers of plastic wrap, and the HIPE samples were polymerized in an oven at 65° C. for 20 hours without stirring. The polymerization in all the samples was initiated by KPS.

This series of $Na_2SO_4$-encapsulating polyHIPEs was prepared using two types of stabilizing NPs, silica mineral nanoparticles (MNPs) or St/DVB/MAn polymeric nanoparticles (PNPs) and various ratios of EHA and PCL-MA. MNPs were used at 5 wt % of the organic phase, while PNPs at 10 wt % content. The ratios of PCL-MA/EHA were as follows: 0/100, 20/80, 40/60 and 60/40. Toluene was added to the high-viscosity PL-60 HIPE during HIPE formation to enable the formation of a PNP-stabilized 60/40 PCL-MA/EHA HIPE. Adding toluene to this HIPE produced a relatively small reduction in the relative amounts of all other HIPE components as well as the aqueous internal phase from 81% to 80%. All MNP-stabilized HIPEs are coded by ML, and all PNP-stabilized HIPEs are coded by PL, while the indexes 0, 20, 40 and 60 indicate PCL content.

It is noted that the addition of a bulk crosslinking agent, such as PCL-MA, is expected to augment the closedness of the cells in the polyHIPE.

Table 29 presents the recipes of the polyHIPEs for which the diffusional exponents and half-lives were calculated.

TABLE 29

| | | Content, wt % | | | | | | |
|---|---|---|---|---|---|---|---|---|
| | Component | ML-0 | ML-20 | ML-40 | PL-0 | PL-20 | PL-40 | PL-60 |
| External, organic phase | EHA | 17.79 | 14.23 | 10.62 | 16.77 | 13.42 | 10.06 | 6.59 |
| | PCL-MA | 0 | 3.56 | 7.08 | 0 | 3.35 | 6.71 | 9.89 |
| | NPs | 0.94 | 0.94 | 0.93 | 1.86 | 1.86 | 1.86 | 1.83 |
| | Toluene | 0 | 0 | 0 | 0 | 0 | 0 | 1.70 |
| | Total | 18.73 | 18.73 | 18.64 | 18.64 | 18.64 | 18.64 | 20.02 |
| Internal, phase | $Na_2SO_4$ 4.4 % solution | 80.27 | 80.27 | 79.87 | 79.87 | 79.87 | 79.87 | 78.51 |
| | KPS | 1.00 | 1.00 | 1.50 | 1.50 | 1.50 | 1.50 | 1.47 |
| | Total | 81.27 | 81.27 | 81.36 | 81.36 | 81.36 | 81.36 | 79.97 |

Determination of Diffusional Exponent:

To determine the release mechanism by following release rates, cylinders of about 3 cm diameter and 2 cm height were immersed in fresh deionized water at 15 grams water per 1 gram of the polyHIPE system sample. At the beginning electrical conductivity was measured every few days, after reaching a continuous release the measurements were conducted once a week, and after longer periods of testing (more than 80 days) EC was measured once every 2-4 weeks.

Figure 15:
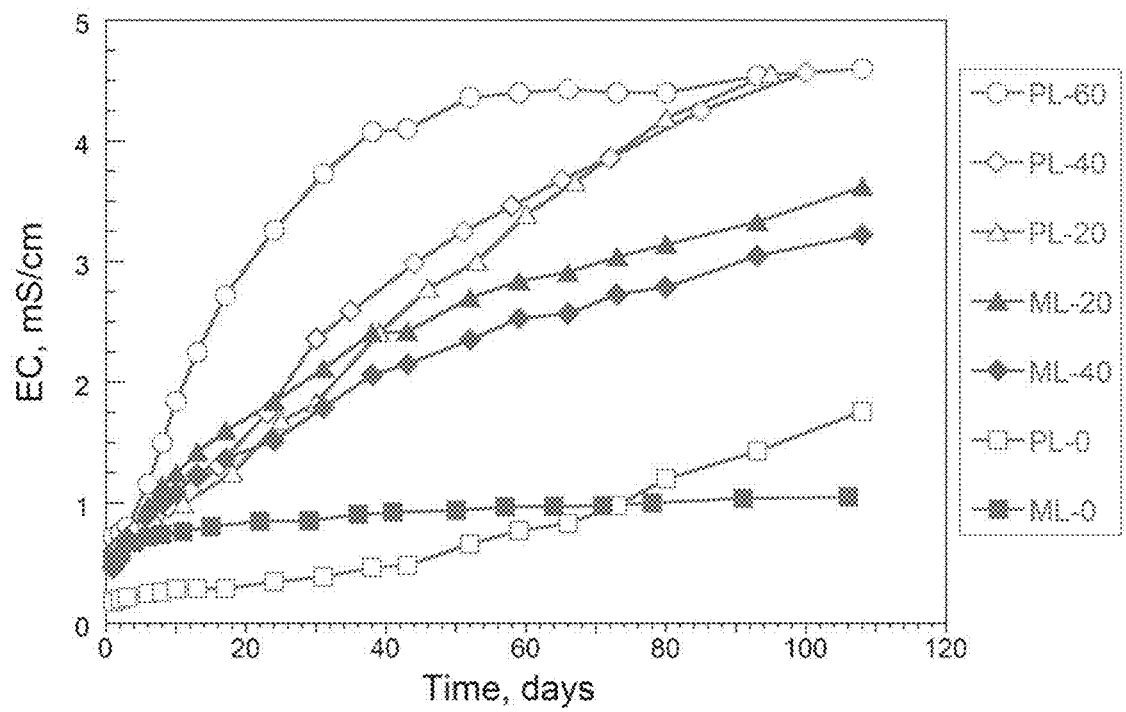
FIG. 15 presents comparative plots of electric conductance (EC) measurements as function of time, reflecting the rate of release of $Na_2SO_4$ solution encapsulated in a series of cylindrical polyHIPE samples Nos. ML-0, ML-20, ML-40, PL-0, PL-20, PL-40 and PL-60, presented in Table 29, wherein the sample codes starting with P represent HIPEs stabilized with polymeric nanoparticles and M represent HIPEs stabilized with mineral (silica) nanoparticles, and the following number represents the ratio of EHA to PCL-MA in the co-polymeric mixtures; IG. 16 presents comparative log-log plots for $Na_2SO_4$ release from polyHIPE sample Nos. ML-0, ML-20, ML-40, PL-0, PL-20, PL-40 and PL-60, presented in Table 29, stabilized with MNPs and PNPs prepared with different ratios of EHA and PCL-MA monomers, fitted to a linear function of release rate versus time, the slopes of which represent the diffusional exponent of each plot.

FIG. 15 presents comparative plots of electric conductance (EC) measurements as function of time, reflecting the rate of release of Na2SO4 solution encapsulated in a series of cylindrical polyHIPE sample Nos. ML-0, ML-20, ML-40, PL-0, PL-20, PL-40 and PL-60, presented in Table 29, wherein the sample codes starting with PL represent HIPEs stabilized with polymeric nanoparticles and ML represent HIPEs stabilized with mineral (silica) nanoparticles, and the following number represents the ratio of EHA to PCL-MA in the co-polymeric mixtures.

Figure 16:
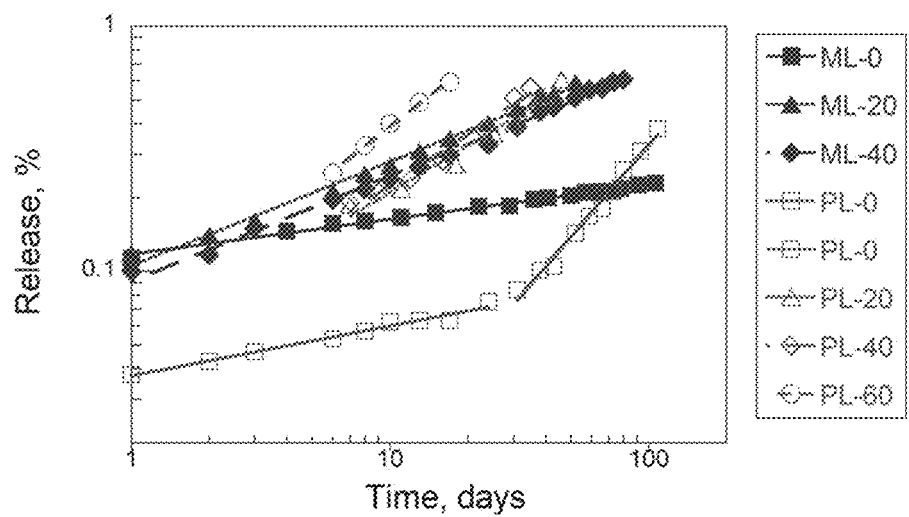

FIG. 16 presents comparative log-log plots for Na2SO4 release from polyHIPE sample Nos. ML-0, ML-20, ML-40, PL-0, PL-20, PL-40 and PL-60, presented in Table 29, stabilized with MNPs and PNPs prepared with different ratios of EHA and PCL-MA monomers, fitted to a linear function of release rate versus time, the slopes of which represent the diffusional exponent of each plot.

The diffusional exponent and $t^{1/2}$ values presented in Table 30 are based on the $Na_2SO_4$ release data presented in FIG. 15 and FIG. 16.

TABLE 30

| Sample name | Diffusional exponent, n | $t_{1/2}$, days | Type of diffusional mechanism |
|---|---|---|---|
| ML-0 | 0.14 | 25,000 | Fickian |
| ML-20 | 0.42 | 39 | Fickian |

TABLE 30-continued

| Sample name | Diffusional exponent, n | $t_{1/2}$, days | Type of diffusional mechanism |
|---|---|---|---|
| ML-40 | 0.43 | 52 | Fickian |
| PL-0 | 0.20 then 1.25 | 125 | Fickian then Case II |
| PL-20 | 0.63 | 39 | Anomalous |
| PL-40 | 0.69 | 32 | Anomalous |
| PL-60 | 0.82 | 12 | Anomalous |

As can be seen in FIG. 15, FIG. 16 and Table 30, HIPEs stabilized with silica NPs gave rise to polyHIPEs characterized with smaller diffusional exponent values compared to the polyHIPEs stemming from HIPEs stabilized with polymeric NPs. Furthermore, all polyHIPEs exhibited diffusional exponent values that increased with increasing amounts of the crosslinking monomer PCL-MA.

A linear release profile exhibits a slope of 1 in the linear section of a log release (R) vs. log time (t) plot, wherein the slope is the "diffusional exponent" in the power-law $R = k \cdot t^n$. Typical diffusion has a diffusional exponent of 0.5, while an assembly of polydisperse substance-releasing spheres, similar to the structure of the presently disclosed polyHIPEs, can have a diffusional exponent of 0.3. Having a diffusional exponent greater than 1 may indicate that the rate of polyHIPE degradation increases with time such that the rate of release increases with time.

The results support the assumption that in order to minimize burst release, a polyHIPE encapsulating a dissolved substance should exhibit as much closed-cell microstructure as possible. The results also indicate that the substance-release profile can be fine-tuned by the addition of a bulk crosslinking agent.

Example 7

Burst Release and Osmotic Swelling

The substance-release profile of a polyHIPE-based system, according to some embodiments of the present invention, depends, inter alia, on the effect that the encapsulated substance, especially its concentration, has on the permeability of the encapsulating elastomer.

Theoretical Basis:

In the following study, the encapsulated substance is a highly concentrated fertilizer that is expected to confer an osmotic pressure on the elastomer, and thus it is expected to confer substantial osmotic swelling on the polyHIPE, which in turn is expected to affect the microstructure of the polyHIPE. Without being bound by any particular theory, it is expected that the high concentrated and encapsulated substance will cause water to diffuse into the cells through the elastomer walls, thereby increasing the volume of the cells and thinning the thickness of the walls. This osmotic swelling is therefore expected to affect the permeability of the elastomer to the dissolved substance via a combination of mechanisms, including wall thinning and wall puncturing (forming temporary or permanent windows in the wall).

Bulk Crosslinking Agent Effect:

The following study follows the effect of using a bulk crosslinking agent on the substance release profile. A series of HIPEs comprising an elastomer, stabilized by modified NPs and polymerized at the HIPE phase interface was produced to encapsulate either highly concentrated urea ammonium nitrate (UAN) having a total dissolved solids (TDS) content of around 80% or CN-TH.

Figure 17:
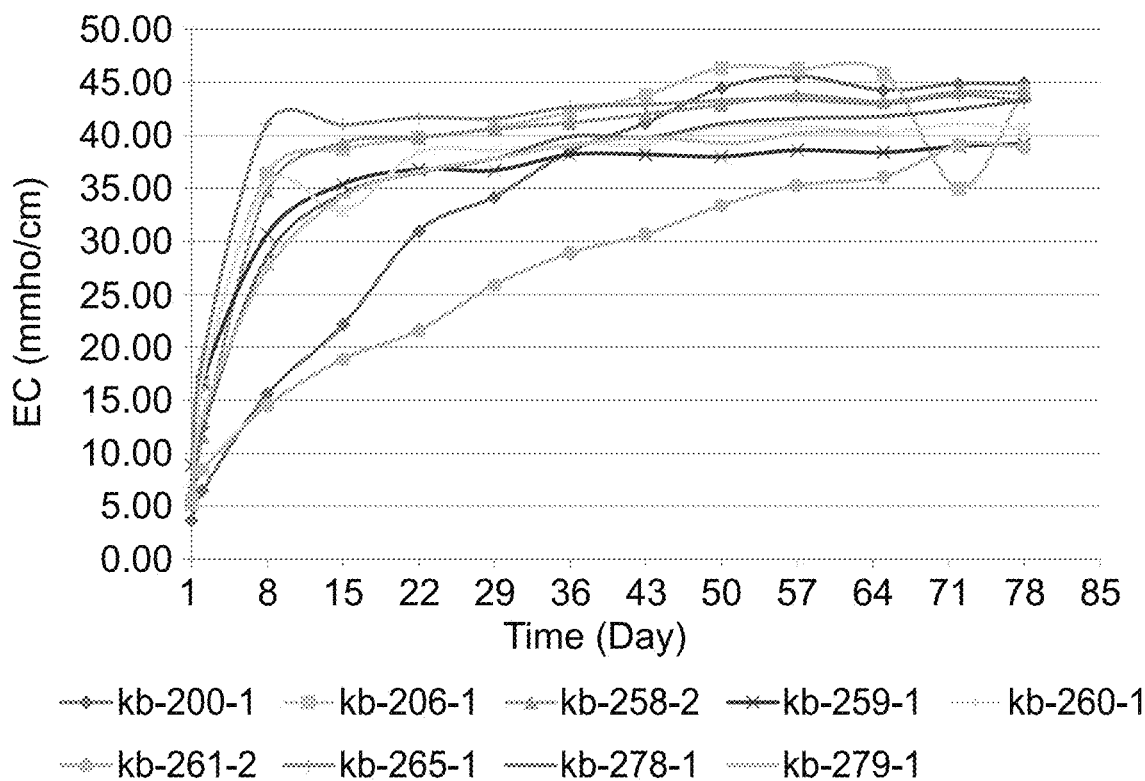
FIG. 17 presents comparative plots of electric conductance as a function of time, measured for a series of degradable fertilizer-containing polyHIPE sample Nos. kb-200, kb-201, kb-206, kb-210, kb-258, kb-259, kb-260, kb-261, kb-265, kb-266, kb-278 and kb-279, wherein all samples contain the same amount of the fertilizer but differ in the polymer composition as presented in Table 6, showing the fertilizer-release profile recorded over a time period of 78 days, wherein the range of 40-45 mmoh/cm represents complete release of the fertilizer into the aqueous environment (initially deionized water)

FIG. 17 presents comparative plots of electric conductance as a function of time, measured for a series of degradable fertilizer-containing polyHIPE sample Nos. kb-200, kb-201, kb-206, kb-261, kb-266, kb-278 and kb-279, which contain UAN, and sample Nos. kb-210, kb-258, kb-259, kb-260, and kb-265, which contain CN-TH, wherein all samples contain the same amount of the fertilizer but differ in the polymer composition as presented in Table 6, showing the fertilizer-release profile recorded over a time period of 78 days, wherein the range of 40-45 mmoh/cm represents complete release of the fertilizer into the aqueous environment (initially deionized water).

As can be seen in FIG. 17, all fertilizer-containing polyHIPE samples release all the encapsulated fertilizer into the environment over the period of 78 day, with the exception of the polyHIPE sample denoted "261-1" and "200-1" (kb-261 and kb-200 in Table 6, respectively), which exhibited a low burst release phase, indicative of a more closed-cell microstructure compared to the other polyHIPE samples. It is noted that polyHIPE samples kb-261 is based on PCL-MA2/A12 while polyHIPE sample kb-200 is based on PCL-MA2/EHA (both MNP-stabilized), wherein the ratio between PCL-MA2 and the acrylate (A12 or EHA) is 1:4, namely the lowest level of bulk crosslinking.

The results presented in FIG. 17 are in line with the rudimentary paradigm that a true-closed-cell microstructure is obtained when the initiation and crosslinking are substantially limited to the interface between the two HIPE phases, and that the more bulk crosslinking occurs, the less the microstructure is of truly closed-cell nature.

Elastomer Permeability Under Osmotic Pressure:

In this study follows the effect of the chemical composition of the encapsulating elastomer on the permeability of the elastomer. The closed-cell microstructure in a substance-releasing system can be determined and identified by showing that the system exhibits a low burst release or the lack of a burst release. The magnitude of this burst release, as defined herein, can be experimentally recorded and identified in the substance-release profile. Thus, the following study also shows that determination of the closedness of the microstructure can be afforded by release profile studies.

Table 31 presents recipes of nine fertilizer-containing polyHIPE samples, each encapsulating a substance being a concentrated UAN fertilizer solution containing 32% nitrogen in about 80% TDS, wherein the precursor HIPE is stabilized with 3-(methacryloxy)propyltrimethylsilane-modified silica nanoparticles (MNPs) or polymeric nanoparticles (PNPs), and the elastomer comprises 2-ethylhexylacrylate (EHA), lauryl acrylate (A12) and/or lauryl methacrylate (MA12), and polymerization is initiated at the phase interface from within the internal phase using potassium persulfate (KPS).

TABLE 31

| kb-33 | | Content, wt % |
|---|---|---|
| External organic phase | PNPs | 1.48 |
| | EHA | 13.3 |
| | Total | 14.78 |
| Internal phase | UAN | 82.3 |
| | KPS | 2.93 |
| | Total | 85.22 |
| Total weight | | 100 |
| kb-40 | | Content, wt % |
| External organic phase | PNPs | 1.48 |
| | A12 | 6.65 |
| | EHA | 6.65 |
| | Total | 14.78 |
| Internal phase | UAN | 82.3 |
| | KPS | 2.93 |
| | Total | 85.22 |
| Total weight | | 100 |
| kb-42 | | Content, wt % |
| External organic phase | MNPs | 0.71 |
| | EHA | 7.03 |
| | A12 | 7.03 |
| | Total | 14.78 |
| Internal phase | UAN | 82.3 |
| | KPS | 2.93 |
| | Total | 85.22 |
| Total weight | | 100 |
| kb-43 | | Content, wt % |
| External organic phase | MNPs | 0.71 |
| | MA12 | 14.07 |
| | Total | 14.77 |
| Internal phase | UAN | 82.3 |
| | KPS | 2.93 |
| | Total | 85.23 |
| Total weight | | 100 |
| kb-44 | | Content, wt % |
| External organic phase | MNPs | 0.71 |
| | EHA | 7.03 |
| | MA12 | 7.03 |
| | Total | 14.78 |
| Internal phase | UAN | 82.3 |
| | KPS | 2.93 |
| | Total | 85.22 |
| Total weight | | 100 |
| kb-45 | | Content, wt % |
| External organic phase | MNPs | 0.71 |
| | A12 | 7.03 |
| | MA12 | 7.03 |
| | Total | 14.78 |

TABLE 31-continued

| | | |
|---|---|---|
| Internal phase | UAN | 82.3 |
| | KPS | 2.93 |
| | Total | 85.22 |
| Total weight | | 100 |

| kb-46 | | Content wt % |
|---|---|---|
| External organic phase | MNPs | 0.71 |
| | A12 | 14.07 |
| | Total | 14.77 |
| Internal phase | UAN | 82.3 |
| | KPS | 2.93 |
| | Total | 85.23 |
| Total weight | | 100 |

| kb-47 | | Content, wt % |
|---|---|---|
| External organic phase | MNPs | 1.46 |
| | EHA | 13.32 |
| | Total | 14.78 |
| Internal phase | UAN | 82.3 |
| | KPS | 2.93 |
| | Total | 85.22 |
| Total weight | | 100 |

| kb-48 | | Content, wt % |
|---|---|---|
| External organic phase | MNPs | 1.48 |
| | A12 | 13.3 |
| | Total | 14.78 |
| Internal phase | UAN | 82.3 |
| | KPS | 2.93 |
| | Total | 85.22 |
| Total weight | | 100 |

Figure 18:
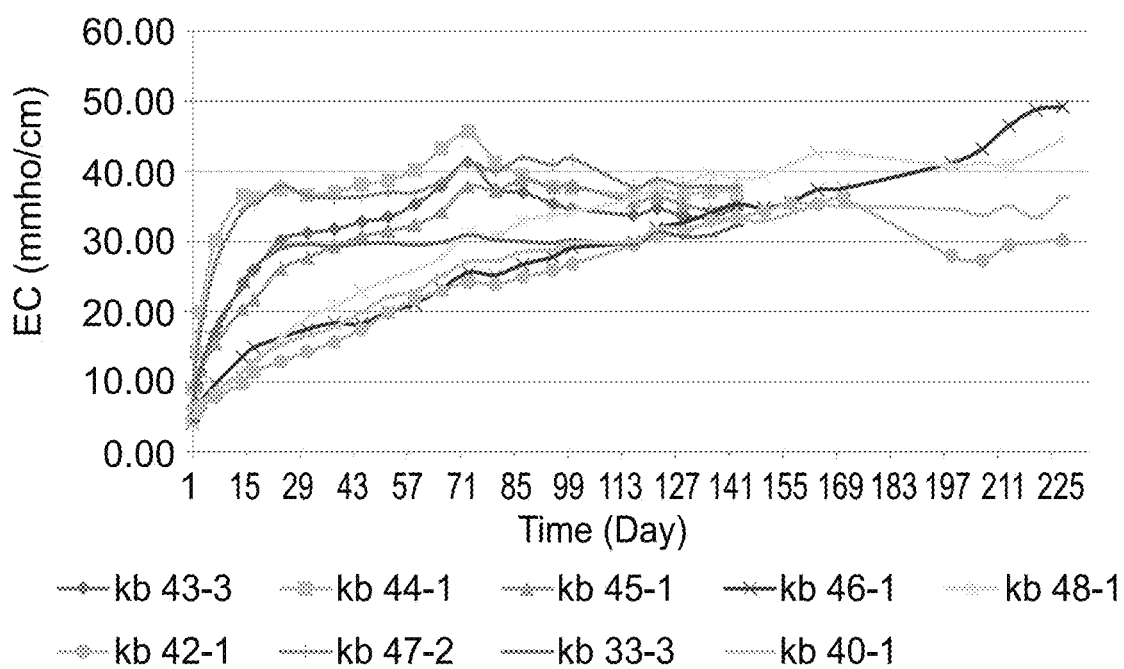
FIG. 18 presents comparative plots of electric conductance as a function of time, measured for nine UAN fertilizer-containing polyHIPEs, the recipes of which are presented in Table 30, wherein all samples contain the same amount of the fertilizer but differ in the polymer composition, showing the fertilizer-release profile recorded over a time period of 228 days, wherein the range of 30-40 mmoh/cm represents complete release of the fertilizer into the aqueous environment (initially deionized water).

FIG. 18 presents comparative plots of electric conductance as a function of time, measured for nine UAN fertilizer-containing polyHIPEs, the recipes of which are presented in Table 31, wherein all samples contain the same amount of the fertilizer but differ in the polymer composition, showing the fertilizer-release profile recorded over a time period of 228 days, wherein the range of 30-40 mmoh/cm represents complete release of the fertilizer into the aqueous environment (initially deionized water).

Table 32 summarizes the differences in elastomer composition between the polyHIPE samples, and the extent of the resulting burst release.

TABLE 32

| Sample | Monomer composition, mass ratio | Stabilizing NPs | Burst release |
|---|---|---|---|
| kb-44 | EHA/MA = 12 1/1 | MNPs: 5% | Very high |
| kb-47 | EHA | MNPs: 10% | Very high |
| kb-33 | EHA | PNPs: 10% | High |
| kb-43 | MA12 | MNPs: 5% | High |
| kb-45 | A12/MA = 12 1/1 | MNPs: 5% | Medium |
| kb-40 | EHA/A12 = 1/1 | PNPs: 10% | Low |
| kb-42 | EHA/A12 = 1/1 | MNPs: 5% | Low |
| kb-48 | A12 | MNPs: 10% | Low |
| kb-46 | A12 | MNPs: 5% | Low |

As can be seen in FIG. 18 and Table 32, polyHIPE samples denoted kb 46-1, kb 48-1, kb 40-1 and kb 42-1, corresponding respectively to kb-46, kb-48, kb-40 and kb-42 in Table 31, exhibited low burst-release with a gradual increase in the EC levels within more than 6 months. The elastomers of kb-46, kb-48, kb-40 and kb-42 also exhibited the most swelling in water.

PolyHIPE samples denoted kb 43-3, kb 44-1 and kb 45-1, corresponding respectively to kb-43, kb-33 and kb-45 in Table 31, exhibited a medium to high burst-release in the first few days followed by moderate release phase, with an increase in the EC levels within 85 days and then a plateau, indicating depletion of the fertilizer or a halt in fertilizer release.

PolyHIPEs samples denoted kb 33-3 and kb 47-2, corresponding respectively to kb-44 and kb-47 in Table 31, exhibited a very high burst-release within 20-30 days and then a plateau.

The results show that that the chemical composition of the elastomer comprising the polyHIPE has an effect on the substance release profile in cases where the encapsulated substance is a highly concentrated solution of water soluble materials, although all monomers polymerize to afford an elastomer. For example, the results may suggest that elastomers with higher swelling aptitude form or conserve the closed-cell structure to a greater extent than elastomers with lesser swelling. The swelling aptitude may be correlated to the presence of a long-chain acrylate monomer, such as A12, rather than a long side-chain methacrylate, such as MA12, or a branched acrylate, such as EHA.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition-of-matter comprising an elastomer and a substance encapsulated therein, wherein:
    said elastomer having a microstructure templated by an external phase of a high internal phase emulsion (HIPE);
    said HIPE is a water-in-oil emulsion;
    said microstructure being a closed-cell microstructure and said substance being encapsulated in pores of said closed-cell microstructure;
    said elastomer comprises residues of at least one acrylate monomer;
    said elastomer further comprises residues of at least one monomer capable of forming a homopolymer having a $T_g$ lower than 20° C.;
    said substance is a room temperature solid; and
    said substance is releasable through said elastomer when the composition-of-matter is exposed to an aqueous environment.

2. The composition-of-matter of claim 1, wherein said pores constitute at least 60% by volume of the total volume of the composition-of-matter.

3. The composition-of-matter of claim 1, said elastomer having a modulus (E) of less than 600 MPa.

4. The composition-of-matter of claim 3, wherein said elastomer further comprises residues of at least one monomer being selected from the group consisting of an acrylic acid-based monomer, a methacrylate, a siloxane, a diene, caprolactone, ethylene oxide and any oligomer or mixture thereof.

5. The composition-of-matter of claim 1, wherein said closed-cell microstructure is characterized such that less than 20% of said solid is released from the composition-of-matter over a period of at least 10 days when the composition-of-matter is exposed to said aqueous environment.

6. The composition-of-matter of claim 1, wherein said closed-cell microstructure is characterized such that less than 50% of the mass of the volatile part of said substance are lost from the composition-of-matter over a time period of at least 7 days of exposure to a vacuum of 0.05 atm at room temperature.

7. The composition-of-matter of claim 1, wherein said elastomer is degradable.

8. The composition-of-matter of claim 7, wherein said elastomer comprises at least one labile unit and/or at least one polymer-degradation inducing agent.

9. The composition-of-matter of claim 1, wherein said substance comprises at least one fertilizer.

10. A process of preparing the composition-of-matter of claim 1, the process comprising:
providing a first liquid that comprises said substance;
providing a second liquid that comprises a pre-polymerization mixture of said elastomer and is immiscible in said first liquid, and said second liquid further comprises an emulsion stabilizer;
adding dropwise said first liquid to said second liquid under stirring to thereby obtain a HIPE;
optionally adding a polymerization initiator and/or a polymerization catalyst to said HIPE; and
allowing said HIPE to polymerize,
thereby obtaining the composition-of-matter,
wherein:
prior to providing said first liquid, melting said room temperature solid and optionally adding a polymerization initiator and/or a polymerization catalyst to said first liquid.

11. The process of claim 10, wherein said emulsion stabilizer comprises a plurality of particles being polymeric particles or inorganic particles, and being modified to exhibit a plurality of polymerizable moieties and/or a plurality of initiation moieties attached thereon.

12. A substance-releasing system comprising the composition-of-matter of claim 1.

13. The system of claim 12, being a fertilizer-releasing system.

14. The system of claim 13, being a degradable system.

* * * * *